(12) United States Patent
Shima et al.

(10) Patent No.: US 10,383,480 B2
(45) Date of Patent: Aug. 20, 2019

(54) MILL, MILLING MACHINE, AND BEVERAGE PREPARATION APPARATUS

(71) Applicant: Sharp Kabushiki Kaisha, Sakai-shi, Osaka (JP)

(72) Inventors: Hidekazu Shima, Sakai (JP); Masaru Misumi, Sakai (JP); Kimiko Mieda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 346 days.

(21) Appl. No.: 15/119,790

(22) PCT Filed: Aug. 19, 2015

(86) PCT No.: PCT/JP2015/073259
§ 371 (c)(1),
(2) Date: Aug. 18, 2016

(87) PCT Pub. No.: WO2016/031648
PCT Pub. Date: Mar. 3, 2016

(65) Prior Publication Data
US 2017/0049271 A1  Feb. 23, 2017

(30) Foreign Application Priority Data

Aug. 25, 2014  (JP) .................................. 2014-170475
Aug. 25, 2014  (JP) .................................. 2014-170484
Sep. 4, 2014  (JP) .................................. 2014-180352

(51) Int. Cl.
*B02C 7/17* (2006.01)
*B02C 7/02* (2006.01)
(Continued)

(52) U.S. Cl.
CPC ................. *A47J 42/54* (2013.01); *A23F 3/12* (2013.01); *A47J 31/0615* (2013.01); *A47J 31/18* (2013.01);
(Continued)

(58) Field of Classification Search
CPC ... A47J 31/42; B02C 7/16; B02C 7/17; B02C 7/02
(Continued)

(56) References Cited

U.S. PATENT DOCUMENTS 5,228,627 A * 7/1993 Yang ..................... B02C 18/144
241/241
7,533,602 B2 * 5/2009 Fukushima ........... A47J 31/401
99/286

(Continued)

FOREIGN PATENT DOCUMENTS

CN  2695100 Y  4/2005
CN  102210347 A  10/2011
(Continued)

OTHER PUBLICATIONS

Official Communication issued in International Patent Application No. PCT/JP2015/073259, dated Nov. 24, 2015.

*Primary Examiner* — Reginald Alexander
(74) *Attorney, Agent, or Firm* — Keating & Bennett, LLP

(57) ABSTRACT

A mill includes a first mill having a first grinding region, a second mill having a second grinding region opposed to the first grinding region and provided to be rotatable relatively to the first mill, and a heat radiation mechanism which is provided in at least one of the first mill and the second mill and radiates friction heat generated as a result of rotation of the first mill and the second mill relative to each other, and the heat radiation mechanism is provided in a portion except for the first grinding region and the second grinding region.

7 Claims, 64 Drawing Sheets

(51) Int. Cl.
*A47J 31/42* (2006.01)
*A47J 42/54* (2006.01)
*A23F 3/12* (2006.01)
*B02C 7/08* (2006.01)
*A47J 42/20* (2006.01)
*A47J 31/06* (2006.01)
*A47J 31/18* (2006.01)
*A47J 42/36* (2006.01)

(52) U.S. Cl.
CPC ............... *A47J 31/42* (2013.01); *A47J 42/20* (2013.01); *A47J 42/36* (2013.01); *B02C 7/08* (2013.01); *B02C 7/17* (2013.01); *B02C 7/02* (2013.01)

(58) Field of Classification Search
USPC ............ 99/286, 287; 241/66, 220, 250, 257, 241/261.2, 261.3, 251
See application file for complete search history.

(56) References Cited

U.S. PATENT DOCUMENTS

| | | | | |
|---|---|---|---|---|
| 2003/0098374 | A1* | 5/2003 | Kang | B02C 13/10 241/56 |
| 2006/0086856 | A1* | 4/2006 | Pallmann | B02C 7/17 241/261.2 |
| 2009/0140084 | A1* | 6/2009 | Horigane | B02C 7/13 241/6 |
| 2014/0197259 | A1* | 7/2014 | Lefas | B02C 7/08 241/60 |
| 2016/0250646 | A1* | 9/2016 | Mohanka | B02C 17/1825 241/183 |

FOREIGN PATENT DOCUMENTS

| | | |
|---|---|---|
| CN | 202277865 U | 6/2012 |
| CN | 203329798 U | 12/2013 |
| JP | 3659 C1 | 1/1899 |
| JP | 359023 Z2 | 11/1956 |
| JP | 4-9646 U | 1/1992 |
| JP | 2000-000478 A | 1/2000 |
| JP | 2001-062777 A | 3/2001 |
| JP | 2004-017010 A | 1/2004 |
| JP | 2004-118680 A | 4/2004 |
| JP | 2006-312136 A | 11/2006 |
| JP | 2009-248072 A | 10/2009 |
| JP | 2011-172491 A | 9/2011 |
| JP | 2013-039206 A | 2/2013 |
| JP | 2013-183647 A | 9/2013 |
| JP | 2014-083516 A | 5/2014 |

* cited by examiner

FIG.50

| | EXAMPLE 1 | EXAMPLE 2 | REFERENCE EXAMPLE 1 | REFERENCE EXAMPLE 2 | REFERENCE EXAMPLE 3 | COMPARATIVE EXAMPLE 1 |
|---|---|---|---|---|---|---|
| AMOUNT OF ADHESION (g) | 0.3g | 0.3g | 1.2g | 1.2g | 1.2g | 1.5g |
| EVALUATION OF CHARGING PREVENTION CAPABILITY | EXCELLENT | EXCELLENT | SATISFACTORY | SATISFACTORY | SATISFACTORY | NOT GOOD |

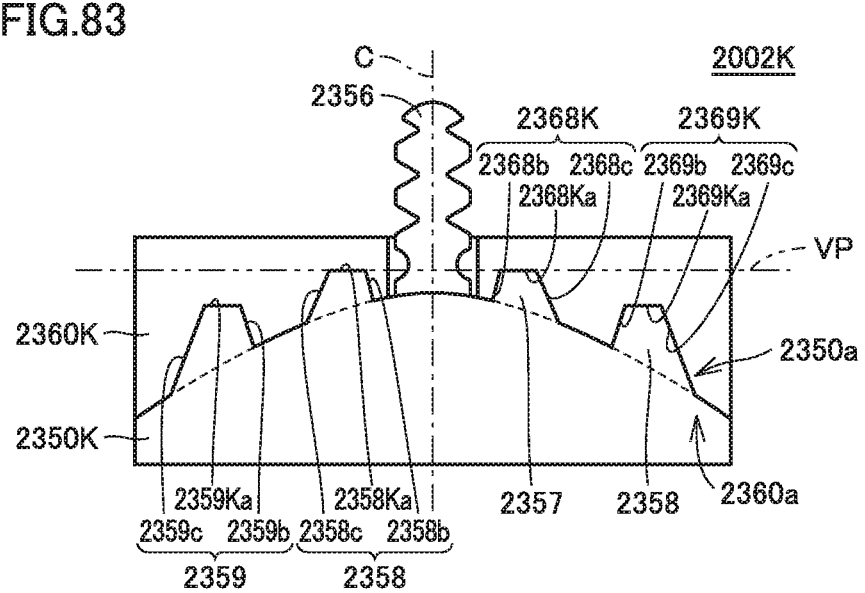

MILL, MILLING MACHINE, AND BEVERAGE PREPARATION APPARATUS

TECHNICAL FIELD

The present invention relates to a mill which obtains powders by grating an object to be grated, a milling machine, and a beverage preparation apparatus.

BACKGROUND ART

A milling machine including a mill as means for grating an object to be grated such as tea leaves and cereals has conventionally been used. The milling machine obtains powders by finely grating an object to be grated between an upper mill and a lower mill constituting the mill. For example, Japanese Patent Laying-Open No. 2000-000478 (PTD 1) and Japanese Patent Laying-Open No. 2011-172491 (PTD 2) disclose such a milling machine.

A milling machine including a grating portion such as a mill as means for grating an object to be grated such as tea leaves and cereals has conventionally been used. The milling machine obtains powders by finely grating an object to be grated between grating members arranged to be opposed to each other along a vertical direction. For example, Japanese Patent Laying-Open No. 2013-39206 (PTD 3) and Japanese Patent Laying-Open No. 2004-17010 (PTD 4) disclose such a milling machine.

In the milling machine disclosed in PTD 3, powders produced by the grating portion which grates an object to be grated are discharged to an annular powder feed path defined by a passage wall arranged to cover the entire outer circumferential surface of the grating portion. The powders discharged to the powder feed path are discharged to the outside as a movable portion of a collection and discharge portion which collects the powders and discharges the powders to the outside moves through the path. The milling machine includes drive means which drives the grating portion and the movable portion and grounding means for grounding the passage wall formed of a conductive material, the grounding means removing charges in the passage wall and the grating portion which are charged.

In the milling machine disclosed in PTD 4, a reception surface which carries powders discharged from between grating surfaces of the upper mill and the lower mill is formed around the entire outer circumference at an upper end of the mill and an outlet is provided in a part in a circumferential direction of an upper portion of the lower mill. As the upper mill rotates, the powders carried on the reception surface of the upper mill are discharged from the outlet. Since the powders on the reception surface can be discharged without using a spatula member made of a synthetic resin, electrostatic charging can be suppressed.

A milling machine including a mill as means for grating an object to be grated such as a woody material, tea leaves, and cereals has conventionally been used. The milling machine obtains powders by finely grating an object to be grated between an upper mill and a lower mill constituting the mill.

For example, Japanese Patent Laying-Open No. 2006-312136 (PTD 5) and Japanese Patent Laying-Open No. 2013-183647 (PTD 6) disclose such a milling machine including a mill.

In the mill provided in the milling machine disclosed in PTD 5, a plurality of grooves extending in parallel in a prescribed direction are provided in each divided region resulting from division of a grinding surface into six portions with the center of rotation being defined as the reference. The plurality of grooves are provided such that a width is greater every prescribed number of grooves. With such a construction, a woody material containing a large amount of fibers can suitably be grated.

In the mill provided in the milling machine disclosed in PTD 6, a grinding surface of the upper mill is provided with a projection portion having such a curved shape as projecting toward the lower mill, and a grinding surface of the lower mill is provided with a projection portion in a substantially trapezoidal shape in a cross-sectional view which projects such that an inclination on an inner circumferential side is more acute than an inclination on an outer circumferential side. The projection portion in the upper mill is different in size (depth and width) from the projection portion in the lower mill. With such a construction, powders various in size such as powders greater in grain size and powders smaller in grain size can be obtained.

CITATION LIST

Patent Document

PTD 1: Japanese Patent Laying-Open No. 2000-000478
PTD 2: Japanese Patent Laying-Open No. 2011-172491
PTD 3: Japanese Patent Laying-Open No. 2013-39206
PTD 4: Japanese Patent Laying-Open No. 2004-17010
PTD 5: Japanese Patent Laying-Open No. 2006-312136
PTD 6: Japanese Patent Laying-Open No. 2013-183647

SUMMARY OF INVENTION

Technical Problem

In grating an object to be grated, friction heat is generated as a result of rotation of an upper mill and a lower mill relative to each other. When the friction heat is transmitted to the produced powders, a flavor of the object to be grated is lost. Therefore, a milling machine is required to have a construction for efficiently radiating friction heat generated by the upper mill and the lower mill.

When the milling machines disclosed in PTDs 1 and 2 are used to grate an object to be grated, the upper mill and the lower mill are cooled with a cooling apparatus such as a cooling fan. Therefore, a cooling apparatus should separately be provided around the mill, and consequently the milling machine becomes bulky. PTD 1 discloses a construction for supporting the mill on a plurality of posts arranged at a distance from each other so as to expose a circumferential side surface of the mill to a surrounding space. The mill, however, is low in thermal conductivity. Therefore, when no measures are taken in the mill, friction heat cannot efficiently be radiated.

In the construction disclosed in PTD 3, since the grounding means is constituted of a motor case for a motor included in the drive means, the passage wall, a connection member for ensuring conduction between the motor case and the passage wall, and a ground line connected to the motor case, a structure is complicated.

In the milling machine disclosed in PTD 4, it is not necessary to scrape up powders with a spatula made of a synthetic resin for discharging the powders. Therefore, the milling machine can achieve suppression of generation of static electricity. Static electricity generated as a result of rotation of reduction gears for rotation of the mill, however, is transmitted to the mill. Thus, the mill is charged and adhesion of powders in the apparatus cannot sufficiently be suppressed.

It has been difficult to obtain fine powders suitable for a beverage simply by changing a direction of extension of grooves for each divided region obtained by division of the grinding surface having a two-dimensional shape like the mill disclosed in PTD 5 or by changing a width of the grooves in a section. Though powders various in size can be obtained with the mill disclosed in PTD 2, it is difficult to obtain uniformly fine powders.

When an outer diameter of the upper mill and an outer diameter of the lower mill have been decreased in any of the mill disclosed in PTD 6 and the mill disclosed in PTD 2, it has been difficult to grate an object to be grated to a desired grain size.

The present invention was made in view of the problems as above, and a first object of the present invention is to provide a mill and a beverage preparation apparatus which can efficiently suppress, with a simplified construction, increase in temperature due to friction heat generated by an upper mill and a lower mill.

The present invention was made in view of the problems as above, and a second object of the present invention is to provide a milling machine and a beverage preparation apparatus which can achieve, with a simplified construction, sufficient suppression of charging of the apparatus by static electricity.

The present invention was made in view of the problems as above, and a third object of the present invention is to provide a mill and a beverage preparation apparatus which can be reduced in size and can obtain fine powders.

Solution to Problem

A mill based on a first aspect of the present invention includes a first mill which has a first grinding region, a second mill which has a second grinding region opposed to the first grinding region and is provided to be rotatable relatively to the first mill, and a heat radiation mechanism which is provided in at least one of the first mill and the second mill and radiates friction heat generated as a result of rotation of the first mill and the second mill relative to each other, and the heat radiation mechanism is provided in a portion except for the first grinding region and the second grinding region.

In the mill based on the first aspect of the present invention, preferably, the heat radiation mechanism includes a projection and recess portion provided in a circumferential surface of at least one of the first mill and the second mill.

In the mill based on the first aspect of the present invention, preferably, the heat radiation mechanism includes at least one of a first through hole provided to pass from a main surface having the first grinding region to a surface of the first mill located opposite to the main surface having the first grinding region and a second through hole provided to pass from a main surface having the second grinding region to a surface of the second mill located opposite to the second grinding region.

In the mill based on the first aspect of the present invention, preferably, the heat radiation mechanism includes a projection and recess portion provided in at least one of a surface of the first mill located opposite to a main surface having the first grinding region and a surface of the second mill located opposite to a main surface having the second grinding region.

In the mill based on the first aspect of the present invention, preferably, the heat radiation mechanism includes a heat radiation member fixed to a circumferential surface of at least one of the first mill and the second mill, or at least one of a first through hole provided to pass from a main surface having the first grinding region to a surface of the first mill located opposite to the main surface having the first grinding region and a second through hole provided to pass from a main surface having the second grinding region to a surface of the second mill located opposite to the second grinding region, or at least one of the surface of the first mill located opposite to the main surface having the first grinding region and the surface of the second mill located opposite to the second grinding region.

In the mill based on the first aspect of the present invention, preferably, the heat radiation mechanism is provided in at least one of the first mill and the second mill which rotates.

A beverage preparation apparatus based on the first aspect of the present invention includes a milling unit which obtains powders by grating an object to be grated, a tank which stores a liquid, and an agitation tank which is supplied with the powders obtained by the milling unit and the liquid and mixes the powders and the liquid. The aforementioned mill is employed as the milling unit.

A milling machine based on a second aspect of the present invention includes a drive portion which generates driving force, a driving force transmission mechanism which transmits the driving force generated by the drive portion, and a milling unit attached to the driving force transmission mechanism, the milling unit includes a rotation mechanism which rotates an upper mill and a lower mill relatively to each other, the driving force transmission mechanism includes a power transmission portion which connects the drive portion and the rotation mechanism to each other and transmits the driving force to the rotation mechanism, and at least a part of the power transmission portion includes a charging prevention member.

In the milling machine based on the second aspect of the present invention, the driving force transmission mechanism may further include a surrounding member which surrounds the power transmission portion. In this case, the surrounding member preferably includes the charging prevention member.

In the milling machine based on the second aspect of the present invention, preferably, the milling unit further includes a housing which accommodates the upper mill and the lower mill. In this case, preferably, the housing comes in contact with the surrounding member when the rotation mechanism and the driving force transmission mechanism are connected to each other.

In the milling machine based on the second aspect of the present invention, preferably, the housing includes the charging prevention member.

A beverage preparation apparatus based on the second aspect of the present invention includes the aforementioned milling machine, a tank which stores a liquid, and an agitation tank which is supplied with powders obtained by the milling machine and the liquid and mixes the powders and the liquid.

A mill based on a third aspect of the present invention includes an upper mill and a lower mill having a common central axis and the mill grates an object to be grated as a result of rotation of the upper mill and the lower mill around the central axis relative to each other. The upper mill includes a first grinding surface, the lower mill includes a second grinding surface arranged to be opposed to the first grinding surface, the second grinding surface has a recess portion provided to be recessed from a virtual plane with the virtual plane being defined as the reference, the virtual plane being a plane in parallel to a radial direction of the central axis and passing through a portion of the second grinding surface located at a highest position, and the first grinding surface has a projection portion, the projection portion being provided to project from the virtual plane toward the lower mill, having a shape corresponding to the recess portion, and fitting into at least a part of the recess portion.

In the mill based on the third aspect of the present invention, the upper mill and the lower mill preferably have the common central axis, and a plurality of the projection portions and a plurality of the recess portions are preferably provided concentrically around the central axis.

In the mill based on the third aspect of the present invention, preferably, the projection portion is entirely fitted into the recess portion.

A mill based on a fourth aspect of the present invention includes an upper mill and a lower mill, and the mill grates an object to be grated as a result of rotation of the upper mill and the lower mill relative to each other. The upper mill includes a first grinding surface, the lower mill includes a second grinding surface arranged to be opposed to the first grinding surface, each of the first grinding surface and the second grinding surface has a plurality of groove portions for grating an object to be grated, the plurality of groove portions being provided to have a height difference, and the plurality of groove portions are provided to have a height difference.

A beverage preparation apparatus based on the third and fourth aspects of the present invention includes a milling unit which obtains powders by grating an object to be grated, a tank which stores a liquid, and an agitation tank which is supplied with the powders obtained by the milling unit and the liquid and mixes the powders and the liquid. The aforementioned mill is employed as the milling unit.

Advantageous Effects of Invention

According to the first aspect of the present invention, a mill and a beverage preparation apparatus which can efficiently suppress, with a simplified construction, increase in temperature due to friction heat generated by an upper mill and a lower mill can be provided.

According to the second aspect of the present invention, a milling machine and a beverage preparation apparatus which can achieve, with a simplified construction, sufficient suppression of charging of the apparatus by static electricity can be provided.

According to the third and fourth aspects of the present invention, a mill and a beverage preparation apparatus which can be reduced in size and can obtain fine powders can be provided.

BRIEF DESCRIPTION OF DRAWINGS

FIG. 50 is a diagram showing a result of the verification experiment conducted for verifying an effect of the present invention.

FIG. 83 is a schematic cross-sectional view of a mill according to Embodiment 28.

DESCRIPTION OF EMBODIMENTS

Figure 1:
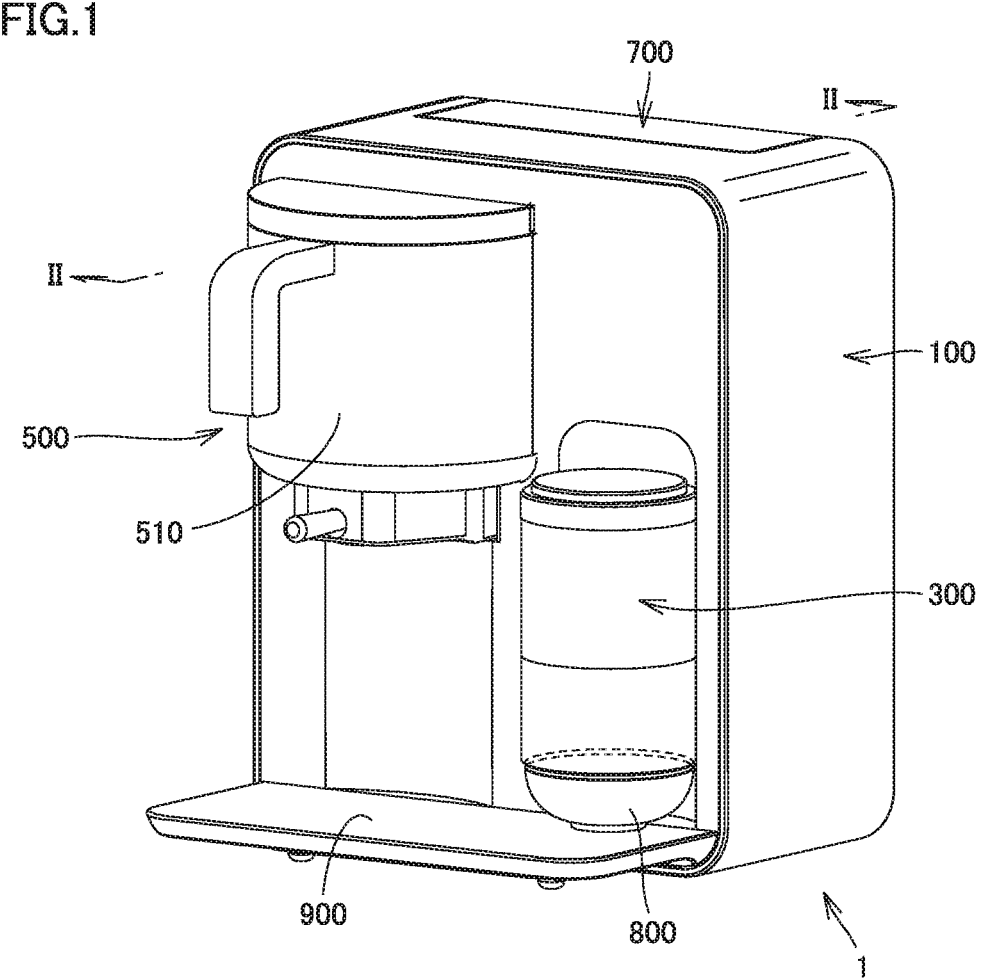
FIG. 1 is an overall perspective view of a beverage preparation apparatus including a mill according to Embodiment 1.

Embodiments of the present invention will be described hereinafter in detail with reference to the drawings. In the embodiments shown below, the same or common elements have the same reference characters allotted in the drawings and description thereof will not be repeated.

In the present embodiment, though a case that tea leaves are used as an object to be grated and tea is prepared as a beverage will be described by way of example, the object to be grated is not limited to tea leaves, but the embodiment can also be applied to preparation of a beverage with cereals, dried goods, and other objects to be grated. Hereinafter, tea leaves mean a solid state before grating, tea leaf powders mean grated tea leaves, and tea means a beverage obtained by agitating (mixing) tea leaf powders and hot water.

Embodiment 1

(Beverage Preparation Apparatus 1)

Figure 2:
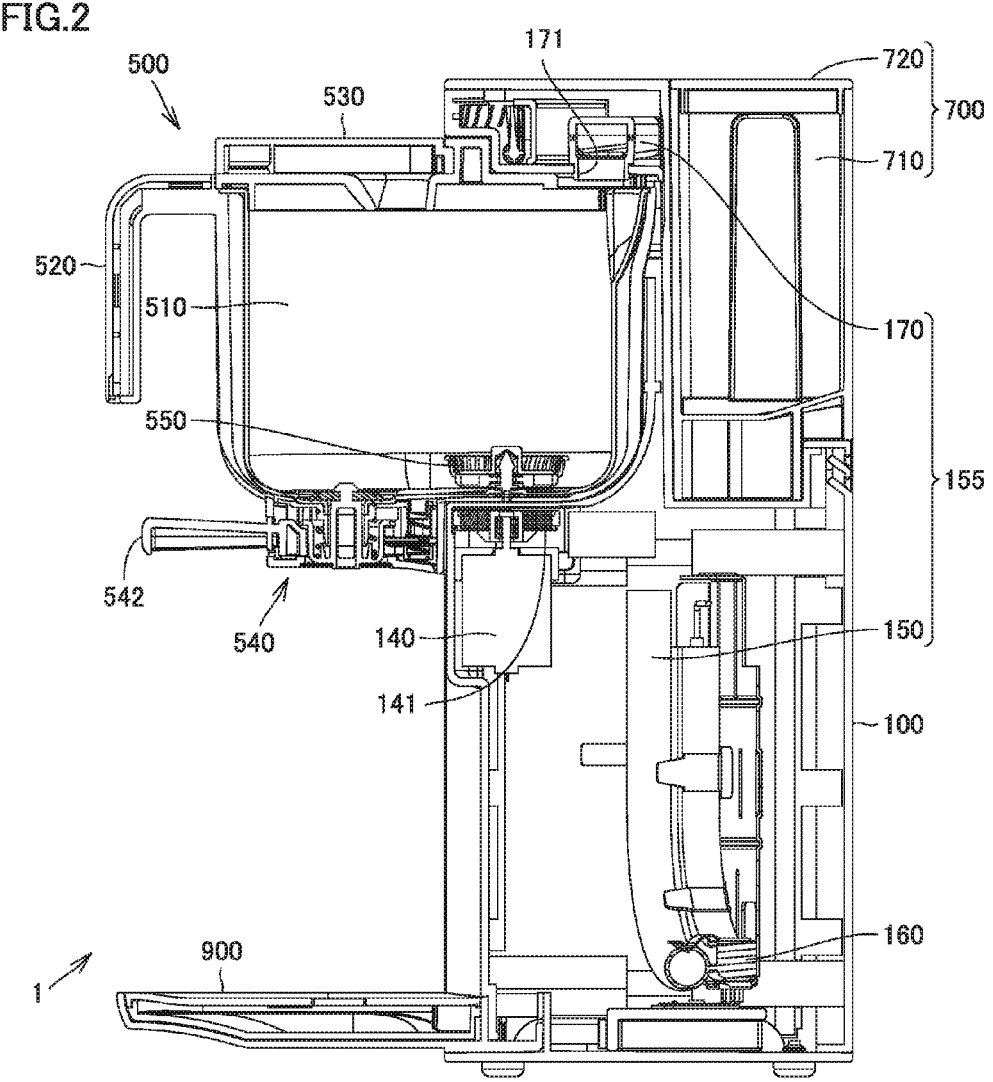
FIG. 2 is a cross-sectional view along the line II-II in FIG. 1.
Figure 3:
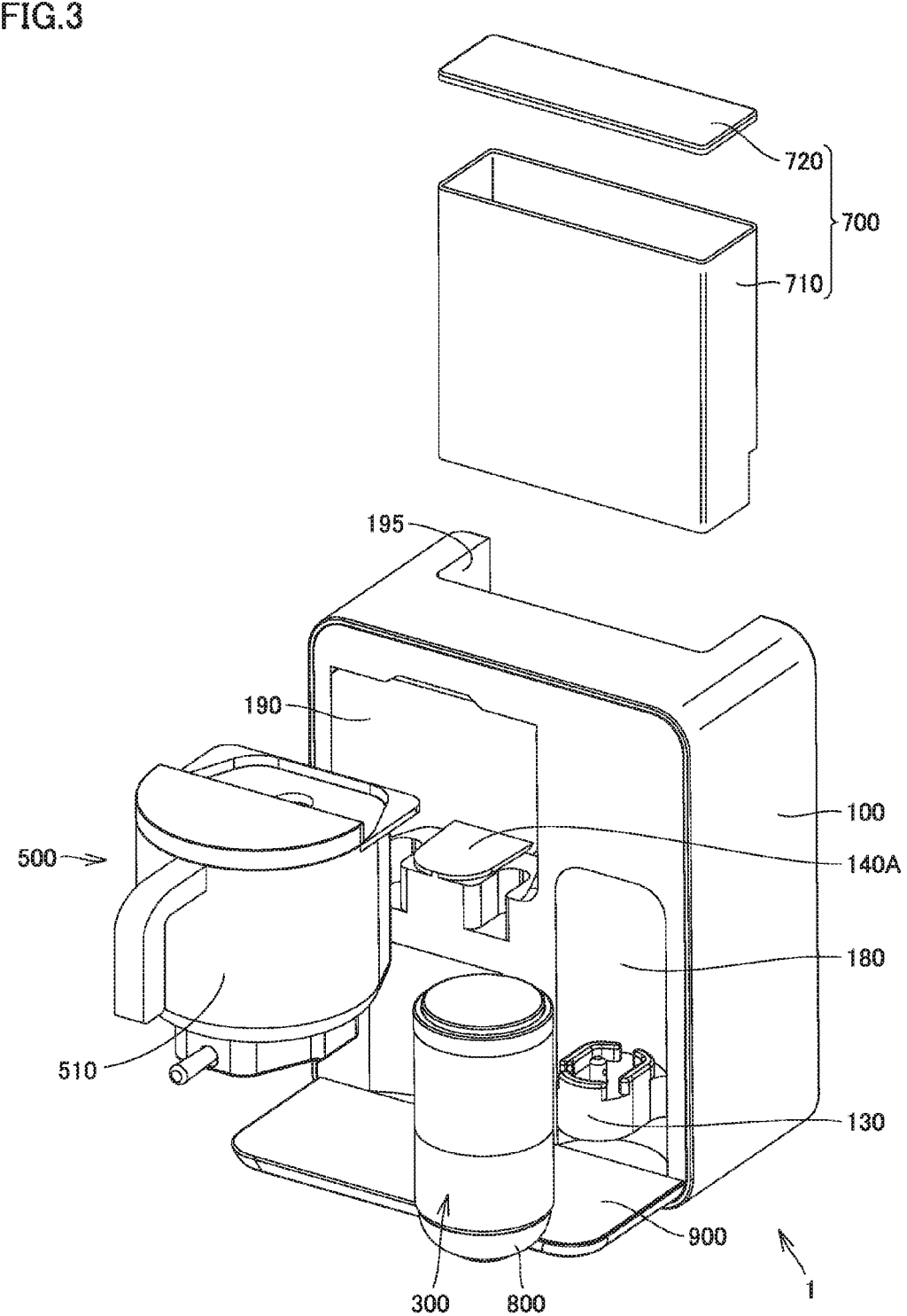
FIG. 3 is an overall perspective view showing a schematic component of the beverage preparation apparatus shown in FIG. 1.

A beverage preparation apparatus 1 in the present embodiment will be described with reference to FIGS. 1 to 3. FIG. 1 is an overall perspective view of beverage preparation apparatus 1, FIG. 2 is a cross-sectional view along the line II-II in FIG. 1, and FIG. 3 is an overall perspective view of a schematic component of beverage preparation apparatus 1.

Beverage preparation apparatus 1 uses tea leaves as an object to be grated and obtains tea leaf powders by grating the tea leaves. The beverage preparation apparatus uses the obtained tea leaf powders for preparing tea as a beverage. Beverage preparation apparatus 1 includes an apparatus main body 100 as a beverage preparation apparatus main body, a milling unit 300, an agitation unit 500, a liquid storage tank 700, a liquid supply path 155 (see FIG. 2), a tea leaf powder tray 800 as a powder reception portion, and a placement base 900. Placement base 900 is provided to protrude forward on a front side in a lower portion of apparatus main body 100 and a cup (not shown) and tea leaf powder tray 800 can be placed thereon. Tea leaf powder tray 800 is provided such that a user can move the tray by holding the tray.

(Milling Unit 300)

Milling unit 300 is removably attached to a milling unit attachment portion 180 (see FIG. 3) provided on a front surface side of apparatus main body 100. Milling unit 300 is arranged, for example, at a distance from an agitation tank 510 so as to be displaced from agitation tank 510 below agitation tank 510 included in agitation unit 500 when viewed from the front.

A milling driving force coupling mechanism 130 (see FIG. 3) is provided in milling unit attachment portion 180 so as to protrude forward and milling unit 300 is removably attached to this milling driving force coupling mechanism 130. Milling unit 300 obtains driving force for milling tea leaves representing an object to be grated by being coupled to milling driving force coupling mechanism 130.

Tea leaves introduced from an upper portion of milling unit 300 into milling unit 300 are finely grated in milling unit 300. The grated tea leaves are dropped and collected as tea leaf powders on tea leaf powder tray 800 placed below milling unit 300. A detailed structure of milling unit 300 will be described later with reference to FIGS. 8 to 10.

(Liquid Storage Tank 700)

Liquid storage tank 700 is removably attached to a liquid storage tank attachment portion 195 provided on an upper surface side of apparatus main body 100. Liquid storage tank 700 includes a tank main body 710 having an opening in an upper surface and a lid portion 720 closing the opening in the upper surface of tank main body 710. Liquid storage tank 700 stores such a liquid as water.

(Liquid Supply Path 155)

Liquid supply path 155 is accommodated in apparatus main body 100. Liquid supply path 155 is connected to liquid storage tank 700 (see FIG. 7). Liquid supply path 155 is provided with a supply port 171 on a side opposite to a side where liquid storage tank 700 is connected. Liquid supply path 155 includes a hot water supply pipe 150 and a hot water supply nozzle 170. Hot water supply pipe 150 has one end side connected to liquid storage tank 700 and the other end side connected to hot water supply nozzle 170. A liquid introduced from liquid storage tank 700 into liquid supply path 155 is supplied to agitation unit 500 through hot water supply pipe 150 and hot water supply nozzle 170.

(Agitation Unit 500)

Agitation unit 500 includes an agitation blade 550 for agitating a liquid and powders and agitation tank 510 accommodating agitation blade 550. Agitation tank 510 is removably attached to an agitation tank attachment portion 190 (see FIG. 3) provided on the front surface side of apparatus main body 100. Agitation tank 510 is attached to agitation tank attachment portion 190 so as to protrude from apparatus main body 100 in a direction intersecting with a vertical direction. Specifically, agitation tank 510 is attached such that a part of agitation tank 510 protrudes forward from a front surface of apparatus main body 100.

An agitation motor contactless table 140A is provided in agitation tank attachment portion 190. Agitation unit 500 is placed on agitation motor contactless table 140A. Agitation blade 550 provided in agitation unit 500 is rotated by an agitation motor unit 140 accommodated in apparatus main body 100 so as to be located below agitation motor contactless table 140A and a magnet 141 coupled thereto.

Hot water supply nozzle 170 is provided above agitation tank attachment portion 190 of apparatus main body 100. In apparatus main body 100, a temperature of water in hot water supply pipe 150 is raised to a prescribed temperature and hot water is supplied from hot water supply nozzle 170 into agitation tank 510. Hot water prepared in apparatus main body 100 and tea leaf powders obtained by milling unit 300 are introduced into agitation tank 510, and hot water and tea leaf powders are agitated by agitation blade 550 in agitation tank 510. Tea is thus prepared in agitation tank 510.

Tea prepared in agitation unit 500 can be poured into a cup (not shown) placed on placement base 900 by operating an operation lever 542 of a discharge port opening and closing mechanism 540 provided below agitation unit 500. A detailed structure of agitation unit 500 will be described later with reference to FIGS. 11 and 12.

(Flow of Preparation of Tea (Beverage))

Figure 4:
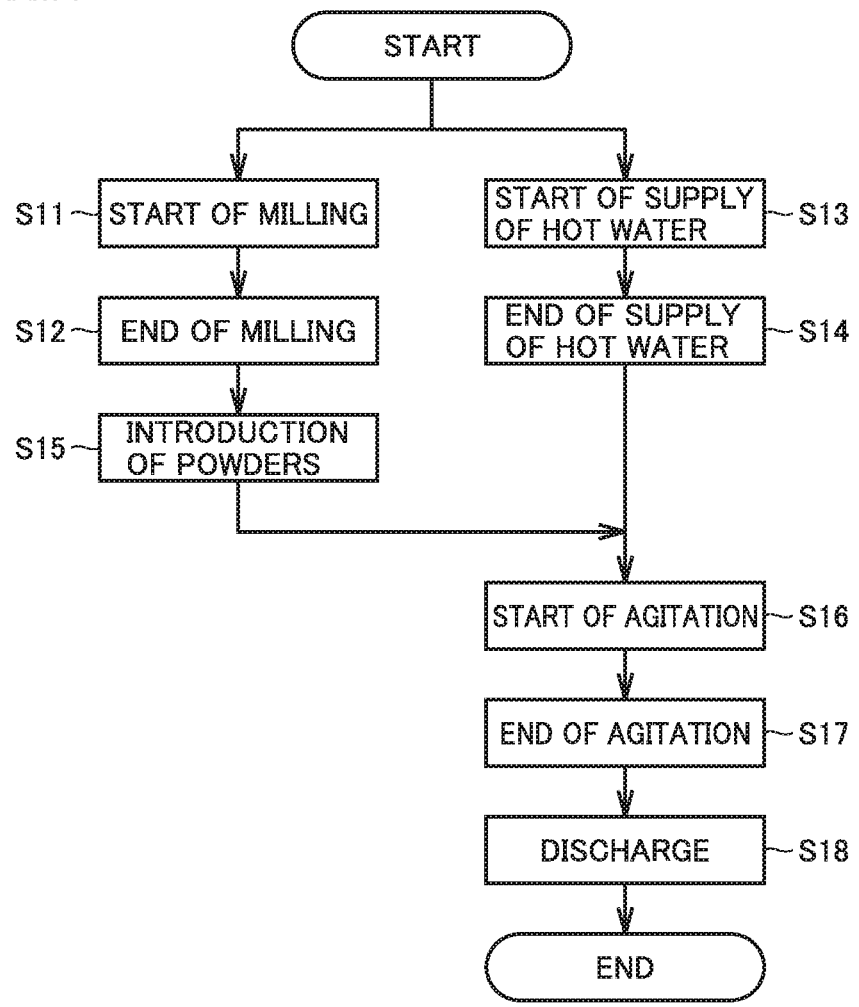
FIG. 4 shows a first preparation flow showing discharge of tea using the beverage preparation apparatus shown in FIG. 1.
Figure 5:
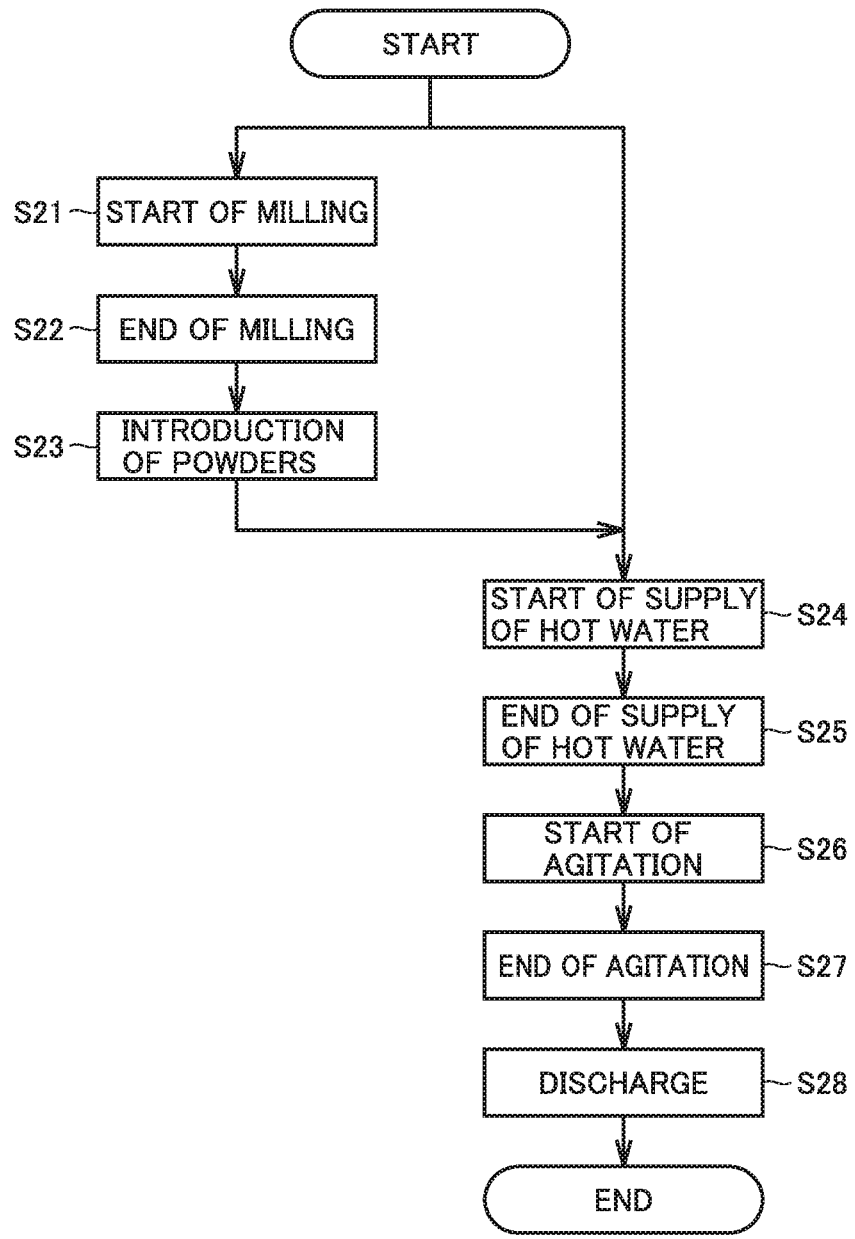
FIG. 5 shows a second preparation flow showing discharge of tea using the beverage preparation apparatus shown in FIG. 1.
Figure 6:
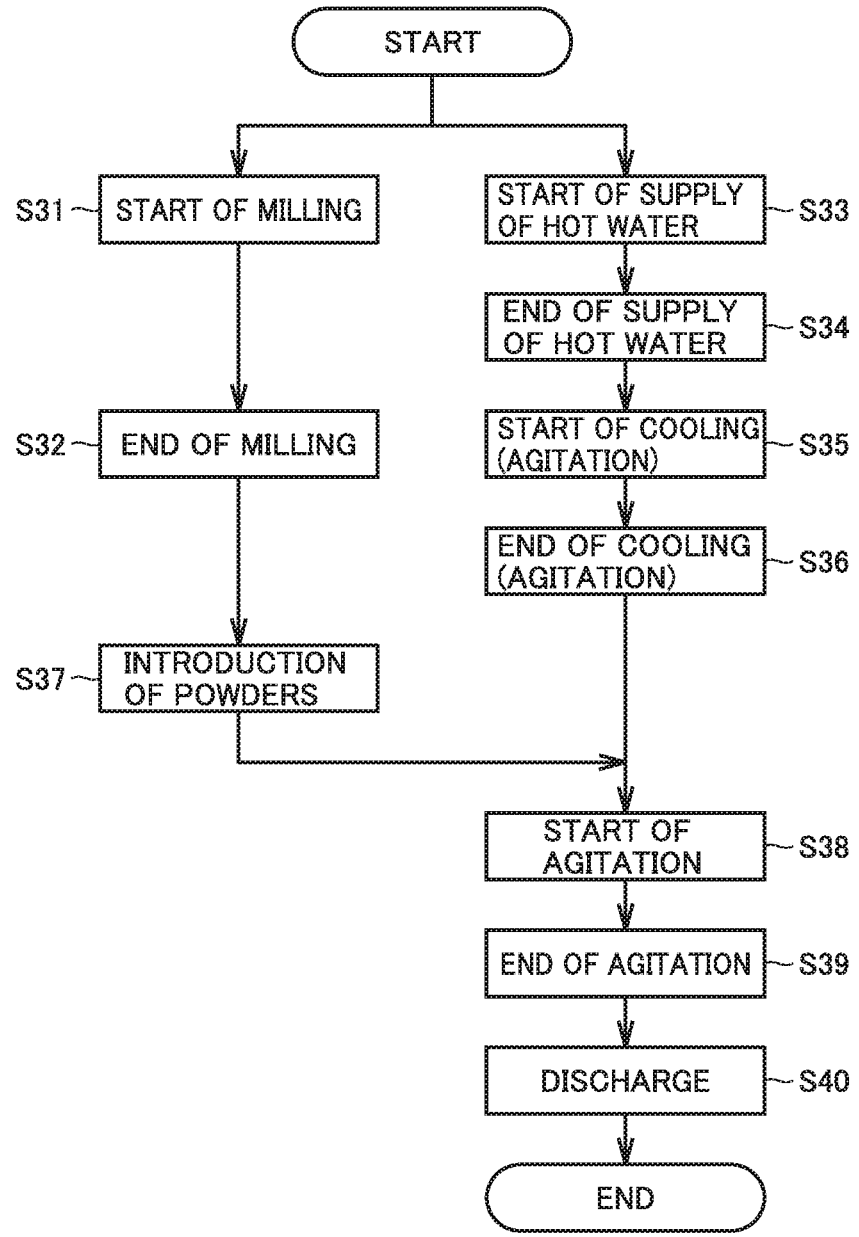
FIG. 6 shows a third preparation flow showing discharge of tea using the beverage preparation apparatus shown in FIG. 1.

A flow of preparation of tea (beverage) with the use of beverage preparation apparatus 1 will now be described with reference to FIGS. 4 to 6. FIGS. 4 to 6 show first to third preparation flows showing discharge of tea using beverage preparation apparatus 1, respectively. A prescribed amount of tea leaves is introduced into milling unit 300 and a prescribed amount of water is stored in liquid storage tank 700.

(First Preparation Flow)

A first preparation flow will be described with reference to FIG. 4. This first preparation flow is a flow in which grating of tea leaves in milling unit 300 and supply of hot water from apparatus main body 100 to agitation unit 500 are simultaneously carried out.

In beverage preparation apparatus 1, milling of tea leaves by milling unit 300 in a step 11 and supply of hot water from apparatus main body 100 to agitation unit 500 in a step 13 are simultaneously started. Then, milling of tea leaves by milling unit 300 ends in a step 12, and supply of hot water from apparatus main body 100 to agitation unit 500 ends in a step 14.

In a step 15, tea leaf powders obtained in step 12 are introduced into agitation unit 500 by a user.

Then, in a step 16, agitation of the tea leaf powders and hot water in agitation unit 500 is started. In a step 17, agitation of the tea leaf powders and hot water in agitation unit 500 ends. In a step 18, tea is discharged into the cup placed on placement base 900 as the user operates operation lever 542 of discharge port opening and closing mechanism 540 provided below agitation unit 500.

(Second Preparation Flow)

A second preparation flow will be described with reference to FIG. 5. This second preparation flow is a flow in which hot water is supplied from apparatus main body 100 to agitation unit 500 after tea leaves are grated in milling unit 300.

In beverage preparation apparatus 1, in a step 21, milling of tea leaves by milling unit 300 is started. In a step 22, milling of tea leaves by milling unit 300 ends. In a step 23, tea leaf powders obtained in step 22 are introduced into agitation unit 500 by a user.

In a step 24, supply of hot water from apparatus main body 100 to agitation unit 500 is started. In a step 25, supply of hot water from apparatus main body 100 to agitation unit 500 ends.

Then, in a step 26, agitation of the tea leaf powders and hot water in agitation unit 500 is started. In a step 27, agitation of the tea leaf powders and hot water in agitation unit 500 ends. In a step 28, tea is discharged into the cup placed on placement base 900 as the user operates operation lever 542 of discharge port opening and closing mechanism 540 provided below agitation unit 500.

(Third Preparation Flow)

A third preparation flow will be described with reference to FIG. 6. This third preparation flow includes a step of cooling hot water by agitation in agitation unit 500.

In beverage preparation apparatus 1, milling of tea leaves by milling unit 300 in a step 31 and supply of hot water from apparatus main body 100 to agitation unit 500 in a step 33 are simultaneously started. In a step 34, supply of hot water from apparatus main body 100 to agitation unit 500 ends.

Then, in a step 32, milling of tea leaves by milling unit 300 ends, and in a step 35, cooling by agitation of hot water supply is started in agitation unit 500. In a step 36, cooling by agitation of hot water supply in agitation unit 500 ends.

In a step 37, the tea leaf powders obtained in step 32 are introduced into agitation unit 500 by a user.

Then, in a step 38, agitation of the tea leaf powders and hot water in agitation unit 500 is started. In a step 39, agitation of the tea leaf powders and hot water in agitation unit 500 ends. In a step 40, tea is discharged into the cup placed on placement base 900 as the user operates operation lever 542 of discharge port opening and closing mechanism 540 provided below agitation unit 500.

(Internal Structure of Apparatus Main Body 100)

Figure 7:
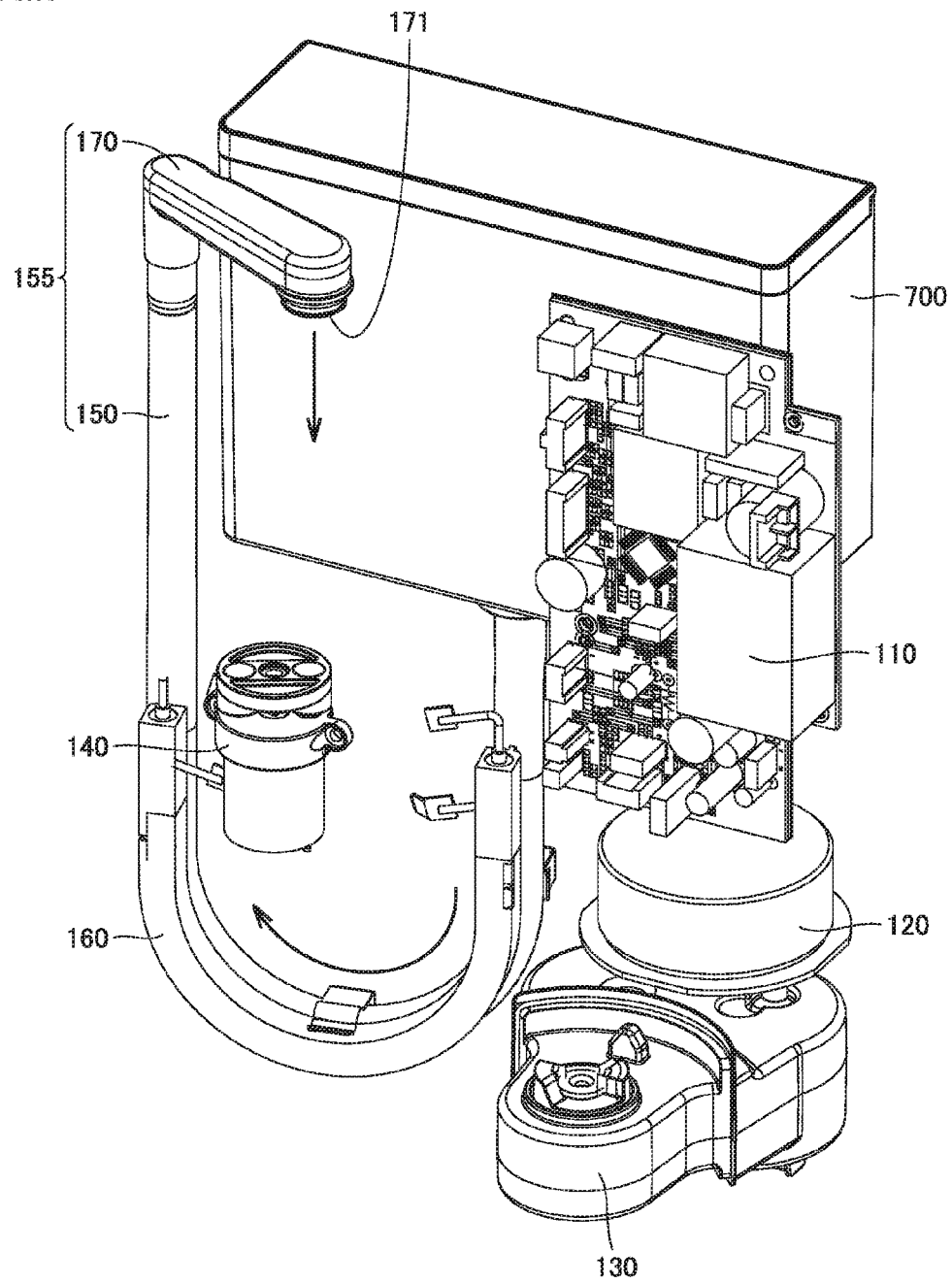
FIG. 7 is a perspective view showing an internal structure of the beverage preparation apparatus shown in FIG. 1.

An internal structure of beverage preparation apparatus 1 will now be described with reference to FIG. 7. FIG. 7 is a perspective view showing the internal structure of beverage preparation apparatus 1. In apparatus main body 100 of beverage preparation apparatus 1, a control unit 110 including a printed circuit board on which electronic components are mounted is arranged on a front surface side of liquid storage tank 700. Based on input of a start signal by a user, the flow for preparation of tea is executed by control unit 110.

A milling motor unit 120 for providing driving force to milling unit 300 is arranged at a position below control unit 110. Milling driving force coupling mechanism 130 provided to protrude forward for transmitting driving force of milling motor unit 120 to milling unit 300 is provided at a position below milling motor unit 120.

To a bottom surface of liquid storage tank 700, one end of hot water supply pipe 150 extending once downward from the bottom surface and then extending upward in a U shape is coupled. Hot water supply nozzle 170 for pouring hot water into agitation tank 510 of agitation unit 500 is coupled to the other end side of hot water supply pipe 150. A U-shaped heater 160 for heating water which passes through hot water supply pipe 150 is attached to an intermediate region of hot water supply pipe 150. Water becomes hot by being heated by heater 160, and resultant hot water is supplied to agitation tank 510.

(Structure of Milling Unit 300)

Figure 8:
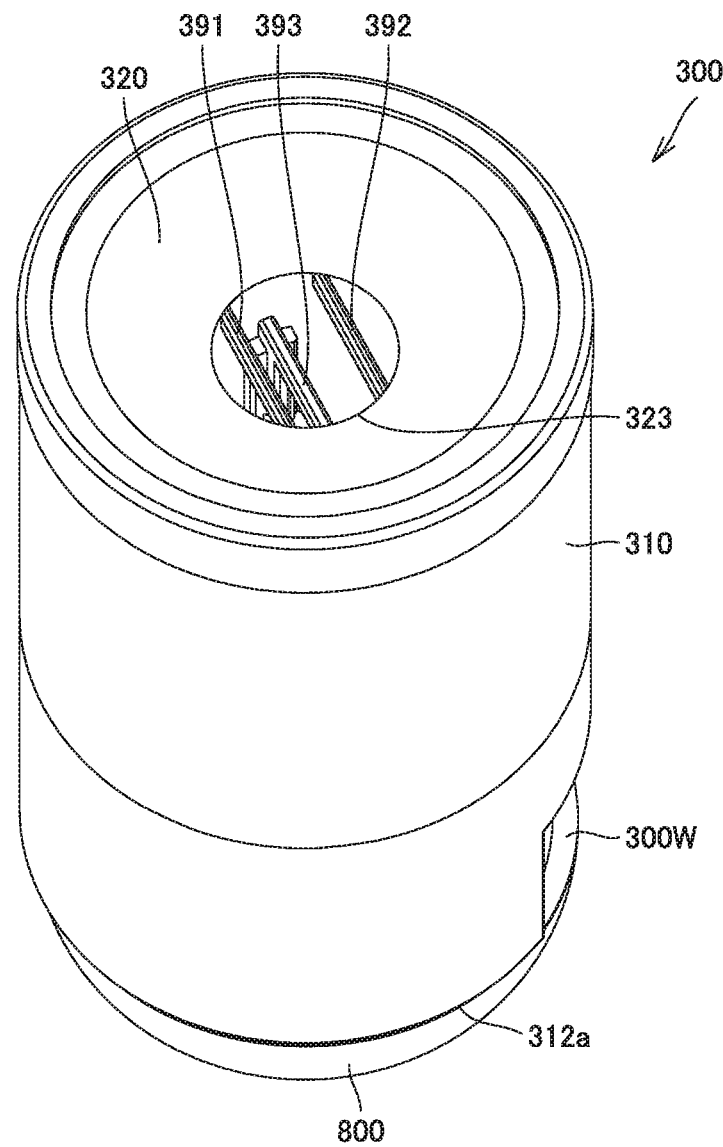
FIG. 8 is a perspective view of a milling unit provided in the beverage preparation apparatus shown in FIG. 1.
Figure 9:
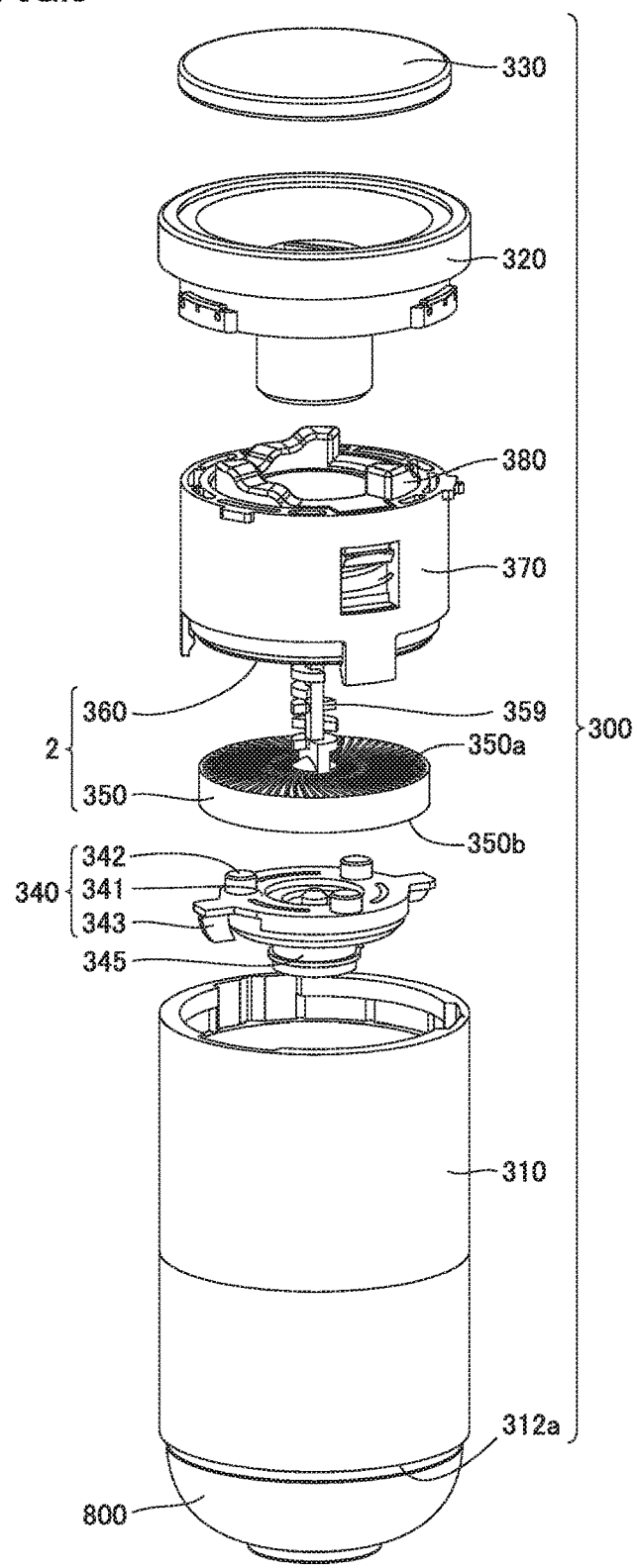
FIG. 9 is an exploded perspective view of the milling unit shown in FIG. 8.
Figure 10:
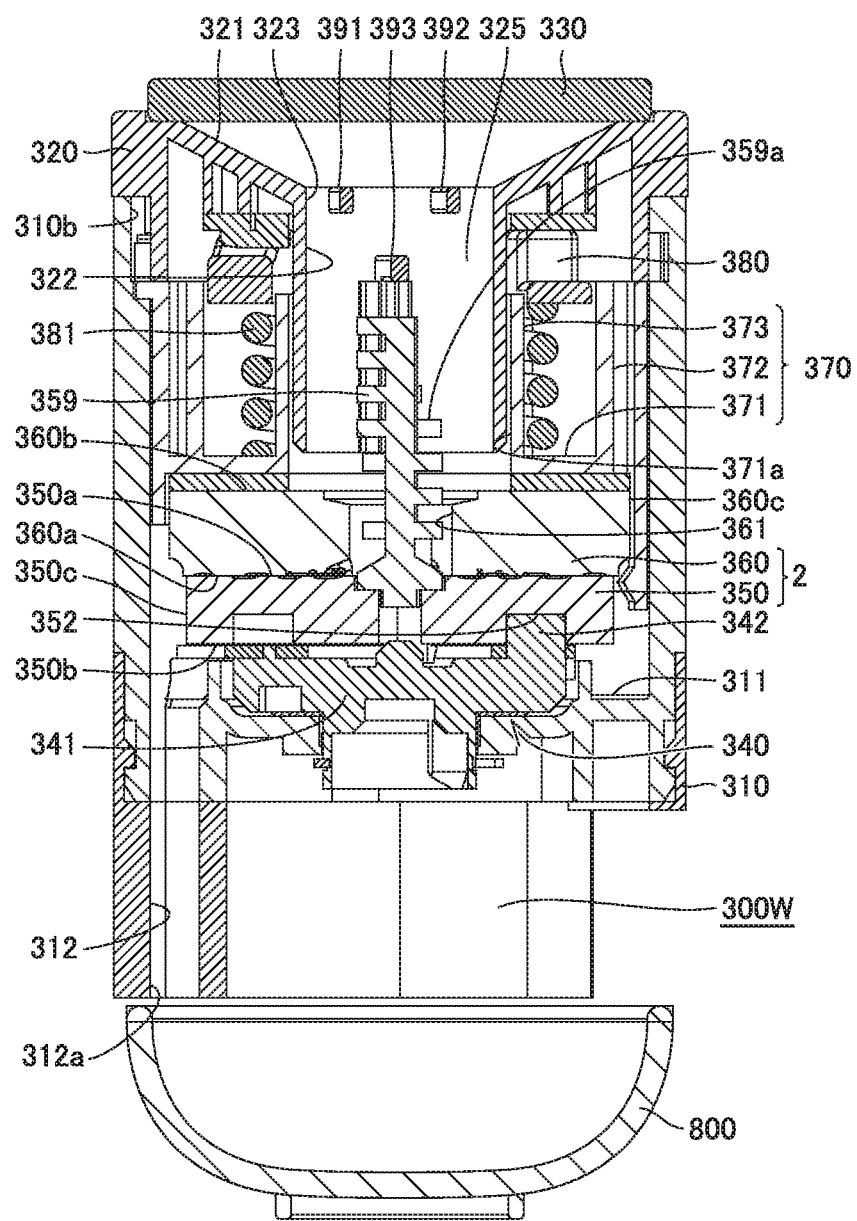
FIG. 10 is a vertical cross-sectional view of the milling unit shown in FIG. 8.

A structure of milling unit 300 will now be described with reference to FIGS. 8 to 10. FIG. 8 is a perspective view of milling unit 300, FIG. 9 is an exploded perspective view of milling unit 300, and FIG. 10 is a vertical cross-sectional view of milling unit 300.

Milling unit 300 has a milling case 310 having a cylindrical shape as a whole, and a window for coupling 300W in which milling driving force coupling mechanism 130 is inserted is provided in a side surface below. A storage portion 311 (see FIG. 10) for storing tea leaf powders produced by an upper mill 360 as a first mill and a lower mill 350 as a second mill which will be described later and a discharge path 312 communicating with storage portion 311 are provided in milling case 310. An outlet port 312a for discharging tea leaf powders into tea leaf powder tray 800 is provided at a lower end portion of discharge path 312 which is a lowermost end portion of milling case 310. Outlet port 312a is provided below an opening portion 513 of a thermally insulated tank 512 (see FIG. 12) which will be described later. Entry through outlet port 312a, of steam resulting from hot water supplied into thermally insulated tank 512 can thus be prevented.

Milling unit 300 includes a mill 2 having upper mill 360 and lower mill 350 which grate an object to be grated and a lower mill support portion 340 to which lower mill 350 is attached. In milling case 310, lower mill support portion 340, lower mill 350, and upper mill 360 are successively provided from below.

Lower mill support portion 340 supports lower mill 350 from a side opposite to a side where upper mill 360 is located (a side below lower mill 350). Lower mill support portion 340 has a substantially columnar main body portion 341, an engagement protrusion portion 342, and a powder scraping portion 343. A milling shaft 345 is provided on a lower surface of main body portion 341 and extends downward. Milling shaft 345 is coupled to milling driving force coupling mechanism 130. Lower mill support portion 340 is thus rotatable while it supports lower mill 350.

Engagement protrusion portion 342 is provided on an upper surface of main body portion 341 and protrudes upward. Engagement protrusion portion 342 is a site for locking lower mill 350. Powder scraping portion 343 is provided around a circumferential portion of main body portion 341. Powder scraping portion 343 scrapes off tea leaf powders stored in storage portion 311 and transports the tea leaf powders to discharge path 312 as lower mill support portion 340 rotates.

Lower mill 350 includes a main surface 350a (a second main surface) arranged to be opposed to a main surface 360a (a first main surface) of upper mill 360 which will be described later, a main surface 350b located opposite to main surface 350a, and a circumferential surface 350c connecting main surface 350a and main surface 350b to each other. Main surface 350a of lower mill 350 includes a grinding region 351a (see FIG. 13) as a second grinding region which will be described later where a shear groove is formed.

An engagement recess portion 352 is provided in main surface 350b of lower mill 350. Engagement recess portion 352 is provided at a position corresponding to engagement protrusion portion 342 of lower mill support portion 340 and locked by engagement protrusion portion 342. Lower mill 350 rotates in coordination with lower mill support portion 340. A core 359 extending upward along a core of a rotation shaft is provided in a central portion of lower mill 350.

Core 359 is provided to pass through a through hole 361 provided in a central portion of upper mill 360. Core 359 has a helically provided blade portion 359a. Core 359 is formed, for example, from a resin member or a ceramic material.

Upper mill 360 includes main surface 360a arranged to be opposed to main surface 350a of lower mill 350, a main surface 360b located opposite to main surface 360a, and a circumferential surface 360c connecting main surface 360a and main surface 360b to each other. Main surface 360a of upper mill 360 includes a grinding region as a first grinding region where a shear groove is formed and the grinding region of upper mill 360 is arranged to be opposed to grinding region 351a of lower mill 350. The grinding region of upper mill 360 is provided to be substantially equal in size to grinding region 351a of lower mill 350, and a center of rotation of the grinding region of upper mill 360 and a center of rotation of grinding region 351a of lower mill 350 are located on the same axis.

Upper mill 360 is held by an upper mill holding member 370 arranged above the upper mill. A not-shown hole portion is provided in an upper surface of upper mill 360. As a not-shown pin portion provided in upper mill holding member 370 enters the hole portion, rotation of upper mill 360 is prevented.

Upper mill holding member 370 includes a bottom surface portion 371 provided with a hole portion 371a, an outer cylindrical portion 372 erected upward from a circumference of bottom surface portion 371, and an inner cylindrical portion 373 erected upward from a circumference of hole portion 371a. Hole portion 371a is provided to communicate with through hole 361 in upper mill 360. A spring 381 pressing upper mill 360 downward and a spring holding member 380 are accommodated in between outer cylindrical portion 372 and inner cylindrical portion 373. Spring 381 adjusts a grating pressure applied between upper mill 360 and lower mill 350.

A hopper portion 320 for supplying an object to be grated in between upper mill 360 and lower mill 350 is attached to a side of upper end opening portion 310b of milling case 310. Hopper portion 320 has a top plate portion 321, a cylindrical portion 322, and an object-to-be-grated inlet 325.

Top plate portion 321 has such a bowl shape that an opening portion 323 is provided substantially in a central portion. Cylindrical portion 322 is provided to extend downward from a circumference of opening portion 323. Cylindrical portion 322 is inserted in inner cylindrical portion 373.

Object-to-be-grated inlet 325 is defined by opening portion 323 and cylindrical portion 322. A tip end side of core 359 is accommodated in object-to-be-grated inlet 325. In cylindrical portion 322, a plurality of linear ribs 391, 392, and 393 are provided across object-to-be-grated inlet 325.

In grating tea leaves, hopper portion 320 is preferably covered with a cover portion 330. Thus, after tea leaves are introduced into object-to-be-grated inlet 325, entry of a foreign matter into milling unit 300 and scattering of grated tea leaves can be prevented. When tea leaves are to be introduced, cover portion 330 is removed from hopper portion 320.

Tea leaves introduced into object-to-be-grated inlet 325 are accommodated in a space defined by the upper surface of upper mill 360 exposed through upper mill holding member 370 and an inner circumferential surface of cylindrical portion 322. Tea leaves accommodated in the space are guided in between upper mill 360 and lower mill 350 as helical blade portion 359a rotates with rotation of lower mill 350.

Tea leaves guided in between upper mill 360 and lower mill 350 are grated and fall downward in a form of tea leaf powders from a circumference of upper mill 360 and lower mill 350. Some of fallen tea leaf powders is discharged through discharge path 312 into tea leaf powder tray 800 from outlet port 312a. Other fallen tea leaf powders are stored in storage portion 311. Tea leaf powders in storage portion 311 are transported to discharge path 312 and discharged from outlet port 312a into tea leaf powder tray 800 as powder scraping portion 343 rotates with rotation of lower mill support portion 340.

In the present embodiment, in grating tea leaves, friction heat generated between upper mill 360 and lower mill 350 as a result of rotation of lower mill 350 relative to upper mill 360 is efficiently radiated with the use of a heat radiation mechanism provided in at least one of upper mill 360 and lower mill 350. Heat transmitted from upper mill 360 and lower mill 350 to tea leaf powders can thus be suppressed. Consequently, loss of a flavor of the tea leaves can be suppressed. A detailed construction of the heat radiation mechanism will be described later with reference to FIGS. 13 to 33.

(Structure of Agitation Unit 500)

Figure 11:
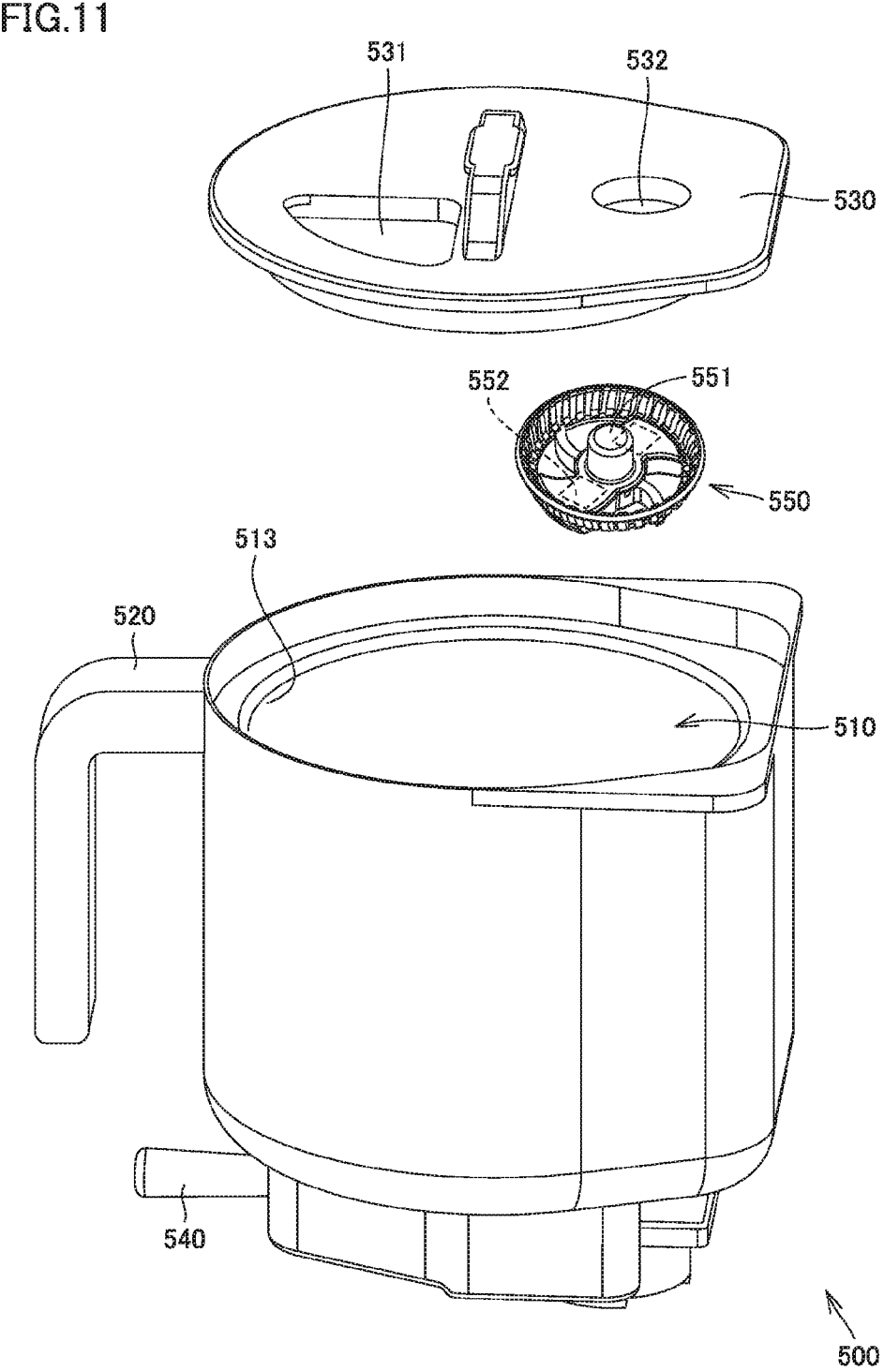
FIG. 11 is an exploded perspective view of an agitation unit provided in the beverage preparation apparatus shown in FIG. 1.
Figure 12:
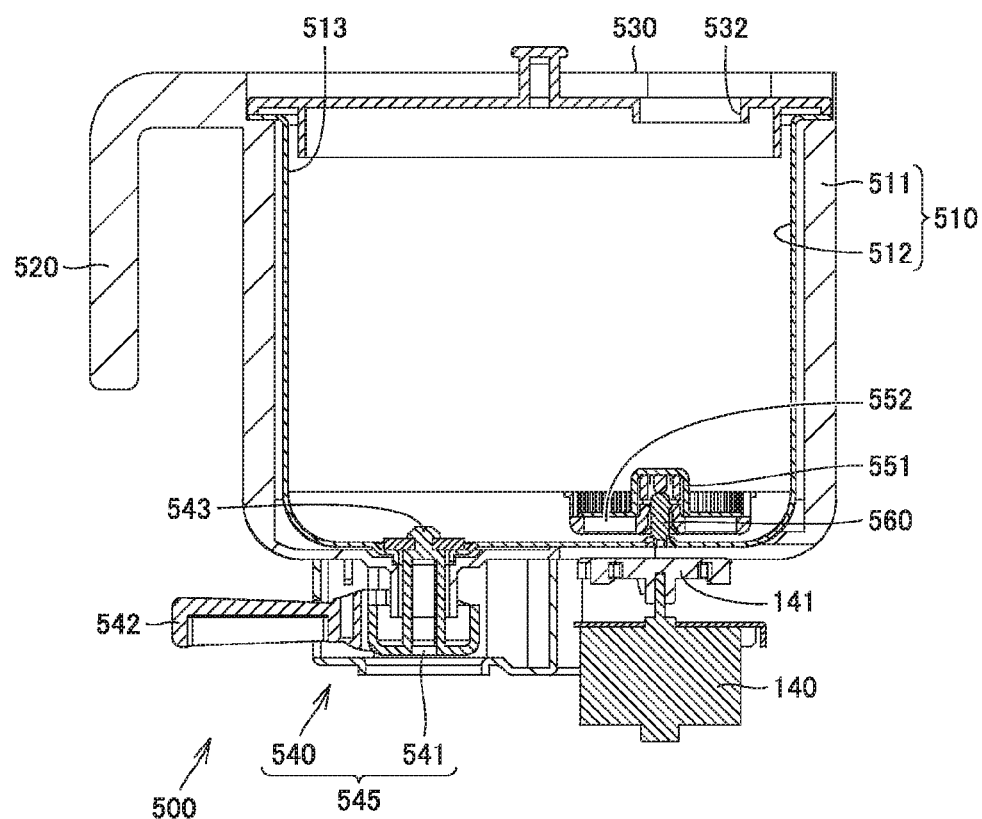
FIG. 12 is a vertical cross-sectional view of the agitation unit shown in FIG. 11.

A structure of agitation unit 500 will now be described with reference to FIGS. 11 and 12. FIG. 11 is an exploded perspective view of agitation unit 500 and FIG. 12 is a vertical cross-sectional view of agitation unit 500.

Agitation unit 500 includes agitation tank 510, agitation blade 550, and an agitation cover 530. Agitation tank 510 includes an exterior holder 511 made of a resin, thermally insulated tank 512 held by exterior holder 511, and opening portion 513. An integrally resin molded grip 520 is provided in exterior holder 511. Thermally insulated tank 512 has opening portion 513 which has a cylindrical shape with bottom and opens upward.

Agitation cover 530 covers opening portion 513 so as to be able to open and close opening portion 513. Agitation cover 530 is provided with a powder inlet 531 for introducing tea leaf powders grated by milling unit 300 and a hot water supply inlet 532 through which hot water formed in apparatus main body 100 is poured from hot water supply nozzle 170. Hot water supply inlet 532 is provided at a position corresponding to supply port 171 of hot water supply nozzle 170.

Powder inlet 531 and hot water supply inlet 532 communicate with opening portion 513. Tea leaf powders introduced from moved tea leaf powder tray 800 to powder inlet 531 are introduced into agitation tank 510 through opening portion 513. Hot water poured through hot water supply inlet 532 from hot water supply nozzle 170 is supplied into agitation tank 510 through opening portion 513.

Agitation blade 550 is placed on a bottom portion of agitation tank 510. A rotation shaft 560 extending upward is provided on the bottom portion of agitation tank 510, and a bearing portion 551 for agitation blade 550 is inserted in this rotation shaft 560.

A magnet 552 is embedded in agitation blade 550. In agitation motor contactless table 140A, magnet 552 embedded in agitation blade 550 and magnet 141 provided on a side of agitation motor unit 140 are magnetically coupled in a contactless state, so that rotational driving force of agitation motor unit 140 is transmitted to agitation blade 550.

Agitation tank 510 further includes a discharge portion 545 for discharging a prepared beverage. Discharge portion 545 is provided in agitation tank 510 in a portion protruding from apparatus main body 100. Discharge portion 545 includes a discharge port 541 provided in the bottom portion of agitation tank 510 and discharge port opening and closing mechanism 540 opening and closing discharge port 541. Discharge port 541 is a portion for discharging tea prepared by agitation of tea leaf powders and hot water by agitation blade 550.

Discharge port opening and closing mechanism 540 includes an opening and closing nozzle 543 inserted into discharge port 541 so as to be able to open and close discharge port 541 and operation lever 542 controlling a position of opening and closing nozzle 543. Opening and closing nozzle 543 is biased to close discharge port 541 by a biasing member (not shown) such as a spring in a normal state. When a user moves operation lever 542 against biasing force, opening and closing nozzle 543 moves to open discharge port 541 and thus tea in agitation tank 510 is poured into a cup (not shown) placed on placement base 900.

(Heat Radiation Mechanism)

Figure 13:
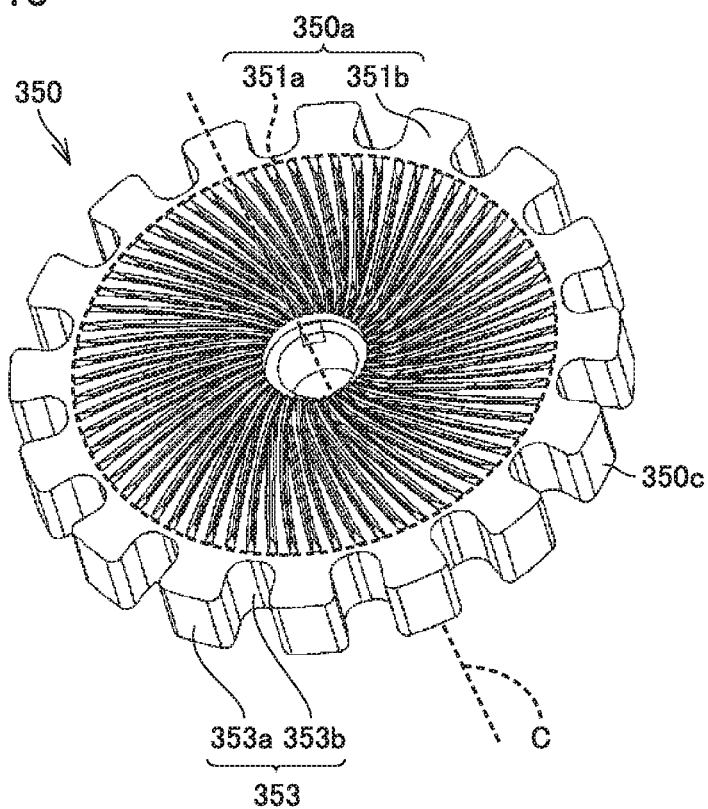
FIG. 13 is a perspective view showing a side of a grinding surface of a lower mill provided in the mill according to Embodiment 1.
Figure 14:
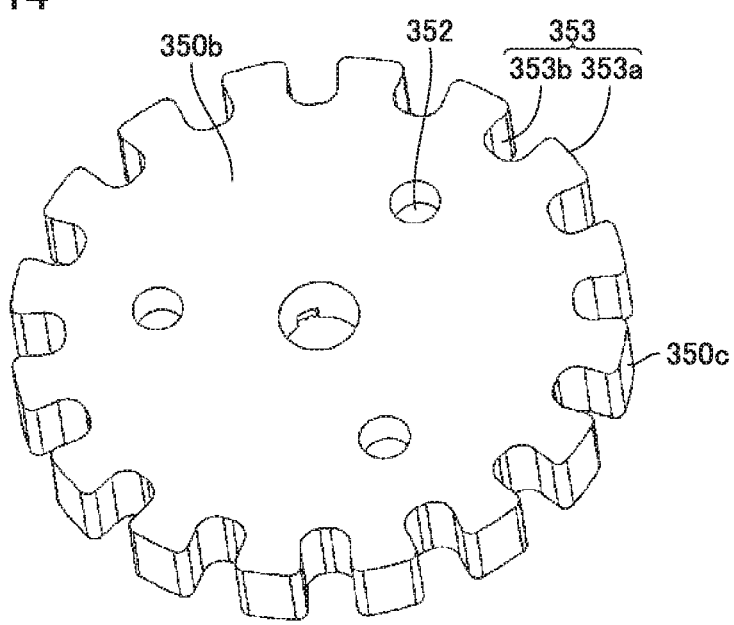
FIG. 14 is a perspective view showing a side opposite to the side of the grinding surface of the lower mill shown in FIG. 13.

A heat radiation mechanism for efficiently radiating friction heat generated as a result of rotation of the upper mill and the lower mill relative to each other will be described with reference to FIGS. 13 and 14. An example of the heat radiation mechanism provided in lower mill 350 will be illustrated and described. FIG. 13 is a perspective view showing a side of a grinding surface of the lower mill provided in the mill. FIG. 14 is a perspective view showing a side opposite to the side of the grinding surface of the lower mill shown in FIG. 13.

As shown in FIG. 13, main surface 350a of lower mill 350 includes grinding region 351a and an outer circumferential region 351b. Grinding region 351a is a region of main surface 350a where a plurality of shear grooves are provided as shown with a dashed line. The plurality of shear grooves are provided, for example, to extend along an equiangular spiral from the inner circumferential side toward the outer circumference. The shear groove is not limited to a shape extending along the equiangular spiral as above and can be modified as appropriate.

Outer circumferential region 351b is a region of main surface 350a located outside grinding region 351a. Though no shear groove is provided in outer circumferential region 351b in the present embodiment, a shear groove may be provided therein.

As shown in FIGS. 13 and 14, circumferential surface 350c of lower mill 350 has a projecting and recessed shape as a projection portion 353a and a recess portion 353b are repeatedly provided in a circumferential direction of lower mill 350. Circumferential surface 350c is provided to include a plurality of projection and recess portions 353. The plurality of projection and recess portions 353 function as the heat radiation mechanism.

Recess portion 353b is provided to be recessed radially inward in lower mill 350 from the circumferential surface of a columnar body with the circumferential surface of the columnar body including a circumferential surface portion where a distance from a central axis C which is the center of rotation of lower mill 350 to circumferential surface 350c is maximum being defined as the reference.

Recess portion 353b is provided between projection portions 353a adjacent in the circumferential direction of lower mill 350. Recess portion 353b is provided not to reach grinding region 351a when viewed in a direction of an axial line of lower mill 350. Recess portion 353b is provided from main surface 350a to main surface 350b.

As the plurality of projection and recess portions 353 are provided in circumferential surface 350c, lower mill 350 is greater in surface area than a lower mill in a columnar shape. Thus, it is no longer necessary to separately use a cooling apparatus such as a cooling fan, thermal conductivity of lower mill 350 can be improved with a simplified construction, and friction heat generated between upper mill 360 and lower mill 350 can efficiently be radiated.

With the plurality of projection and recess portions 353 being provided in circumferential surface 350c, when lower mill 350 is rotated, an upward air flow can be produced. Thus, heat radiated from the mill can be moved to an upper portion of milling case 310. Friction heat can also thus efficiently be radiated.

Since a speed of the air flow produced by rotation of lower mill 350 is lower than a speed of an air flow produced by a cooling fan, heat can be moved upward without scattering tea leaf powders.

When object-to-be-grated inlet 325 is not covered with cover portion 330 in milling unit 300, heat radiated from the mill can further be dissipated to the outside of milling unit 300 through object-to-be-grated inlet 325. Efficiency in heat radiation is thus further improved.

As set forth above, by making use of the mill and the beverage preparation apparatus including the same according to the present embodiment, increase in temperature due to friction heat between upper mill 360 and lower mill 350 can efficiently be suppressed with a simplified construction.

Embodiment 2

Figure 15:
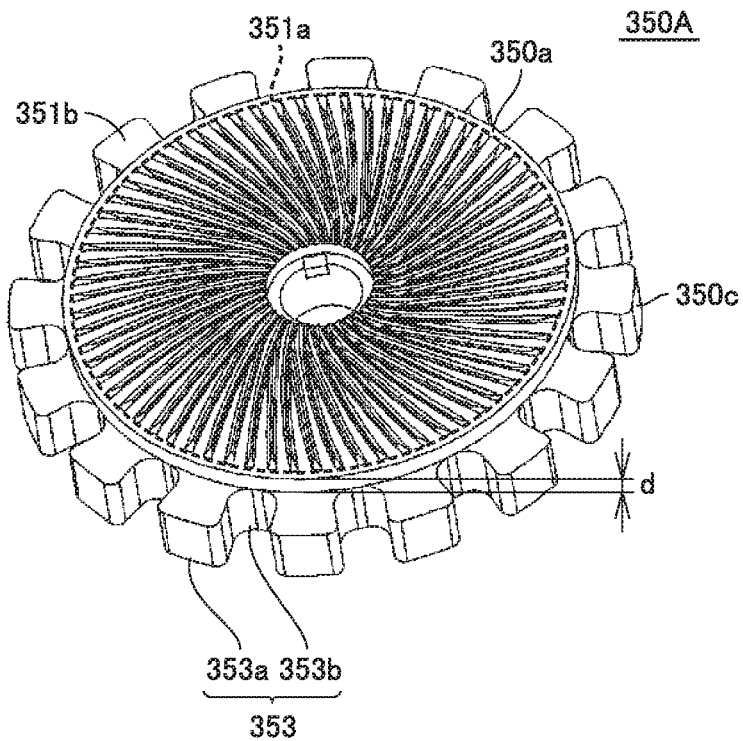
FIG. 15 is a perspective view showing a side of a grinding surface of a lower mill provided in a mill according to Embodiment 2.
Figure 16:
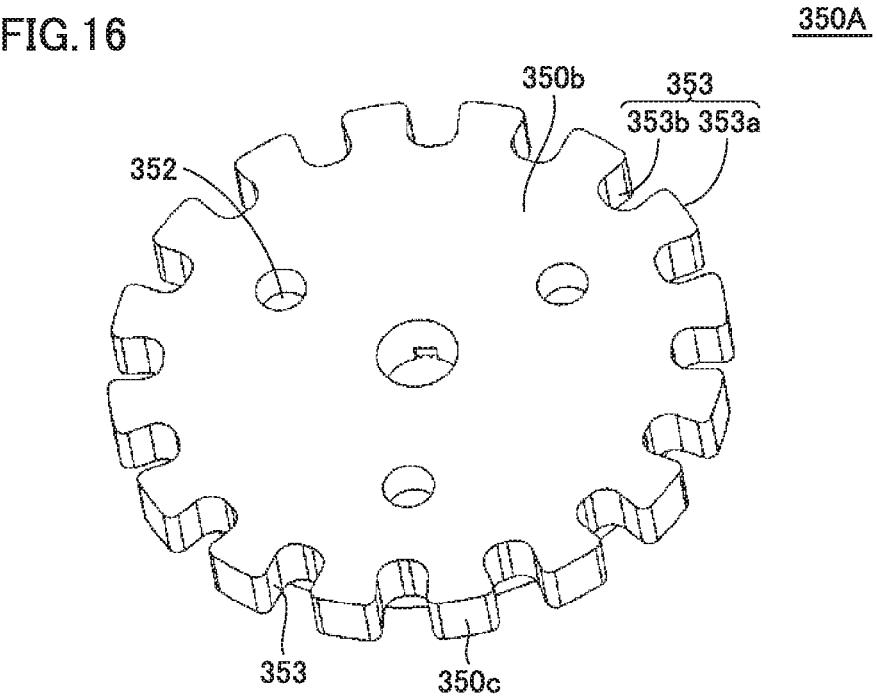
FIG. 16 is a perspective view showing a side opposite to the side of the grinding surface of the lower mill shown in FIG. 15.

A heat radiation mechanism according to the present embodiment will be described with reference to FIGS. 15 and 16. FIG. 15 is a perspective view showing a side of a grinding surface of a lower mill provided in a mill according to the present embodiment. FIG. 16 is a perspective view showing a side opposite to the side of the grinding surface of the lower mill shown in FIG. 15.

In the present embodiment as well, the plurality of projection and recess portions 353 provided in circumferential surface 350c of a lower mill 350A function as the heat radiation mechanism. Lower mill 350A according to the present embodiment is different from lower mill 350 according to Embodiment 1 in that a height difference d is provided between grinding region 351a and outer circumferential region 351b. The construction is otherwise substantially the same.

Outer circumferential region 351b is provided not to be in contact with main surface 360a (see FIG. 10) of upper mill 360. Outer circumferential region 351b is provided to substantially be flat and provided to be generally closer to main surface 350b than grinding region 351a.

With such a construction, since an area of contact between lower mill 350 and upper mill 360 can be made smaller, a quantity of friction heat generated between upper mill 360 and lower mill 350A in grating of tea leaves can be decreased. Thus, the mill according to the present embodiment obtains an effect as high as or higher than the effect of mill 2 according to Embodiment 1.

Embodiment 3

Figure 17:
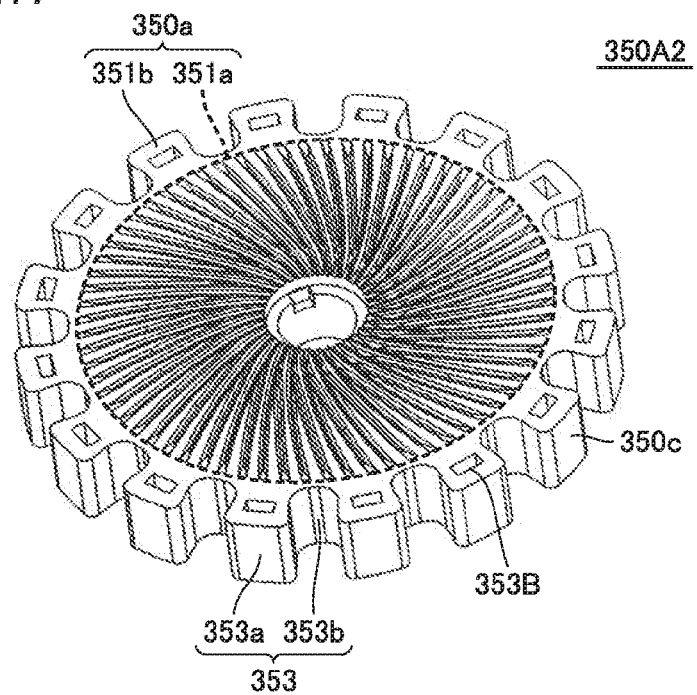
FIG. 17 is a perspective view showing a side of a grinding surface of a lower mill provided in a mill according to Embodiment 3.
Figure 18:
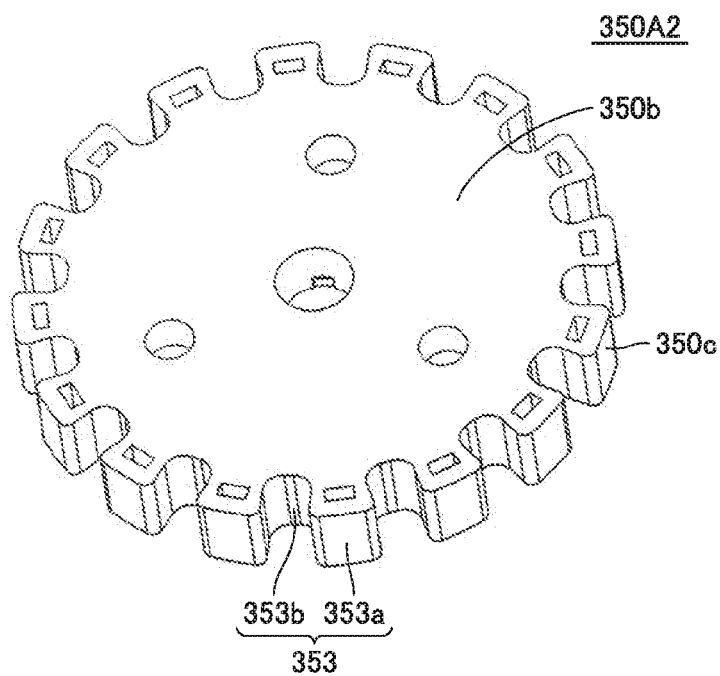
FIG. 18 is a perspective view showing a side opposite to the side of the grinding surface of the lower mill shown in FIG. 17.

A heat radiation mechanism according to the present embodiment will be described with reference to FIGS. 17 and 18. FIG. 17 is a perspective view showing a side of a grinding surface of a lower mill provided in a mill according to the present embodiment. FIG. 18 is a perspective view showing a side opposite to the side of the grinding surface of the lower mill shown in FIG. 17.

In the present embodiment, the plurality of projection and recess portions 353 provided in a lower mill 350A2 and a plurality of through holes 353B function as the heat radiation mechanism. Lower mill 350A2 according to the present embodiment is different from lower mill 350 according to Embodiment 1 in that a plurality of through holes 353B are provided.

The plurality of through holes 353B are provided in respective projection portions 353b. The plurality of through holes 353B are provided to pass from main surface 350a to a main surface 350b located opposite to main surface 350a. Though the plurality of through holes 353B are each in a shape, for example, of a quadrangular prism, they are not limited to being in such a shape but may be in various shapes like a post such as a prism or a column.

With such a construction, a surface area can further be increased as compared with lower mill 350 according to Embodiment 1. Thus, the mill according to the present embodiment obtains an effect as high as or higher than the effect of mill 2 according to Embodiment 1.

Embodiment 4

Figure 19:
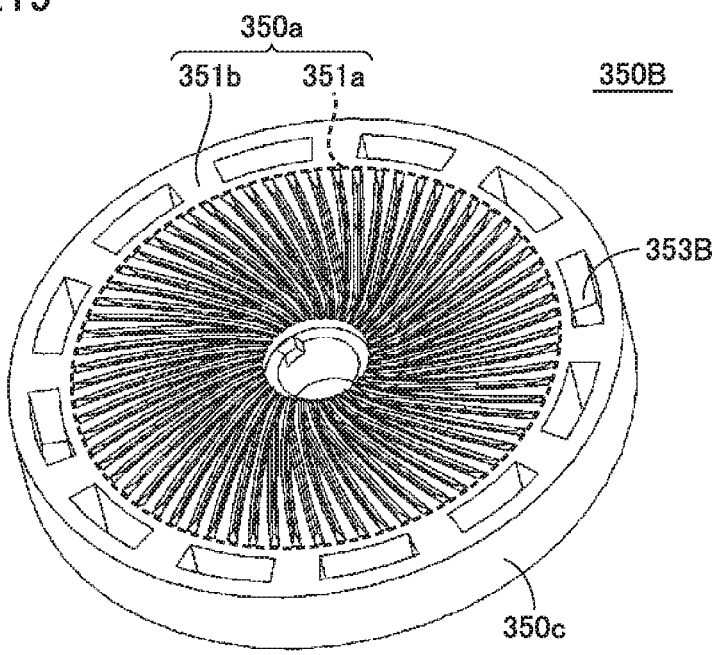
FIG. 19 is a perspective view showing a side of a grinding surface of a lower mill provided in a mill according to Embodiment 4.
Figure 20:
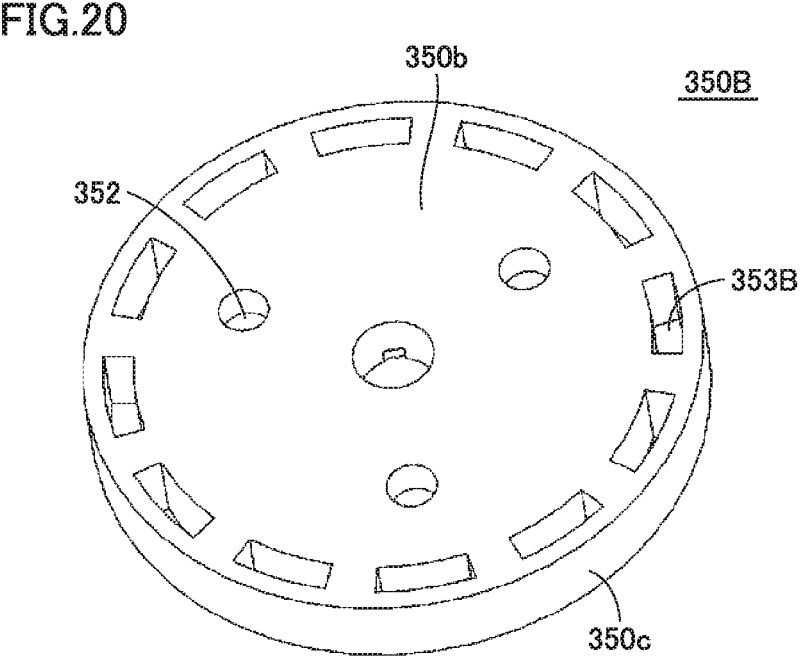
FIG. 20 is a perspective view showing a side opposite to the side of the grinding surface of the lower mill shown in FIG. 19.

A heat radiation mechanism according to the present embodiment will be described with reference to FIGS. 19 and 20. FIG. 19 is a perspective view showing a side of a grinding surface of a lower mill provided in a mill according to the present embodiment. FIG. 20 is a perspective view showing a side opposite to the side of the grinding surface of the lower mill shown in FIG. 19.

In the present embodiment, through holes 353B provided in a lower mill 350B function as the heat radiation mechanism. Lower mill 350B according to the present embodiment is different from lower mill 350 according to Embodiment 1 in that a recess portion and a projection portion are not formed in circumferential surface 350c but a plurality of through holes 353B are provided. The construction is otherwise substantially the same.

The plurality of through holes 353B are provided along the circumferential direction of lower mill 350B at a distance from each other. The plurality of through holes 353B are provided to pass from main surface 350a to main surface 350b located opposite to main surface 350a.

Through hole 353B has a shape like such a post that a bottom surface is in a shape of a belt which is development of a side surface of a frustum. The shape of through hole 353B is not limited to a shape like a post as above, but various shapes like a post such as a column or a prism or various shapes like a frustum can be adopted.

With such a construction, in lower mill 350B according to the present embodiment as well, a surface area of lower mill 350B can be increased as compared with a mill in a shape of a column similarly to lower mill 350 according to Embodiment 1. Thus, it is no longer necessary to separately employ a cooling apparatus such as a cooling fan, thermal conductivity of lower mill 350B can be improved with a simplified construction, and friction heat generated between upper mill 360 and lower mill 350B can efficiently be radiated also in the mill according to the present embodiment.

In the present embodiment, grated tea leaf powders can be discharged downward through through hole 353B, not from the outer circumference of lower mill 350B. Thus, for example, even when a part of the outer circumference of the mill is exposed to outside air for heat radiation or to wind from a separately provided cooling fan, tea leaf powders can be discharged downward without being scattered.

Embodiment 5

Figure 21:
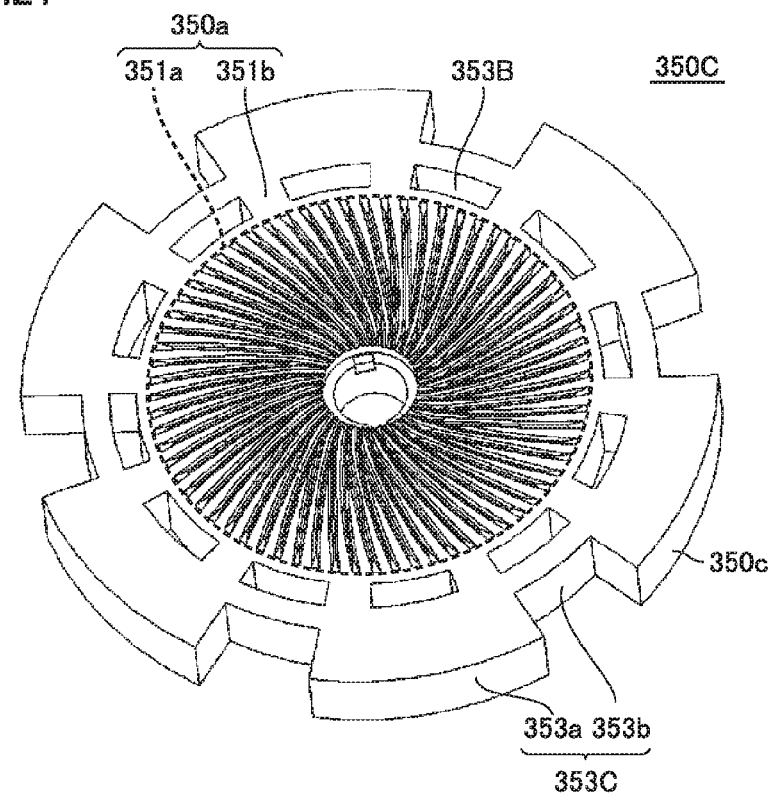
FIG. 21 is a perspective view showing a side of a grinding surface of a lower mill provided in a mill according to Embodiment 5.
Figure 22:
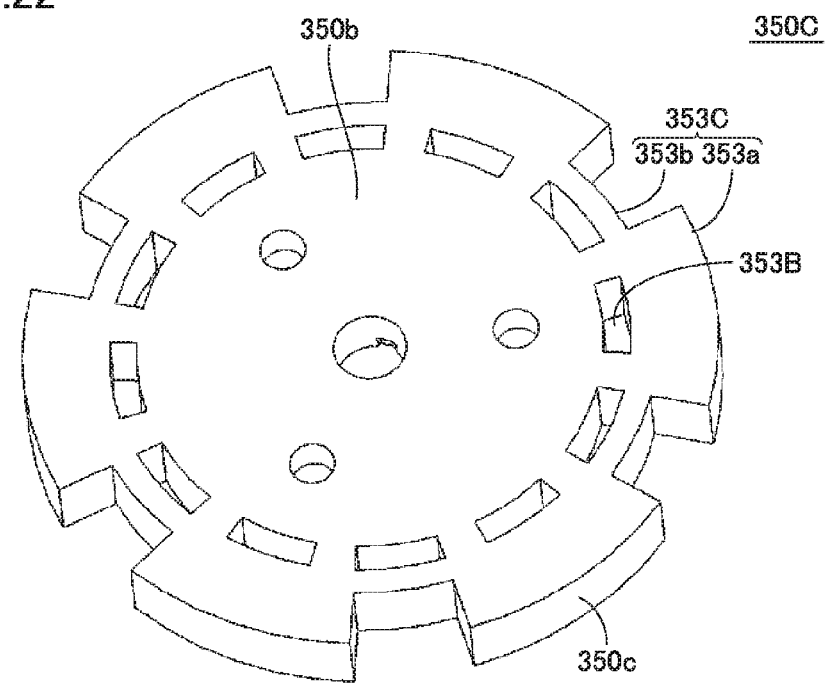
FIG. 22 is a perspective view showing a side opposite to the side of the grinding surface of the lower mill shown in FIG. 21.

A heat radiation mechanism according to the present embodiment will be described with reference to FIGS. 21 and 22. FIG. 21 is a perspective view showing a side of a grinding surface of a lower mill provided in a mill according to the present embodiment. FIG. 22 is a perspective view showing a side opposite to the side of the grinding surface of the lower mill shown in FIG. 21.

In the present embodiment, through holes 353B and a plurality of projection and recess portions 353 function as the heat radiation mechanism. A lower mill 350C according to the present embodiment is different from lower mill 350B according to Embodiment 4 in that outer circumferential region 351b is increased in diameter and a plurality of projection and recess portions 353C are provided in circumferential surface 350c.

Circumferential surface 350c has a projecting and recessed shape, with projection portions 353a and recess portions 353b being repeatedly provided in the circumferential direction of lower mill 350C. A length of projection portion 353a along the circumferential direction of lower mill 350C at a prescribed position in the radial direction of lower mill 350C is longer than a length of recess portion 353b along the circumferential direction of lower mill 350C.

Relation of a length between projection portion 353a and recess portion 353b along the circumferential direction of lower mill 350C is not limited to the above. A length of projection portion 353a along the circumferential direction of lower mill 350C at a prescribed position in the radial direction of lower mill 350C may be shorter than a length of recess portion 353b along the circumferential direction of lower mill 350C, or a length of projection portion 353a along the circumferential direction of lower mill 350C may be equal to a length of recess portion 353b along the circumferential direction of lower mill 350C.

Through hole 353B is provided on an inner side relative to a bottom portion of recess portion 353b and on an outer side relative to grinding region 351a.

Thus, in the present embodiment, through hole 353B is provided in outer circumferential region 351b and a plurality of projection and recess portions 353C are provided in circumferential surface 350c, so that a surface area of lower mill 350C can further be increased as compared with lower mill 350B according to Embodiment 4. As projection and recess portion 353C is provided in circumferential surface 350c, an upward air flow can be produced. Therefore, the mill according to the present embodiment can radiate friction heat more efficiently than the mill according to Embodiment 4.

Embodiment 6

Figure 23:
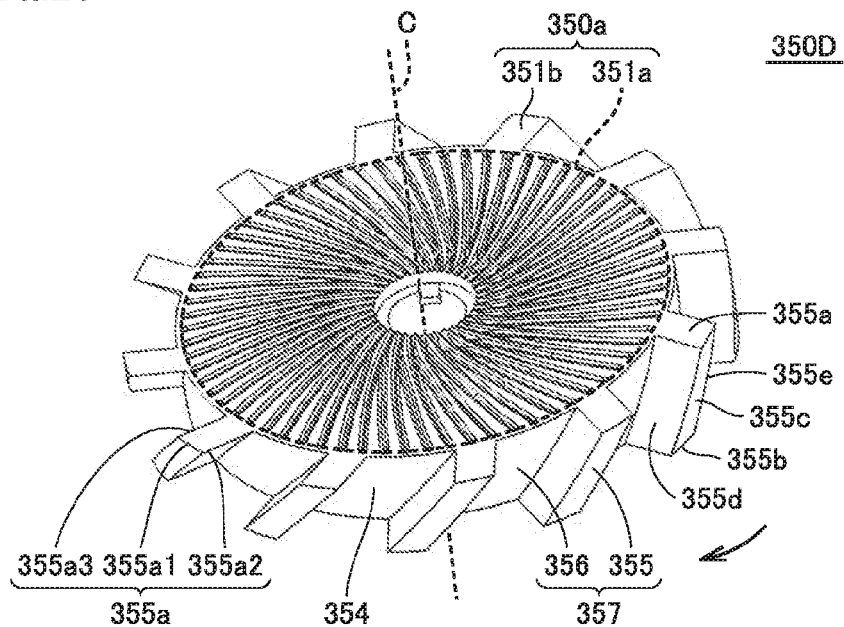
FIG. 23 is a perspective view showing a side of a grinding surface of a lower mill provided in a mill according to Embodiment 6.
Figure 24:
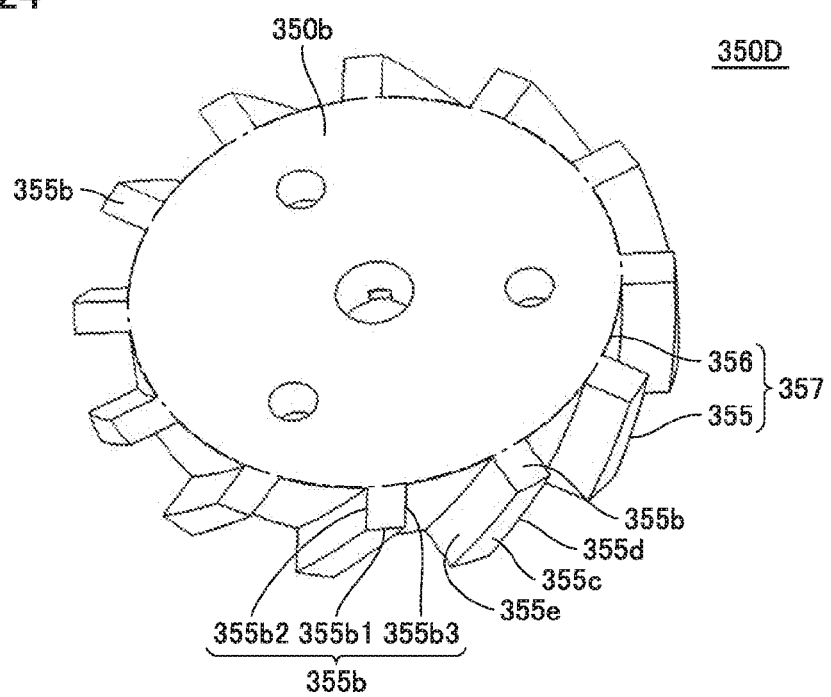
FIG. 24 is a perspective view showing a side opposite to the side of the grinding surface of the lower mill shown in FIG. 23.

A heat radiation mechanism according to the present embodiment will be described with reference to FIGS. 23 and 24. FIG. 23 is a perspective view showing a side of a grinding surface of a lower mill provided in a mill according to the present embodiment. FIG. 24 is a perspective view showing a side opposite to the side of the grinding surface of the lower mill shown in FIG. 23.

In the present embodiment, a projection and recess portion 357 provided in circumferential surface 350c of a lower mill 350D functions as the heat radiation mechanism. Projection and recess portion 357 is formed by providing a blade portion 355. Blade portion 355 is provided to protrude radially outward from a circumferential surface 354 of a columnar body, with circumferential surface 354 of the columnar body including the circumferential surface portion at which a distance from central axis C which is the center of rotation of lower mill 350D to circumferential surface 350c is shortest being defined as the reference. A recess portion 356 is provided between blade portions 355 adjacent in the circumferential direction of lower mill 350D.

Blade portion 355 serves to efficiently produce a current upward as lower mill 350D rotates in a direction of rotation shown with an arrow in the figure. Blade portion 355 has an upper surface 355a, a bottom surface 355b, a first side surface 355c, a second side surface 355d, and a third side surface 355e.

Upper surface 355a is provided to protrude radially outward from grinding region 351a. Bottom surface 355b is provided to protrude radially outward from a portion of main surface 350b which is opposed to grinding region 351a. Bottom surface 355b is provided to locate on a front side in a direction of rotation relative to upper surface 355a when viewed in a direction of central axis C. Upper surface 355a and bottom surface 355b have, for example, a substantially rectangular shape. The shape of upper surface 355a and bottom surface 355b is not limited to the substantially rectangular shape but it can be modified as appropriate.

First side surface 355c connects a side portion 355a1 of upper surface 355a located on a radially outer side of lower mill 350D and a side portion 355b1 of bottom surface 355b located on the radially outer side.

Second side surface 355d connects a side portion 355a3 of upper surface 355a located on the front side in the direction of rotation and a side portion 355b3 of bottom surface 355b located on the front side in the direction of rotation to each other. Second side surface 355d is inclined or curved toward below as advancing in the direction of rotation of lower mill 350D.

Third side surface 355e connects a side portion 355a2 of upper surface 355a located on a rear side in the direction of rotation and a side portion 355b2 of bottom surface 355b located on the rear side in the direction of rotation to each other.

When lower mill 350D rotates in the direction of rotation, air moves upward along second side surface 355d. Thus, an upward air flow can efficiently be produced. Consequently, heat radiated from lower mill 350D can escape upward.

Thus, by efficiently producing an upward air flow with the use of blade portion 355 with projection and recess portion 357 being provided in circumferential surface 350c, the mill according to the present embodiment obtains an effect as high as or higher than the effect of the mill according to Embodiment 1.

Embodiment 7

Figure 25:
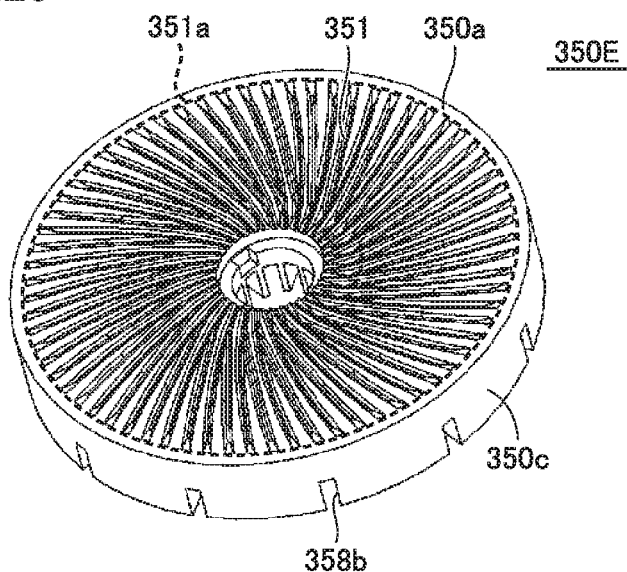
FIG. 25 is a perspective view showing a side of a grinding surface of a lower mill provided in a mill according to Embodiment 7.
Figure 26:
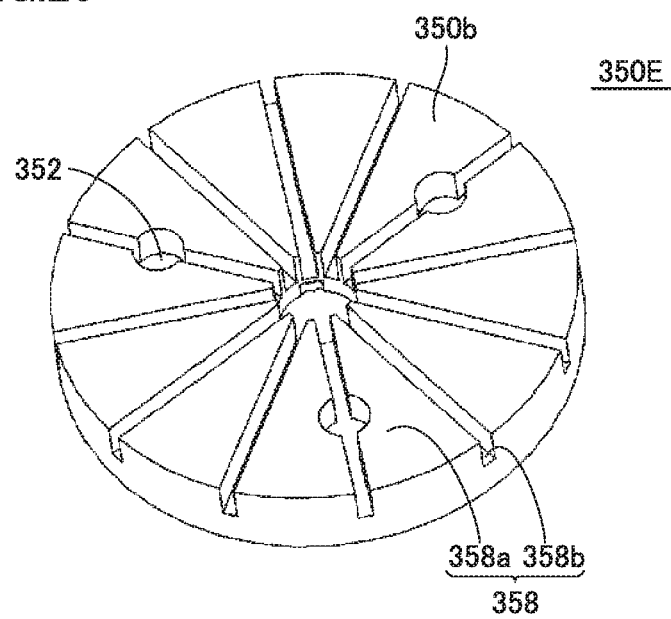
FIG. 26 is a perspective view showing a side opposite to the side of the grinding surface of the lower mill shown in FIG. 25.

A heat radiation mechanism according to the present embodiment will be described with reference to FIGS. 25 and 26. FIG. 25 is a perspective view showing a side of a grinding surface of a lower mill provided in a mill according to the present embodiment. FIG. 26 is a perspective view showing a side opposite to the side of the grinding surface of the lower mill shown in FIG. 25.

In the present embodiment, a projection and recess portion 358 provided in main surface 350b located opposite to main surface 350a which is opposed to upper mill 360 functions as the heat radiation mechanism. A lower mill 350E according to the present embodiment is different from lower mill 350 according to Embodiment 1 in that a projection and recess portion is not provided in circumferential surface 350c but projection and recess portion 358 is provided in main surface 350b.

In lower mill 350E, a most part of main surface 350a is occupied by grinding region 351a. In lower mill 350E, projection and recess portion 358 is provided in main surface 350b in such a manner that a plurality of linear groove portions 358b are provided to radially extend from a radially inner side toward a radially outer side of main surface 350b on a side of main surface 350b located opposite to main surface 350a which is opposed to upper mill 360.

A projection portion 358a is a portion located between groove portions 358b adjacent in a circumferential direction of lower mill 350E. Projection portion 358a protrudes from a bottom portion in a direction away from upper mill 360 (downward) with the bottom portion of groove 358b being defined as the reference.

With such a construction, a surface area is increased in lower mill 350E according to the present embodiment as compared with a lower mill in a shape of a columnar body. Thus, in the mill according to the present embodiment, it is no longer necessary to separately employ a cooling apparatus such as a cooling fan, thermal conductivity of lower mill 350E can be improved with a simplified construction, and friction heat generated between upper mill 360 and lower mill 350E can efficiently be radiated.

Embodiment 8

Figure 27:
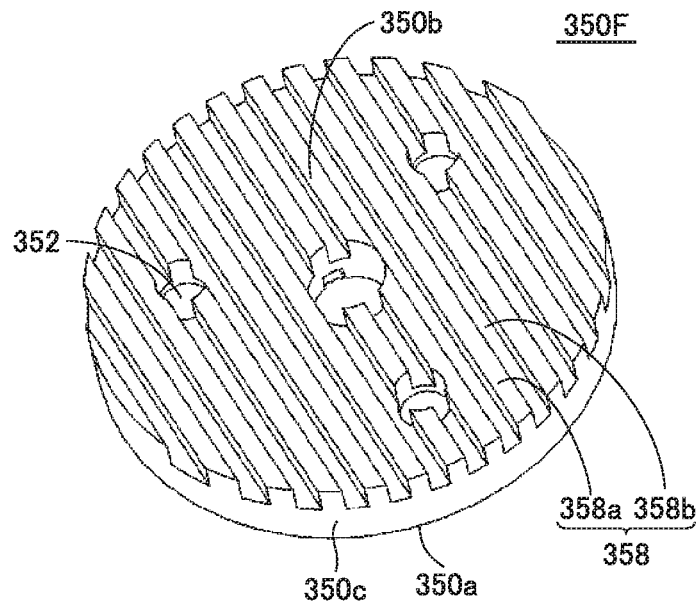
FIG. 27 is a perspective view showing a side opposite to a side of a grinding surface of a lower mill provided in a mill according to Embodiment 8.

A heat radiation mechanism according to the present embodiment will be described with reference to FIG. 27. FIG. 27 is a perspective view showing a side opposite to a side of a grinding surface of a lower mill provided in a mill according to the present embodiment.

In the present embodiment as well, projection and recess portion 358 provided in main surface 350b located opposite to main surface 350a opposed to upper mill 360 functions as the heat radiation mechanism. A lower mill 350F according to the present embodiment is different from lower mill 350E according to Embodiment 7 in that projection and recess portion 358 is provided in main surface 350b in such a manner that a plurality of groove portions 358b are provided at a distance from each other as extending in a prescribed direction on a side of main surface 350b located opposite to main surface 350a opposed to upper mill 360. The construction is otherwise substantially the same.

With such a construction as well, a surface area of lower mill 350F is increased as compared with a lower mill in a form of a columnar body. Thus, the mill according to the present embodiment also obtains an effect substantially the same as the effect of the mill according to Embodiment 7.

Embodiment 9

Figure 28:
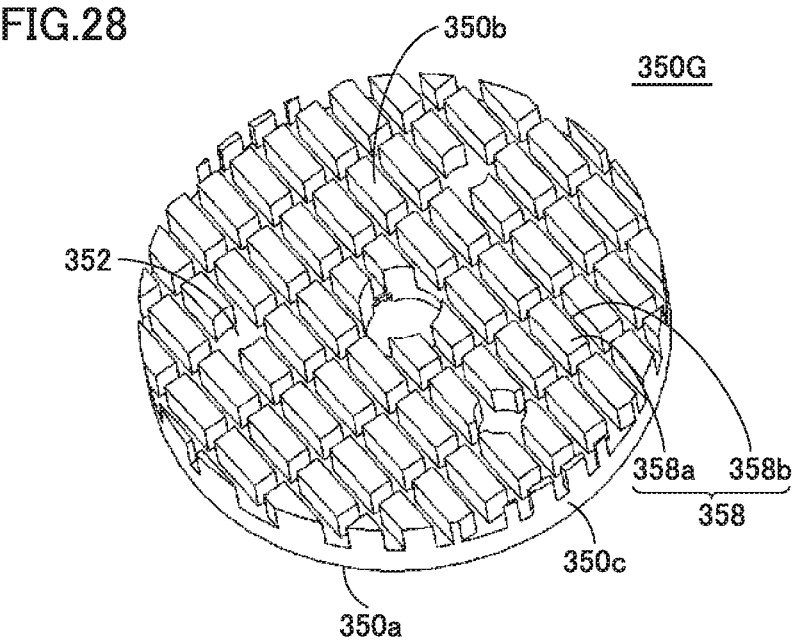
FIG. 28 is a perspective view showing a side opposite to a side of a grinding surface of a lower mill provided in a mill according to Embodiment 9.

A heat radiation mechanism according to the present embodiment will be described with reference to FIG. 28. FIG. 28 is a perspective view showing a side opposite to a side of a grinding surface of a lower mill provided in a mill according to the present embodiment.

In the present embodiment as well, projection and recess portion 358 provided in main surface 350b located opposite to main surface 350a opposed to upper mill 360 functions as the heat radiation mechanism. A lower mill 350G according to the present embodiment is different from lower mill 350E according to Embodiment 7 in that projection and recess portion 358 is provided in main surface 350b in such a manner that a plurality of groove portions 358b are provided in grids on a side of main surface 350b located opposite to main surface 350a opposed to upper mill 360. The construction is otherwise substantially the same.

With such a construction as well, a surface area of lower mill 350G is increased as compared with a lower mill in a form of a columnar body. Thus, the mill according to the present embodiment also obtains an effect substantially the same as the effect of the mill according to Embodiment 7.

Embodiment 10

Figure 29:
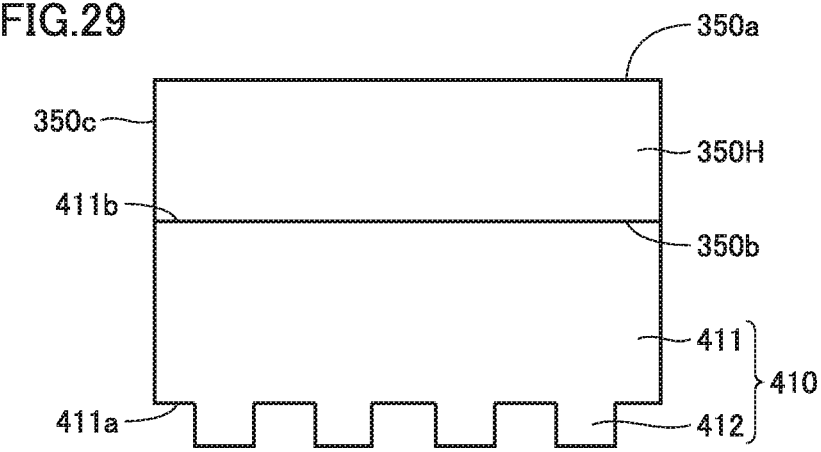
FIG. 29 is a schematic cross-sectional view showing a lower mill and a heat radiation member provided in a mill according to Embodiment 10.

A heat radiation mechanism according to the present embodiment will be described with reference to FIG. 29. FIG. 29 is a schematic cross-sectional view showing a lower mill and a heat radiation member provided in a mill according to the present embodiment.

In the present embodiment, a heat radiation member 410 fixed to main surface 350b of a lower mill 350H located opposite to main surface 350a opposed to upper mill 360 functions as the heat radiation mechanism. Lower mill 350H is in a shape, for example, of a substantially columnar body and no projection and recess portion is provided in circumferential surface 350c and main surface 350b.

Heat radiation member 410 is formed, for example, from a heat radiation fin, and includes a disc-shaped base portion 411 and a plurality of fin portions 412. Base portion 411 has a pair of main surfaces 411a and 411b which are opposed to each other. Main surface 411b is fixed to lower mill 350b.

The plurality of fin portions 412 are provided to protrude downward from main surface 411a of base portion 411 located opposite to main surface 411b. Heat radiation member 410 is formed from a member which is highly thermally conductive and suitably from a member made of a metal represented by aluminum or an alloy thereof.

A highly thermally conductive sheet and/or grease which are/is not shown are/is interposed between main surface 350b of lower mill 350H and main surface 411b of base portion 411. Thus, friction heat generated by lower mill 350H and upper mill 360 is efficiently transmitted to heat radiation member 410. Heat transmitted to heat radiation member 410 is radiated from fin portion 412 to a space located around the same. Thus, a temperature of lower mill 350H and upper mill 360 is prevented from reaching a high temperature as high as or higher than a certain temperature and tea leaf powders can be produced without losing a flavor of tea leaves.

By thus providing heat radiation member 410, in the mill according to the present embodiment, it is no longer necessary to separately employ a cooling apparatus such as a cooling fan, and friction heat generated between upper mill 360 and lower mill 350H can efficiently be radiated with a simplified construction through heat radiation member 410 high in thermal conductivity.

Embodiment 11

Figure 30:
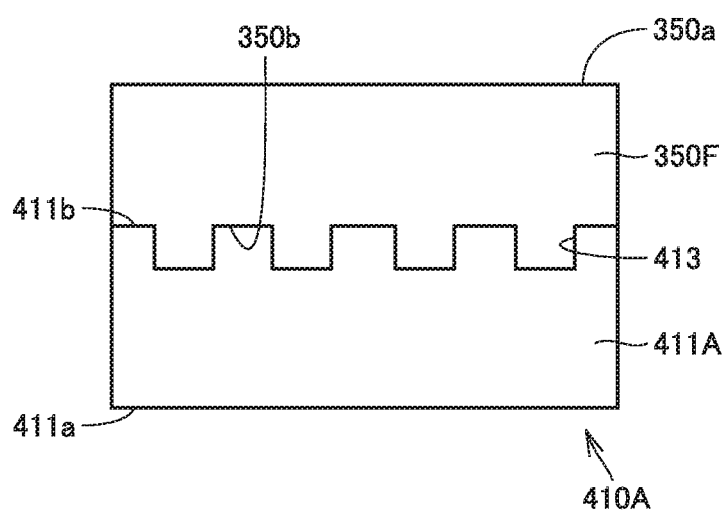
FIG. 30 is a schematic cross-sectional view showing a lower mill and a heat radiation member provided in a mill according to Embodiment 11.

A heat radiation mechanism according to the present embodiment will be described with reference to FIG. 30. FIG. 30 is a schematic cross-sectional view showing a lower mill and a heat radiation member provided in a mill according to the present embodiment.

In the present embodiment as well, a heat radiation member 410A fixed to main surface 350b of lower mill 350F functions as the heat radiation mechanism. The present embodiment is different from Embodiment 10 in a shape of lower mill 350F and a shape of heat radiation member 410A. The construction is otherwise substantially the same.

Lower mill 350F according to the present embodiment is similar in shape to lower mill 350F according to Embodiment 8 and provided with a projection and recess portion in main surface 350b. Heat radiation member 410A is formed, for example, from a heat radiation block 411A. Heat radiation block 411A is substantially in a disc shape and has a pair of main surfaces 411a and 411b which are opposed to each other. Heat radiation block 411A is formed from a member excellent in heat conduction and suitably from a block made of a metal represented by aluminum or an alloy thereof.

Main surface 411b of heat radiation block 411A is provided with a projection and recess portion 413 fitted into a projection and recess portion provided in main surface 350b of lower mill 350F. Heat radiation member 410A is fixed to main surface 350b of lower mill 350F with the projection and recess portion provided in main surface 350b of lower mill 350F being fitted into projection and recess portion 413 provided in main surface 411b of heat radiation block 411A. By thus fitting heat radiation member 410A and lower mill 350F to each other by means of projections and recesses, heat radiation member 410A can further securely be fixed to lower mill 350F. A highly thermally conductive sheet and/or grease which are/is not shown are/is interposed between main surface 350b of lower mill 350F and main surface 411b of heat radiation block 411A.

By fitting heat radiation member 410A and lower mill 350F to each other by means of projections and recesses, an area of contact between heat radiation member 410A and lower mill 350F can be increased. Thus, friction heat generated by lower mill 350F and upper mill 360 can more efficiently be transmitted to heat radiation member 410A. Heat transmitted to heat radiation member 410A is radiated from main surface 411a of heat radiation block 411A and a circumferential surface into a space located around the same.

By thus providing heat radiation member 410A, the mill according to the present embodiment obtains an effect substantially the same as the effect of the mill according to Embodiment 10.

Embodiment 12

A heat radiation mechanism according to the present embodiment will be described with reference to FIG. 31.

Figure 31:
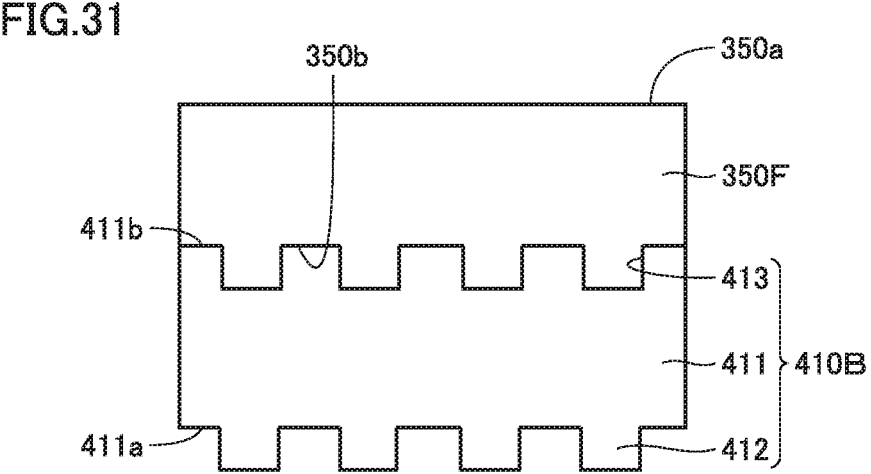
FIG. 31 is a schematic cross-sectional view showing a lower mill and a heat radiation member provided in a mill according to Embodiment 12.

FIG. 31 is a schematic cross-sectional view showing a lower mill and a heat radiation member provided in a mill according to the present embodiment.

In the present embodiment as well, a heat radiation member 410B fixed to main surface 350b of lower mill 350F functions as the heat radiation mechanism. The present embodiment is different from Embodiment 10 in a shape of lower mill 350F and a shape of heat radiation member 410B.

Lower mill 350F according to the present embodiment is similar in shape to lower mill 350F according to Embodiment 8 and provided with a projection and recess portion in main surface 350b. Heat radiation member 410B is formed, for example, from a heat radiation fin, and is different from heat radiation member 410 according to Embodiment 10 in that main surface 411b of base portion 411 is provided with a projection and recess portion which is fitted into a projection and recess portion provided in main surface 350b of lower mill 350F.

With such a construction, as lower mill 350F and heat radiation member 410B are fitted to each other by means of projections and recesses, an area of contact between lower mill 350F and heat radiation member 410B can be increased. Thus, in the mill according to the present embodiment, friction heat can more efficiently be transmitted to heat radiation member 410B than in the mill according to Embodiment 10. Therefore, the mill according to the present embodiment obtains an effect as high as or higher than the effect of the mill according to Embodiment 10.

(Verification Experiment)

Figure 32:
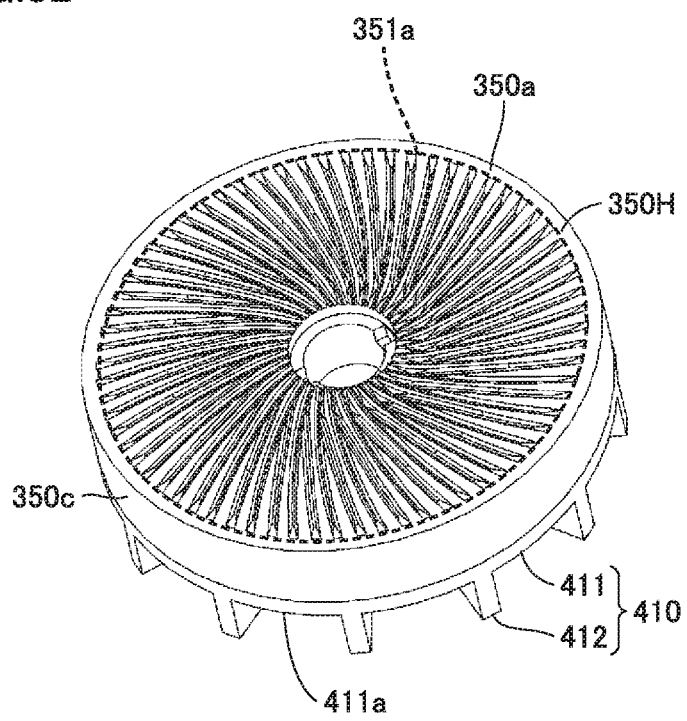
FIG. 32 is a perspective view showing the lower mill and the heat radiation member used in a verification experiment conducted for confirming an effect of the present invention from a side of a grinding surface of the lower mill.
Figure 33:
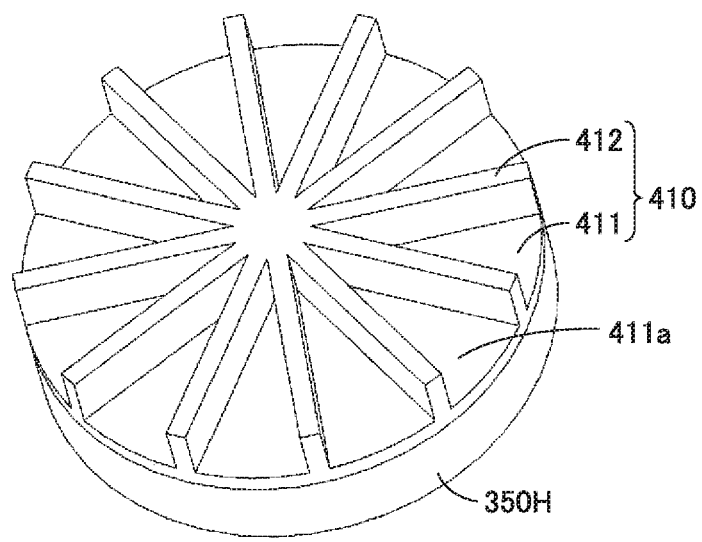
FIG. 33 is a perspective view showing the lower mill and the heat radiation member shown in FIG. 32 from a side of the heat radiation member.
Figure 34:
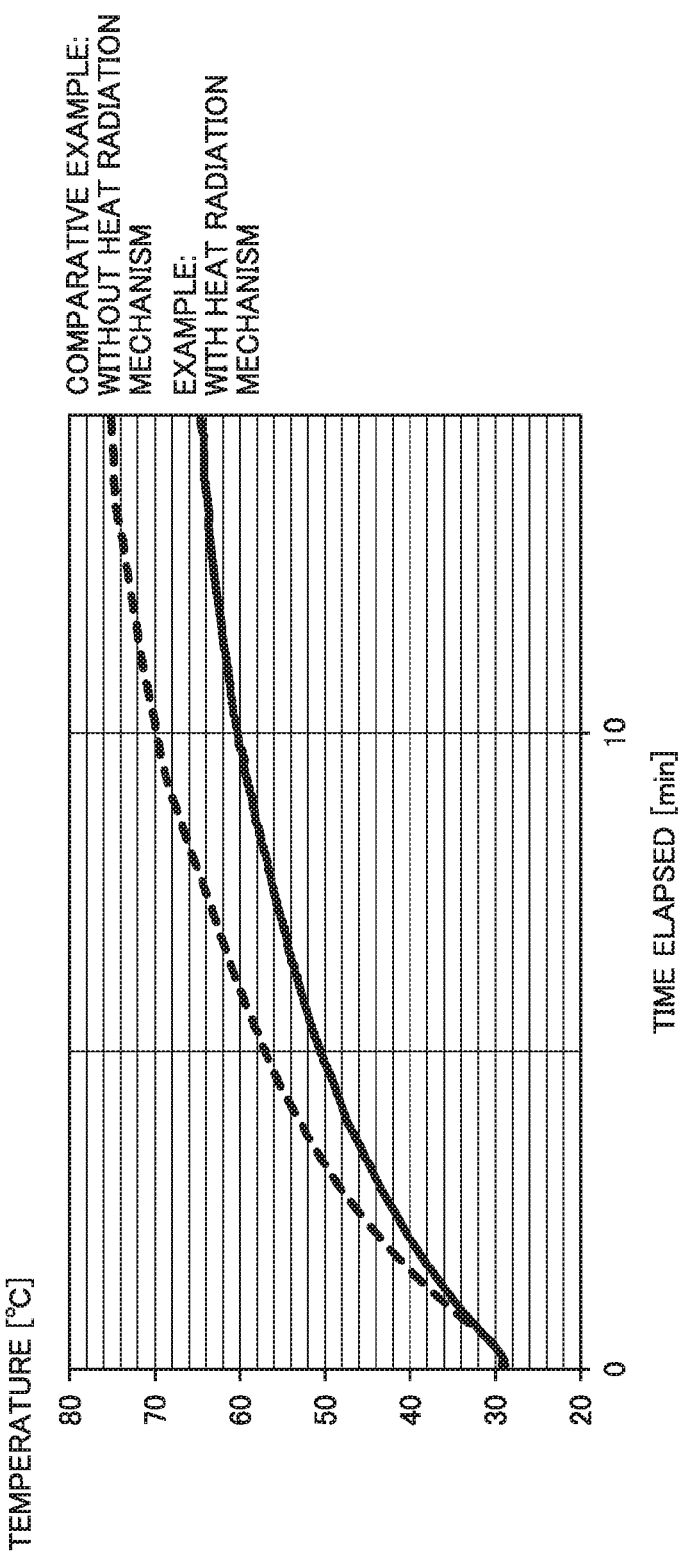
FIG. 34 is a diagram showing a result of the verification experiment conducted for confirming an effect of the present invention.

Verification experiments conducted for confirming an effect of the present invention will be described with reference to FIGS. 32 to 34. FIG. 32 is a perspective view showing the lower mill and the heat radiation member used in the verification experiment conducted for confirming the effect of the present invention from the side of the grinding surface of the lower mill. FIG. 33 is a perspective view showing the lower mill and the heat radiation member shown in FIG. 32 from a side of the heat radiation member. FIG. 34 is a diagram showing a result of the verification experiment conducted for confirming the effect of the present invention.

In the present verification experiment, a mill substantially equivalent in construction to Embodiment 10 in which the heat radiation member was fixed to the lower mill was prepared as a mill according to Example. Specifically, as shown in FIGS. 32 and 33, in the mill according to Example, a plurality of fin portions 412 are provided to extend radially outward from the center of main surface 411a of base portion 411.

A mill without a heat radiation member or a heat radiation mechanism in a shape of projections and recesses was prepared as a mill in Comparative Example.

With the mill according to Example and the mill according to Comparative Example, a temperature of the lower mill at the time when the lower mill was rotated relatively to the upper mill was measured. The number of rotations of the lower mill was set to 150 rpm and a time period for rotation was set to 15 minutes.

As shown in FIG. 34, a temperature of the lower mill according to Example was lower than a temperature of the lower mill in Comparative Example throughout the rotation operation. When the lower mill was rotated for 15 minutes, a temperature of the lower mill according to Example was 65° C., whereas a temperature of the lower mill in Comparative Example was 75° C.

As set forth above, it was also experimentally confirmed that increase in temperature due to friction heat from the upper mill and the lower mill could efficiently be suppressed with a simplified construction by providing a heat radiation mechanism.

Though an example in which a heat radiation mechanism is provided in a lower mill has been illustrated and described in Embodiments 1 to 12 above, limitation thereto is not intended. The heat radiation mechanism may be provided in an upper mill or in both of the upper mill and the lower mill. When the heat radiation mechanism is provided in the upper mill, the heat radiation mechanism is provided in a portion of the upper mill other than the grinding region. Specifically, a projection and recess portion may be provided in a circumferential surface of the upper mill as the heat radiation mechanism, or a through hole may be provided in a portion except for the grinding region so as to pass through between a pair of main surfaces of the upper mill which are opposed to each other. Alternatively, a projection and recess portion may be provided as the heat radiation mechanism in a main surface located opposite to the main surface including the grinding region, of the pair of main surfaces of the upper mill which are opposed to each other, or a heat radiation member may be fixed to the main surface located opposite to the main surface including the grinding region. When the heat radiation mechanism is provided in any one of the upper mill and the lower mill, it is desirably provided in a mill which rotates because an effect of heat radiation is high.

Though an example in which the upper mill is fixed and the lower mill rotates has been illustrated and described in Embodiments 1 to 12 above, the lower mill may be fixed and the upper mill may rotate or the upper mill and the lower mill may rotate in directions different from each other.

Though beverage preparation apparatus 1 according to Embodiment 1 has been illustrated and described above as including mill 2 according to Embodiment 1, limitation thereto is not intended and the beverage preparation apparatus may include any of the mills according to Embodiments 2 to 12. The beverage preparation apparatus including any of the mills according to Embodiments 2 to 12 can also achieve efficient suppression of increase in temperature due to friction heat from the upper mill and the lower mill with a simplified construction.

Though an example in which a core provided in a central portion of the lower mill is formed from a resin member or a ceramic material has been illustrated and described in Embodiments 1 and 12 above, limitation thereto is not intended and a core may be formed of a metal high in thermal conductivity. In this case, friction heat can also be radiated from the core.

Though an example in which the circumferential surface of the lower mill has a projection and recess portion with a part of the circumferential surface of the lower mill being recessed has been illustrated and described in Embodiments 1 to 4 above, the lower mill may include a first member in a shape of a post having a grinding region and a plurality of second members attached to a circumferential surface of the first member so as to protrude radially outward from the circumferential surface, so that the circumferential surface of the lower mill has a projecting and recessed shape. With the first member in a shape of a column having the grinding region and with an annular second member having an outer surface in a projecting and recessed shape being attached to the circumferential surface of the first member, the circumferential surface of the lower mill may have the projecting and recessed shape.

Though an example in which a heat radiation member is fixed to a main surface located opposite to a main surface including a grinding region, of a pair of main surfaces of the lower mill which are opposed to each other has been illustrated and described in Embodiments 10 to 12 above, limitation thereto is not intended. The heat radiation member may be fixed to the circumferential surface of the lower mill or may be fixed to the through hole described in Embodiments 3 to 5. The heat radiation member in a similar construction may be fixed to the circumferential surface of the upper mill or the through hole provided in the upper mill.

Embodiment 13

(Beverage Preparation Apparatus 1001)

Figure 35:
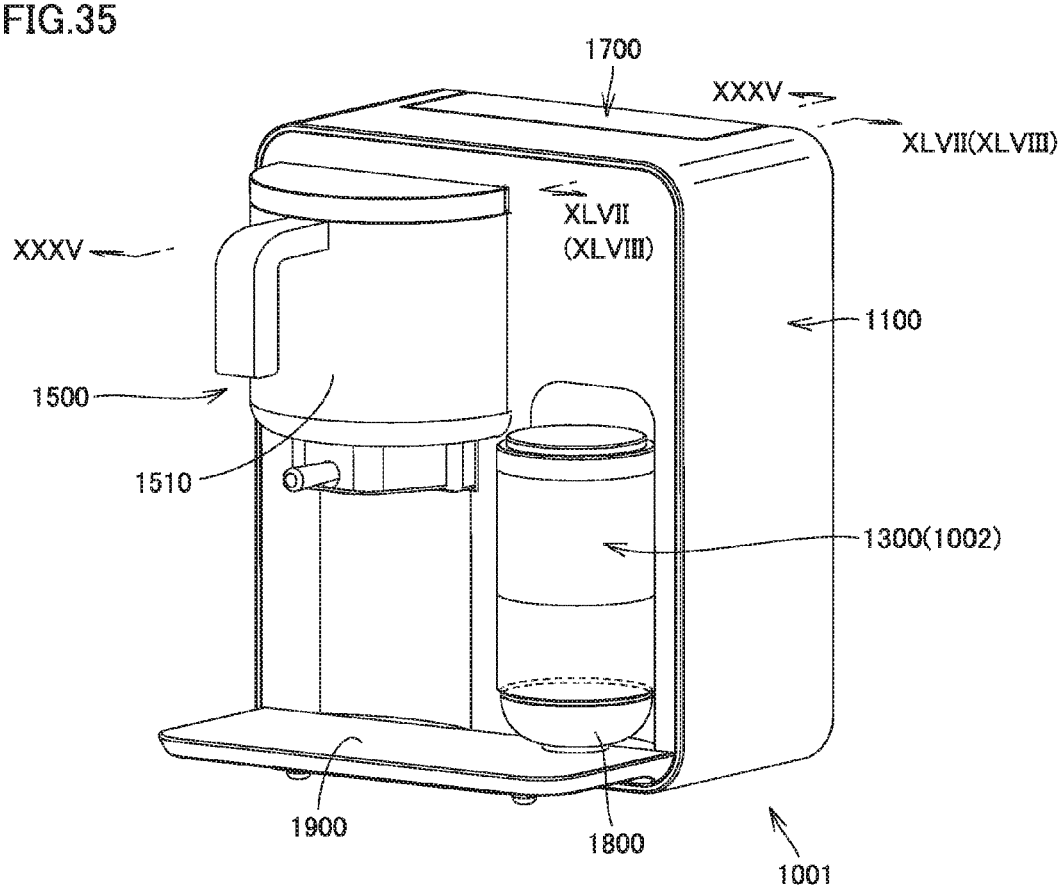
FIG. 35 is an overall perspective view of a beverage preparation apparatus including a grating apparatus according to Embodiment 13.
Figure 36:
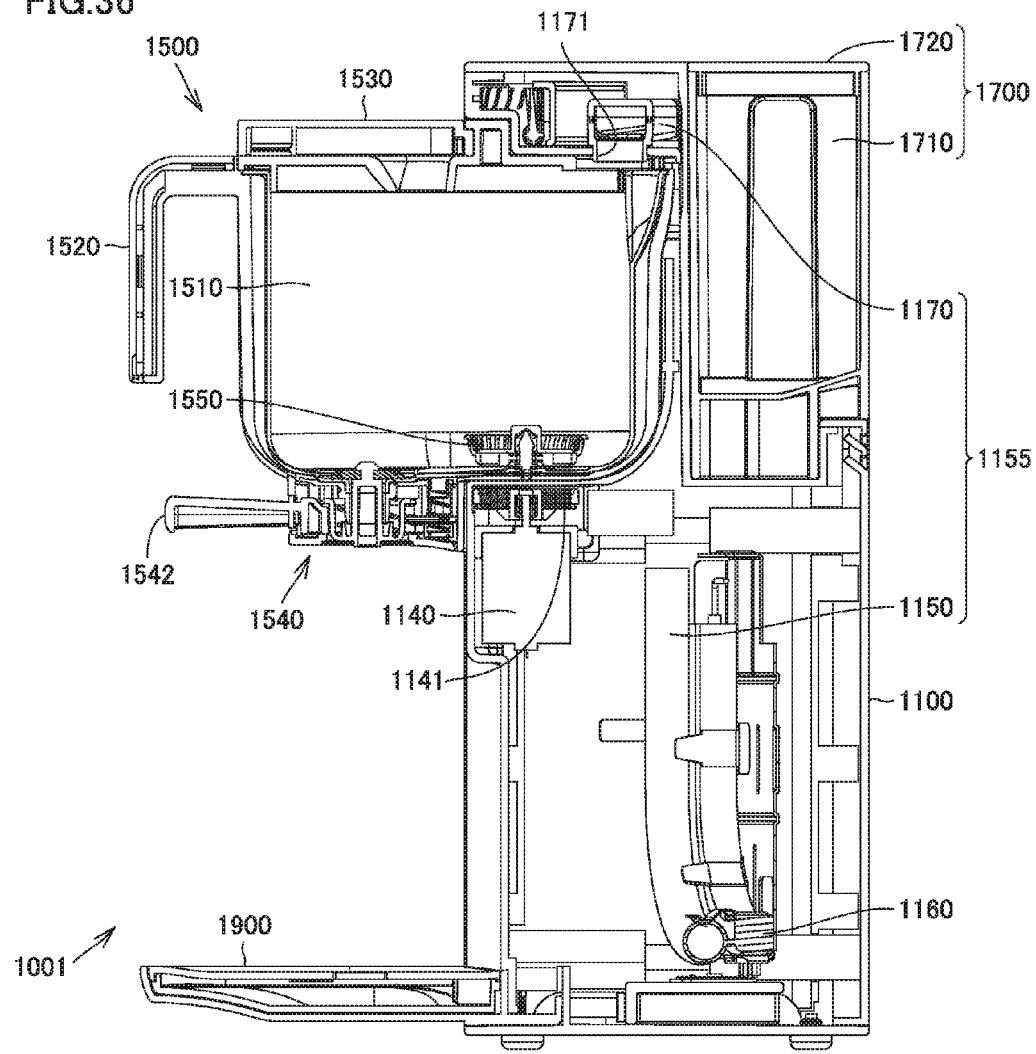
FIG. 36 is a cross-sectional view along the line XXXVI-XXXVI in FIG. 35.
Figure 37:
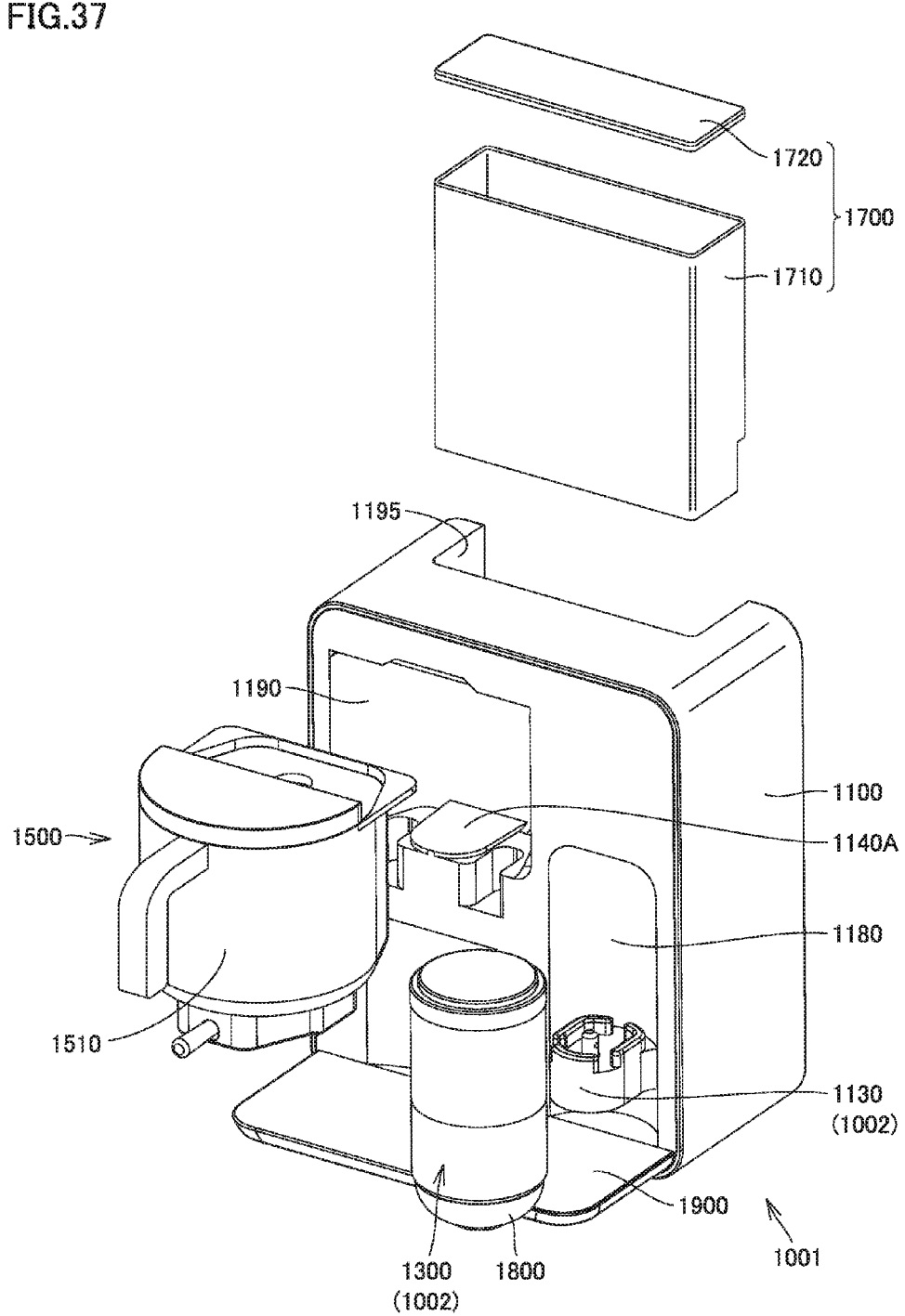
FIG. 37 is an overall perspective view showing a schematic component of the beverage preparation apparatus shown in FIG. 35.

A beverage preparation apparatus 1001 in the present embodiment will be described with reference to FIGS. 35 to 37. FIG. 35 is an overall perspective view of beverage preparation apparatus 1001, FIG. 36 is a cross-sectional view along the line XXXV-XXXV in FIG. 35, and FIG. 37 is an overall perspective view of a schematic component of beverage preparation apparatus 1001.

Beverage preparation apparatus 1001 uses tea leaves as an object to be grated and obtains tea leaf powders by grating the tea leaves. The beverage preparation apparatus uses the obtained tea leaf powders for preparing tea as a beverage. Beverage preparation apparatus 1001 includes an apparatus main body 1100 as a beverage preparation apparatus main body, a milling machine 1002 (see FIG. 48), an agitation unit 1500, a liquid storage tank 1700, a liquid supply path 1155 (see FIG. 36), a tea leaf powder tray 1800 as a powder reception portion, and a placement base 1900.

Milling machine 1002 includes a milling unit 1300 which mainly grates an object to be grated, a milling motor unit 1120 (see FIG. 41) as a drive portion for generating driving force, and a milling driving force transmission mechanism 1130 as a driving force transmission mechanism for transmitting driving force generated by milling motor unit 1120.

Placement base 1900 is provided to protrude forward on a front side in a lower portion of apparatus main body 1100 and a cup (not shown) and tea leaf powder tray 1800 can be placed thereon. Tea leaf powder tray 1800 is provided such that a user can move the tray by holding the tray. Tea leaf powder tray 1800 is formed from a member of a flame retardant resin such as an ABS resin.

(Milling Unit 1300)

Milling unit 1300 is removably attached to a milling unit attachment portion 1180 (see FIG. 37) provided on a front surface side of apparatus main body 1100. Milling unit 1300 is arranged, for example, at a distance from an agitation tank 1510 so as to be displaced from agitation tank 1510 below agitation tank 1510 included in agitation unit 1500 when viewed from the front.

Milling driving force transmission mechanism 1130 (see FIG. 37) is provided in milling unit attachment portion 1180 so as to protrude forward from a front surface of apparatus main body 1100. Milling unit 1300 is removably attached to a portion of milling driving force transmission mechanism 1130 which protrudes from the front surface of apparatus main body 1100. Milling unit 1300 obtains driving force for milling tea leaves representing an object to be grated by being coupled to milling driving force transmission mechanism 1130.

Tea leaves introduced from an upper portion of milling unit 1300 into milling unit 1300 are finely grated in milling unit 1300. The grated tea leaves are dropped and collected as tea leaf powders on tea leaf powder tray 1800 placed below milling unit 1300. A detailed structure of milling unit 1300 will be described later with reference to FIGS. 42 to 44.

(Liquid Storage Tank 1700)

Liquid storage tank 1700 is removably attached to a liquid storage tank attachment portion 1195 provided on an upper surface side of apparatus main body 1100. Liquid storage tank 1700 includes a tank main body 1710 having an opening in an upper surface and a lid portion 1720 closing the opening in the upper surface of tank main body 1710. Liquid storage tank 1700 stores such a liquid as water.

(Liquid Supply Path 1155)

Liquid supply path 1155 is accommodated in apparatus main body 1100. Liquid supply path 1155 is connected to liquid storage tank 1700 (see FIG. 41). Liquid supply path 1155 is provided with a supply port 1171 on a side opposite to a side where liquid storage tank 1700 is connected. Liquid supply path 1155 includes a hot water supply pipe 1150 and a hot water supply nozzle 1170. Hot water supply pipe 1150 has one end side connected to liquid storage tank 1700 and the other end side connected to hot water supply nozzle 1170. A liquid introduced from liquid storage tank 1700 into liquid supply path 1155 is supplied to agitation unit 1500 through hot water supply pipe 1150 and hot water supply nozzle 1170.

(Agitation Unit 1500)

Agitation unit 1500 includes an agitation blade 1550 for agitating a liquid and powders and agitation tank 1510 accommodating agitation blade 1550. Agitation tank 1510 is removably attached to an agitation tank attachment portion 1190 (see FIG. 37) provided on the front surface side of apparatus main body 1100. Agitation tank 1510 is attached to agitation tank attachment portion 1190 so as to protrude from apparatus main body 1100 in a direction intersecting with a vertical direction. Specifically, agitation tank 1510 is attached such that a part of agitation tank 1510 protrudes forward from a front surface of apparatus main body 1100.

An agitation motor contactless table 1140A is provided in agitation tank attachment portion 1190. Agitation unit 1500 is placed on agitation motor contactless table 1140A. Agitation blade 1550 provided in agitation unit 1500 is rotated by an agitation motor unit 1140 accommodated in apparatus main body 1100 so as to be located below agitation motor contactless table 1140A and a magnet 1141 coupled thereto.

Hot water supply nozzle 1170 is provided above agitation tank attachment portion 1190 of apparatus main body 1100. In apparatus main body 1100, a temperature of water in hot water supply pipe 1150 is raised to a prescribed temperature and hot water is supplied from hot water supply nozzle 1170 into agitation tank 1510. Hot water prepared in apparatus main body 1100 and tea leaf powders obtained by milling unit 1300 are introduced into agitation tank 1510, and hot water and tea leaf powders are agitated by agitation blade 1550 in agitation tank 1510. Tea is thus prepared in agitation tank 1510.

Tea prepared in agitation unit 1500 can be poured into a cup (not shown) placed on placement base 1900 by operating an operation lever 1542 of a discharge port opening and closing mechanism 1540 provided below agitation unit 1500. A detailed structure of agitation unit 1500 will be described later with reference to FIGS. 45 and 46.

(Flow of Preparation of Tea (Beverage))

Figure 38:
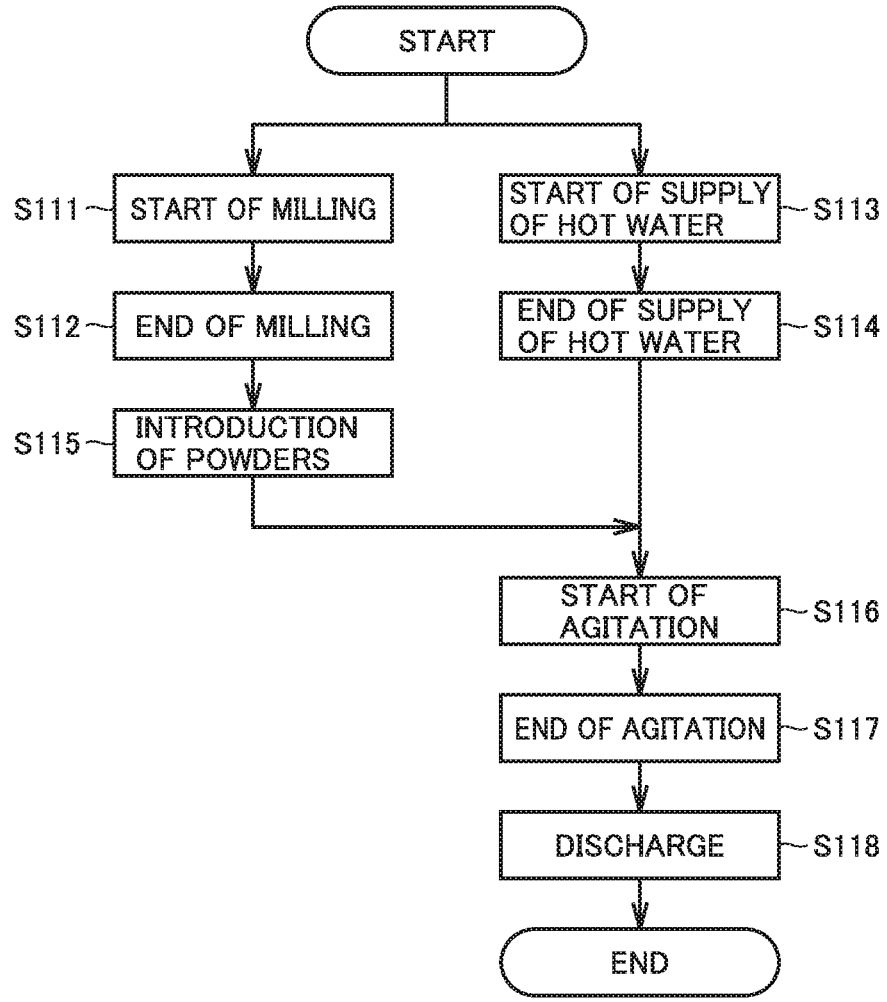
FIG. 38 shows a first preparation flow showing discharge of tea using the beverage preparation apparatus shown in FIG. 35.
Figure 39:
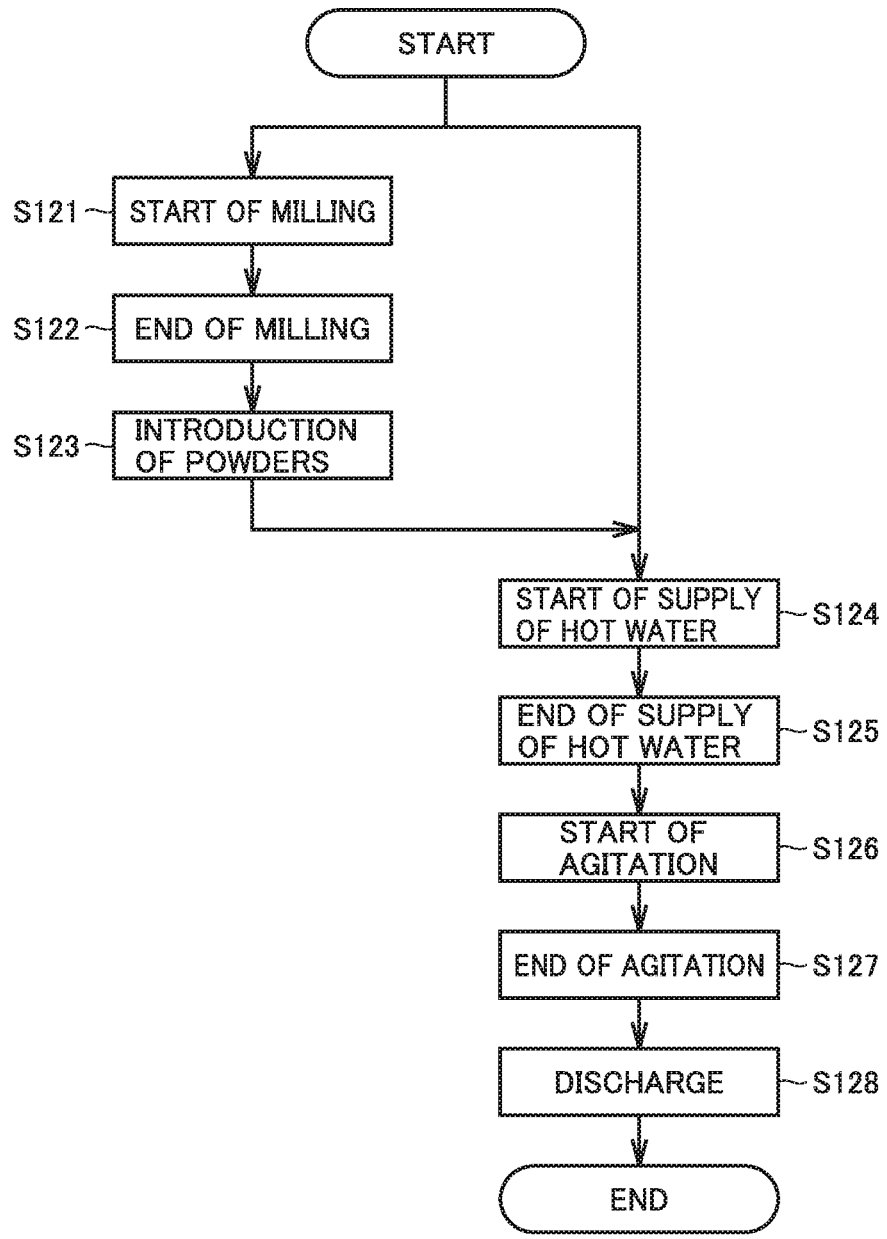
FIG. 39 shows a second preparation flow showing discharge of tea using the beverage preparation apparatus shown in FIG. 35.
Figure 40:
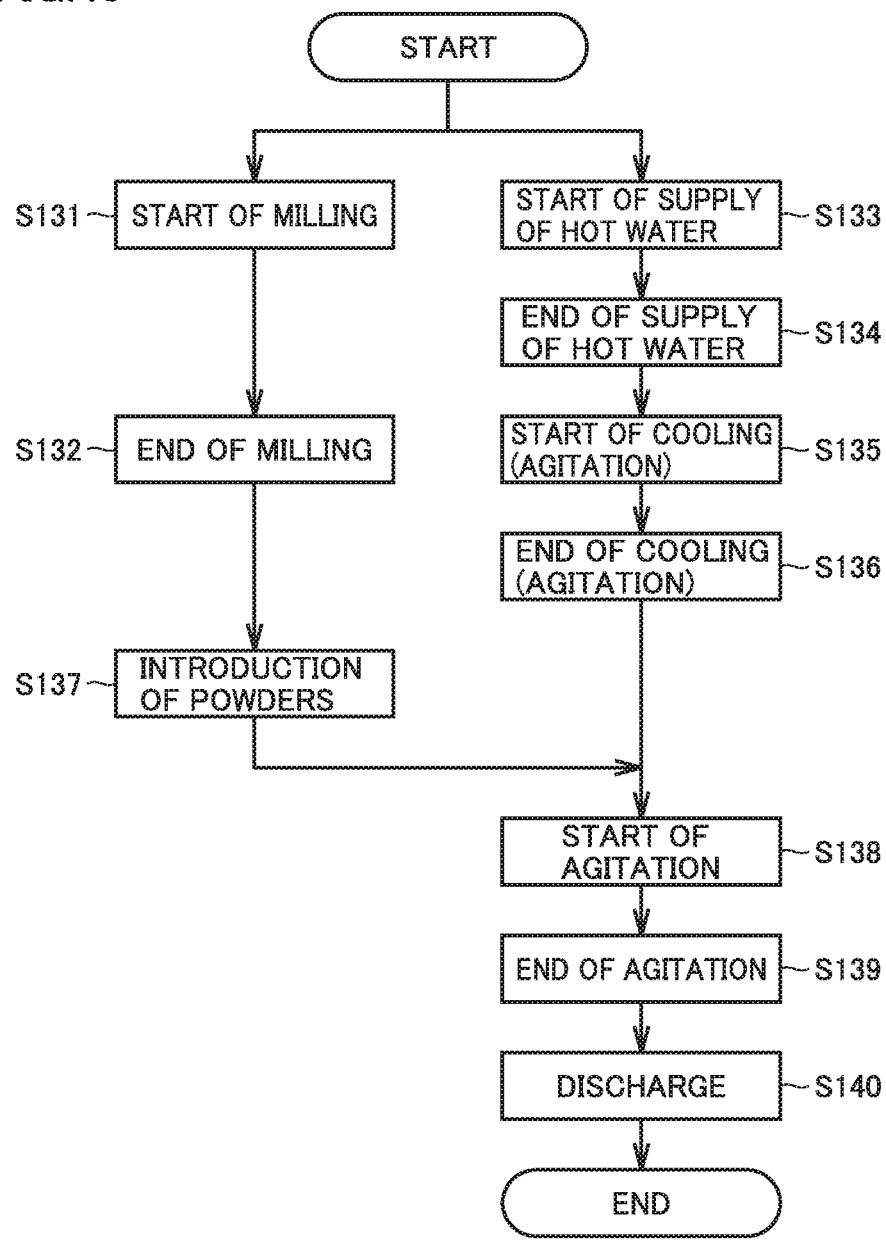
FIG. 40 shows a third preparation flow showing discharge of tea using the beverage preparation apparatus shown in FIG. 35.

A flow of preparation of tea (beverage) with the use of beverage preparation apparatus 1001 will now be described with reference to FIGS. 38 to 40. FIGS. 38 to 40 show first to third preparation flows showing discharge of tea using beverage preparation apparatus 1001, respectively. A prescribed amount of tea leaves is introduced into milling unit 1300 and a prescribed amount of water is stored in liquid storage tank 1700.

(First Preparation Flow)

A first preparation flow will be described with reference to FIG. 38. This first preparation flow is a flow in which grating of tea leaves in milling unit 1300 and supply of hot water from apparatus main body 1100 to agitation unit 1500 are simultaneously carried out.

In beverage preparation apparatus 1001, milling of tea leaves by milling unit 1300 in a step 111 and supply of hot water from apparatus main body 1100 to agitation unit 1500 in a step 113 are simultaneously started. Then, milling of tea leaves by milling unit 1300 ends in a step 112, and supply of hot water from apparatus main body 1100 to agitation unit 1500 ends in a step 114.

In a step 115, tea leaf powders obtained in step 112 are introduced into agitation unit 1500 by a user.

Then, in a step 116, agitation of the tea leaf powders and hot water in agitation unit 1500 is started. In a step 117, agitation of the tea leaf powders and hot water in agitation unit 1500 ends. In a step 118, tea is discharged into the cup placed on placement base 1900 as the user operates operation lever 1542 of discharge port opening and closing mechanism 1540 provided below agitation unit 1500.

(Second Preparation Flow)

A second preparation flow will be described with reference to FIG. 39. This second preparation flow is a flow in which hot water is supplied from apparatus main body 1100 to agitation unit 1500 after tea leaves are grated in milling unit 1300.

In beverage preparation apparatus 1001, in a step 121, milling of tea leaves by milling unit 1300 is started. In a step 122, milling of tea leaves by milling unit 1300 ends. In a step 123, tea leaf powders obtained in step 122 are introduced into agitation unit 1500 by a user.

In a step 124, supply of hot water from apparatus main body 1100 to agitation unit 1500 is started. In a step 125, supply of hot water from apparatus main body 1100 to agitation unit 1500 ends.

Then, in a step 126, agitation of the tea leaf powders and hot water in agitation unit 1500 is started. In a step 127, agitation of the tea leaf powders and hot water in agitation unit 1500 ends. In a step 128, tea is discharged into the cup placed on placement base 1900 as the user operates operation lever 1542 of discharge port opening and closing mechanism 1540 provided below agitation unit 1500.

(Third Preparation Flow)

A third preparation flow will be described with reference to FIG. 40. This third preparation flow includes a step of cooling hot water by agitation in agitation unit 1500.

In beverage preparation apparatus 1001, milling of tea leaves by milling unit 1300 in a step 131 and supply of hot water from apparatus main body 1100 to agitation unit 1500 in a step 133 are simultaneously started. In a step 134, supply of hot water from apparatus main body 1100 to agitation unit 1500 ends.

Then, in a step 132, milling of tea leaves by milling unit 1300 ends, and in a step 135, cooling by agitation of hot water supply is started in agitation unit 1500. In a step 136, cooling by agitation of hot water supply in agitation unit 1500 ends.

In a step 137, the tea leaf powders obtained in step 132 are introduced into agitation unit 1500 by a user.

Then, in a step 138, agitation of the tea leaf powders and hot water in agitation unit 1500 is started. In a step 139, agitation of the tea leaf powders and hot water in agitation unit 1500 ends. In a step 140, tea is discharged into the cup placed on placement base 1900 as the user operates operation lever 1542 of discharge port opening and closing mechanism 1540 provided below agitation unit 1500.

(Internal Structure of Apparatus Main Body 1100)

Figure 41:
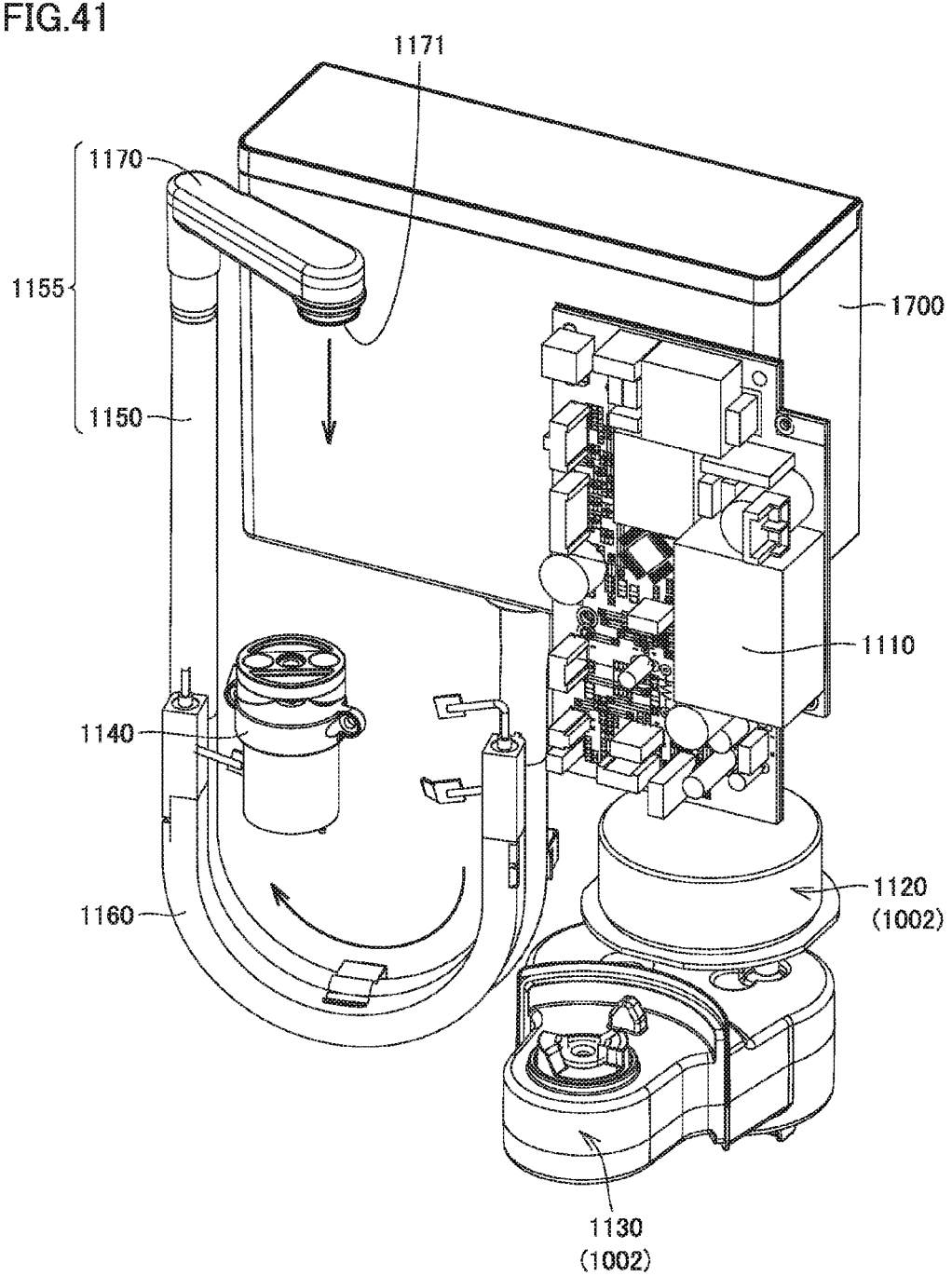
FIG. 41 is a perspective view showing an internal structure of the beverage preparation apparatus shown in FIG. 35.

An internal structure of beverage preparation apparatus 1001 will now be described with reference to FIG. 41. FIG. 41 is a perspective view showing the internal structure of beverage preparation apparatus 1001. In apparatus main body 1100 of beverage preparation apparatus 1001, control unit 110 including a printed circuit board on which electronic components are mounted is arranged on a front surface side of liquid storage tank 1700. Based on input of a start signal by a user, the flow for preparation of tea is executed by control unit 110.

A milling motor unit 1120 for providing driving force to milling unit 1300 is arranged at a position below control unit 110. Milling driving force transmission mechanism 1130 provided to protrude forward for transmitting driving force of milling motor unit 1120 to milling unit 1300 is provided at a position below milling motor unit 1120.

To a bottom surface of liquid storage tank 1700, one end of hot water supply pipe 1150 extending once downward from the bottom surface and then extending upward in a U shape is coupled. Hot water supply nozzle 1170 for pouring hot water into agitation tank 1510 of agitation unit 1500 is coupled to the other end side of hot water supply pipe 1150. A U-shaped heater 1160 for heating water which passes through hot water supply pipe 1150 is attached to an intermediate region of hot water supply pipe 1150. Water becomes hot by being heated by heater 1160, and resultant hot water is supplied to agitation tank 1510.

(Structure of Milling unit 1300)

Figure 42:
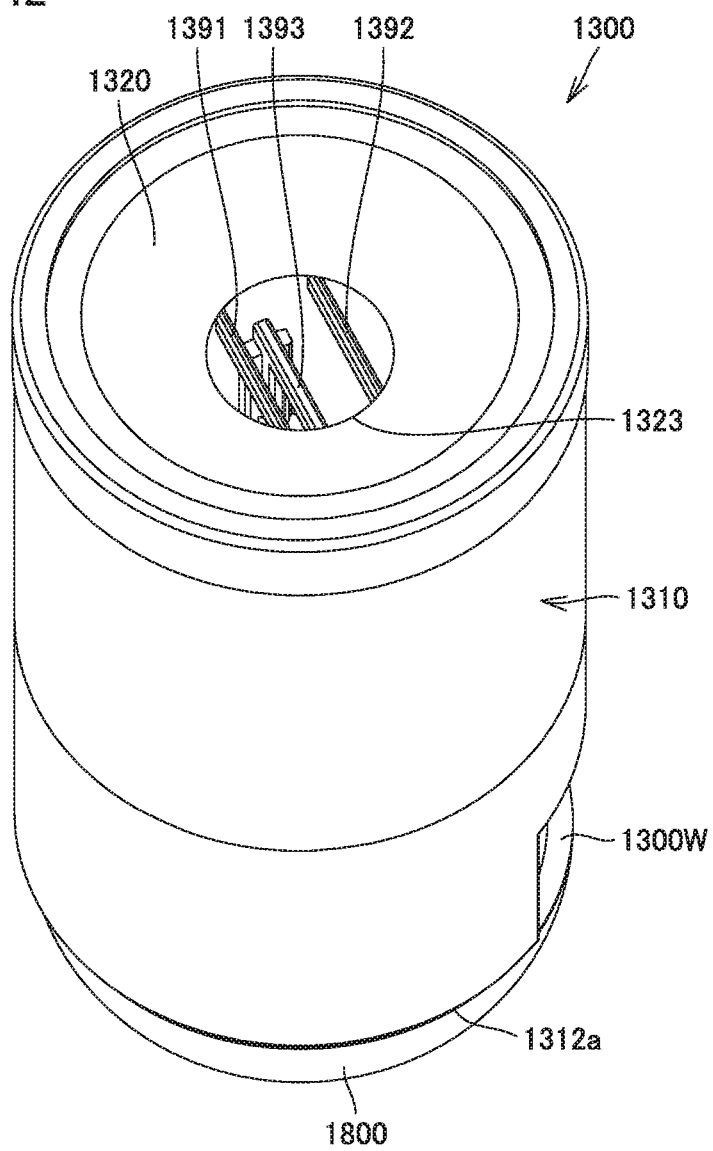
FIG. 42 is a perspective view of a milling unit provided in the beverage preparation apparatus shown in FIG. 35.
Figure 43:
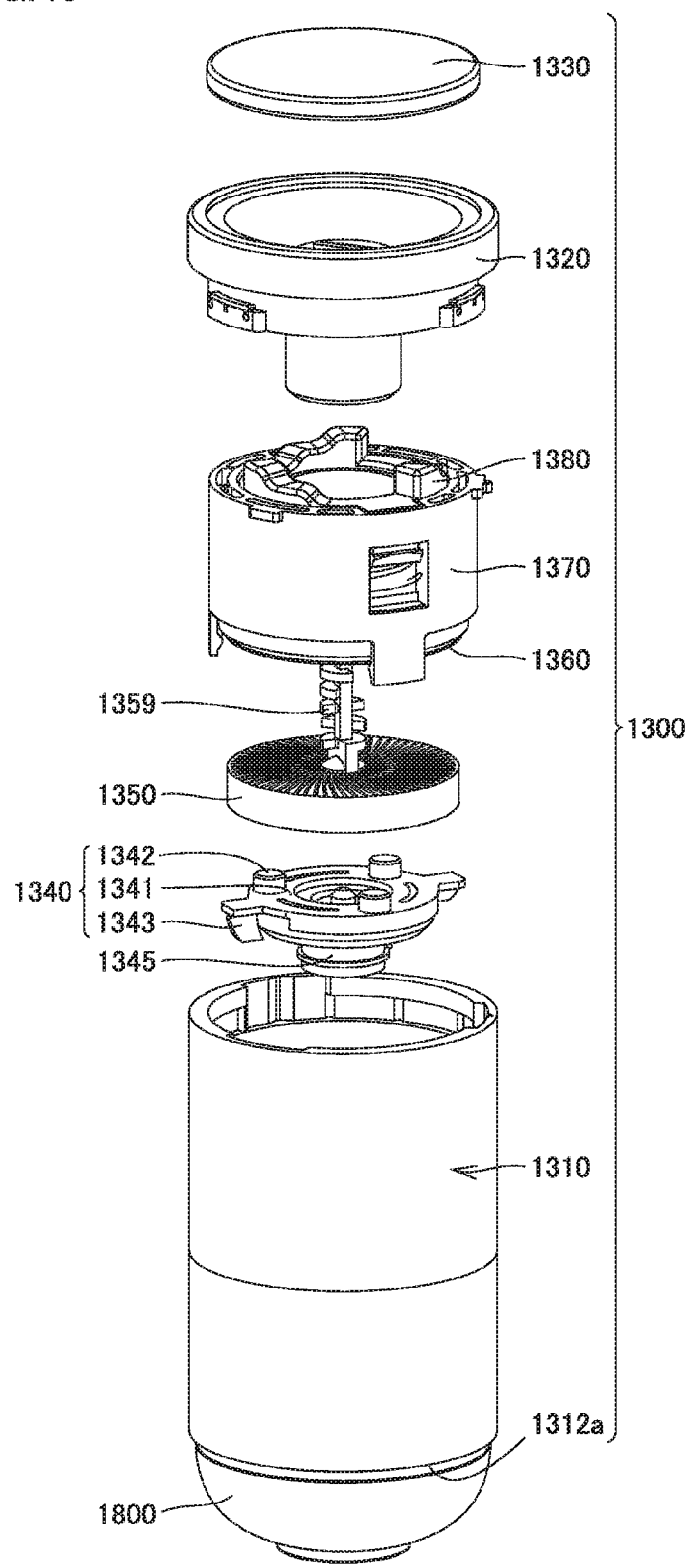
FIG. 43 is an exploded perspective view of the milling unit shown in FIG. 42.
Figure 44:
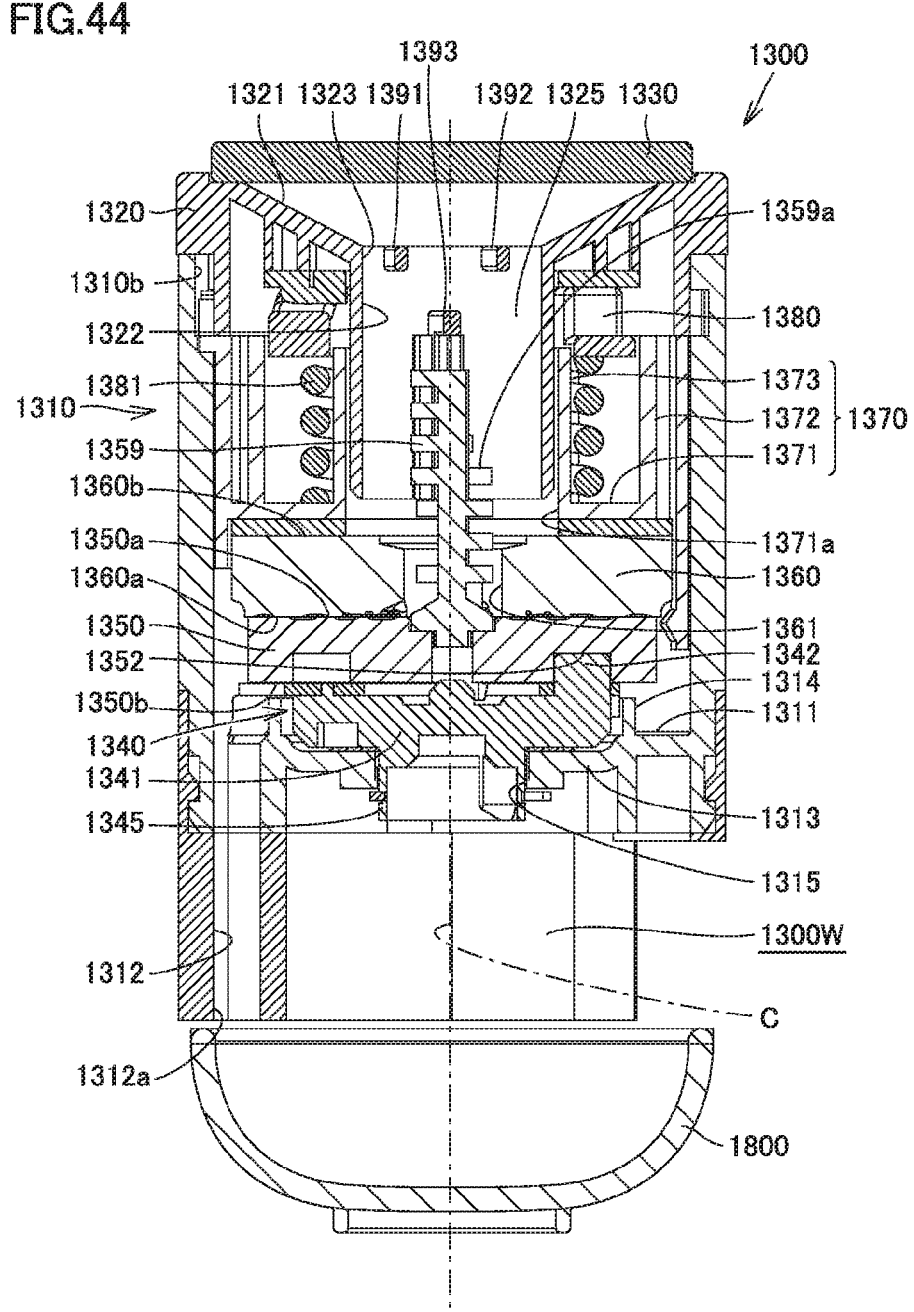
FIG. 44 is a vertical cross-sectional view of the milling unit shown in FIG. 42.

A structure of milling unit 1300 will now be described with reference to FIGS. 42 to 44. FIG. 42 is a perspective view of milling unit 1300, FIG. 43 is an exploded perspective view of milling unit 1300, and FIG. 44 is a vertical cross-sectional view of milling unit 1300.

Milling unit 1300 includes an upper mill 1360 and a lower mill 1350 which grate an object to be grated, a rotation support member 1340 to which lower mill 1350 is attached, and a housing 1310 accommodating these components. In housing 1310, rotation support member 1340, lower mill 1350, and upper mill 1360 are arranged sequentially from below. Rotation support member 1340 is formed from a member of a flame retardant resin such as an ABS resin. Lower mill 1350 and upper mill 1360 are composed, for example, of ceramics (alumina).

Housing 1310 has a cylindrical shape as a whole. Housing 1310 is formed from a member of a flame retardant resin such as an ABS resin. Housing 1310 delimits an insertion region 1300W for inserting a part of milling driving force transmission mechanism 1130 by providing a part of a circumferential surface located on a lower side to be recessed. A step portion is formed on the lower side of housing 1310.

Housing 1310 includes a storage portion 1311 (see FIG. 44) for storing tea leaf powders produced by upper mill 1360 and lower mill 1350 and a discharge path 1312 for discharging tea leaf powders. An upper end side of discharge path 1312 is connected to storage portion 1311 and an outlet port 1312a is provided at a lower end side of discharge path 312. The lower end of discharge path 1312 is a lowermost end portion of housing 1310. Tea leaf powders are discharged from outlet port 1312a to tea leaf powder tray 1800.

Housing 1310 has a flat plate portion 1313 which forms the step portion. Flat plate portion 1313 is provided with an annular erected wall 1314 and a coupling hole portion 1315. A rotation shaft 1137 (see FIG. 48) which will be described later is inserted in coupling hole portion 1315 provided in flat plate portion 1313.

Annular erected wall 1314 is provided to be erect upward. Erected wall 1314 is provided to have a prescribed radius around a central axis of housing 1310. Rotation support member 1340 is arranged on an inner side of erected wall 1314, and storage portion 1311 and discharge path 1312 are arranged on an outer side of erected wall 1314.

Storage portion 1311 is provided to surround a part of an outer circumference of erected wall 1314 and provided to be located around rotation support member 1340. Storage portion 1311 is provided to be located below an outer edge of lower mill 1350 and upper mill 1360. Thus, tea leaf powders discharged from the outer edge of lower mill 1350 and upper mill 1360 can be received by storage portion 1311.

Discharge path 1312 is provided to surround a remaining portion of the outer circumference of erected wall 1314 (a portion not surrounded by storage portion 1311). Discharge path 1312 is thus connected to storage portion 1311. Discharge path 1312 is provided to extend downward from flat plate portion 1313. Discharge path 1312 has a cylindrical shape substantially in a C shape in a plan view.

Outlet port 1312a of discharge path 1312 is located below an opening portion 1513 of a thermally insulated tank 1512 (see FIG. 46) which will be described later. Thus, entry through outlet port 1312a of steam resulting from hot water supplied to thermally insulated tank 1512 can be prevented.

Rotation support member 1340 supports lower mill 1350 from a side opposite to a side where upper mill 1360 is located (a side below lower mill 1350). Rotation support member 1340 has a substantially columnar main body portion 1341, an engagement protrusion portion 1342, a powder scrape-out portion 1343, and a coupling portion 1345.

Engagement protrusion portion 1342 is provided on an upper surface of main body portion 1341 and protrudes upward. Engagement protrusion portion 1342 is a site for locking lower mill 1350. Engagement protrusion portion 1342 has a columnar shape.

Powder scrape-out portion 1343 is provided on an outer side of a circumferential surface of main body portion 1341. Powder scrape-out portion 1343 is provided to extend downward from a protrusion portion which radially protrudes from an upper surface of main body portion 1341. Powder scrape-out portion 1343 scrapes off tea leaf powders stored in storage portion 1311 and transports the tea leaf powders to discharge path 1312 as rotation support member 1340 rotates around an axial line C.

Coupling portion 1345 is provided on the lower side of rotation support member 1340. Specifically, the coupling portion is provided to extend downward from a lower surface of main body portion 1341. Coupling portion 1345 has a cylindrical shape with axial line C being defined as the central axis. An inner diameter of coupling portion 1345 is smaller than an outer diameter of main body portion 1341. Coupling portion 1345 is a site coupled to milling driving force transmission mechanism 1130. Specifically, a side of one end 1137a of rotation shaft 1137 (see FIG. 48) which will be described later is inserted in coupling portion 1345 through coupling hole portion 1315. Thus, driving force generated by milling motor unit 1120 is transmitted to rotation support member 1340 through milling driving force transmission mechanism 1130. Consequently, rotation support member 1340 rotates together with lower mill 1350 while the rotation support member supports lower mill 1350. Thus, rotation support member 1340 functions as a rotation mechanism for rotating upper mill 1360 and lower mill 1350 relatively to each other.

Lower mill 1350 includes a main surface 1350a arranged to be opposed to a main surface 1360a of upper mill 1360, a main surface 1350b located opposite to main surface 1350a, and a circumferential surface connecting main surface 1350a and main surface 1350b to each other. Main surface 1350a of lower mill 1350 has a plurality of shear grooves formed. The plurality of shear grooves are provided, for example, to extend along an equiangular spiral. The plurality of shear grooves may be constructed such that linear grooves formed from the inner circumferential side toward the outer circumference are radially provided.

An engagement recess portion 1352 is provided in main surface 1350b of lower mill 1350. Engagement recess portion 1352 is provided at a position corresponding to engagement protrusion portion 1342 of rotation support member 1340 and locked by engagement protrusion portion 1342. Lower mill 1350 rotates together with rotation support member 1340. A core 1359 extending upward along a core of the rotation shaft is provided in a central portion of lower mill 1350.

Core 1359 is provided to pass through a through hole 1361 provided in a central portion of upper mill 1360. Core 1359 has a helically provided blade portion 1359a.

Upper mill 1360 includes main surface 1360a arranged to be opposed to main surface 1350a of lower mill 1350, a main surface 1360b located opposite to main surface 1360a, and a circumferential surface connecting main surface 1360a and main surface 1360b to each other. A shear groove is formed in main surface 1360a of upper mill 1360 as in main surface 1350a of the lower mill.

Upper mill 1360 is held by an upper mill holding member 1370 arranged above the upper mill. A not-shown hole portion is provided in an upper surface of upper mill 1360. As a not-shown pin portion provided in upper mill holding member 1370 enters the hole portion, rotation of upper mill 1360 is prevented.

Upper mill holding member 1370 includes a bottom surface portion 1371 provided with a hole portion 1371a, an outer cylindrical portion 1372 erected upward from a circumference of bottom surface portion 1371, and an inner cylindrical portion 1373 erected upward from a circumference of hole portion 1371a. Hole portion 1371a is provided to communicate with through hole 1361 in upper mill 1360. A spring 1381 pressing upper mill 1360 downward and a spring holding member 1380 are accommodated in between outer cylindrical portion 1372 and inner cylindrical portion 1373. Spring 1381 adjusts a grating pressure applied between upper mill 1360 and lower mill main body 1350.

A hopper portion 1320 for supplying an object to be grated in between upper mill 1360 and lower mill 1350 is attached to a side of upper end opening portion 1310b of housing 1310. Hopper portion 1320 has a top plate portion 1321, a cylindrical portion 1322, and an object-to-be-grated inlet 1325. Top plate portion 1321 has such a bowl shape that an opening portion 1323 is provided substantially in a central portion. Cylindrical portion 1322 is provided to extend downward from a circumference of opening portion 1323. Cylindrical portion 1322 is inserted in inner cylindrical portion 1373.

Object-to-be-grated inlet 1325 is defined by opening portion 1323 and cylindrical portion 1322. A tip end side of core 1359 is accommodated in object-to-be-grated inlet 1325. In cylindrical portion 322, a plurality of linear ribs 1391, 1392, and 1393 are provided across object-to-be-grated inlet 1325.

In grating tea leaves, hopper portion 1320 is preferably covered with a cover portion 1330. Thus, after tea leaves are introduced into object-to-be-grated inlet 1325, entry of a foreign matter into milling unit 1300 and scattering of grated tea leaves can be prevented. When tea leaves are to be introduced, cover portion 1330 is removed from hopper portion 1320.

Tea leaves introduced into object-to-be-grated inlet 1325 are accommodated in a space defined by the upper surface of upper mill 1360 exposed through upper mill holding member 1370 and an inner circumferential surface of cylindrical portion 1322. Tea leaves accommodated in the space are guided in between upper mill 1360 and lower mill 1350 as helical blade portion 1359a rotates with rotation of lower mill 350.

Tea leaves guided in between upper mill 1360 and lower mill 1350 are grated and fall downward in a form of tea leaf powders from a circumference of upper mill 1360 and lower mill 1350. Some of fallen tea leaf powders is discharged through discharge path 1312 into tea leaf powder tray 1800 from outlet port 1312a. Other fallen tea leaf powders are stored in storage portion 1311. Tea leaf powders in storage portion 1311 are transported to discharge path 1312 and discharged from outlet port 1312a into tea leaf powder tray 1800 as powder scrape-out portion 1343 rotates with rotation of rotation support member 1340.

In grating tea leaves, static electricity is generated with rotation of a plurality of gears included in milling driving force transmission mechanism when milling motor unit 1120 transmits driving force to milling unit 1300. In the present embodiment, static electricity can escape through a charging prevention member in a part of milling driving force transmission mechanism 1130. Charging milling unit 1300 can thus be suppressed. A construction of such milling driving force transmission mechanism 1130 will be described later with reference to FIGS. 47 and 48.

(Structure of Agitation Unit 1500)

Figure 45:
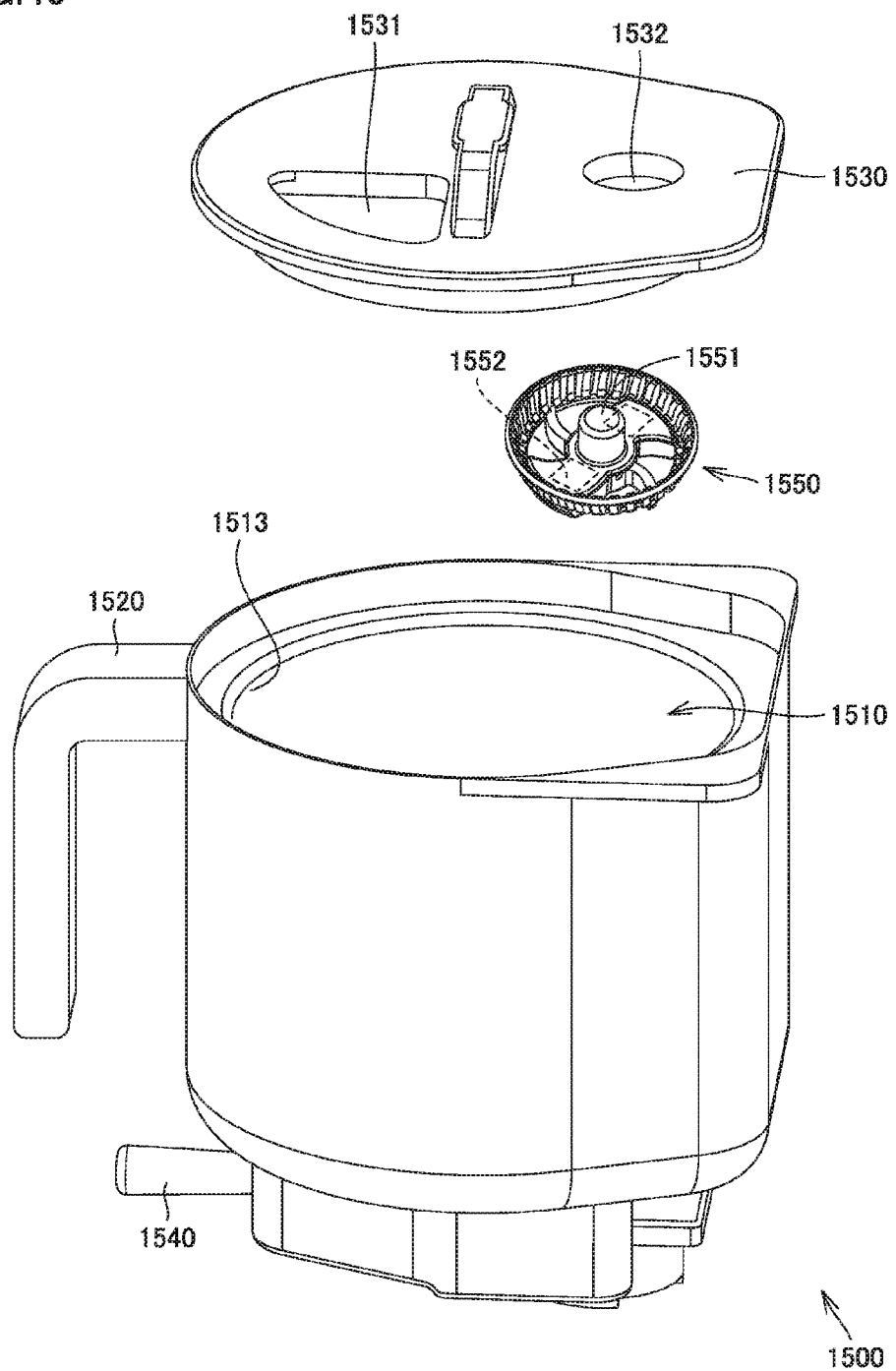
FIG. 45 is an exploded perspective view of an agitation unit provided in the beverage preparation apparatus shown in FIG. 35.
Figure 46:
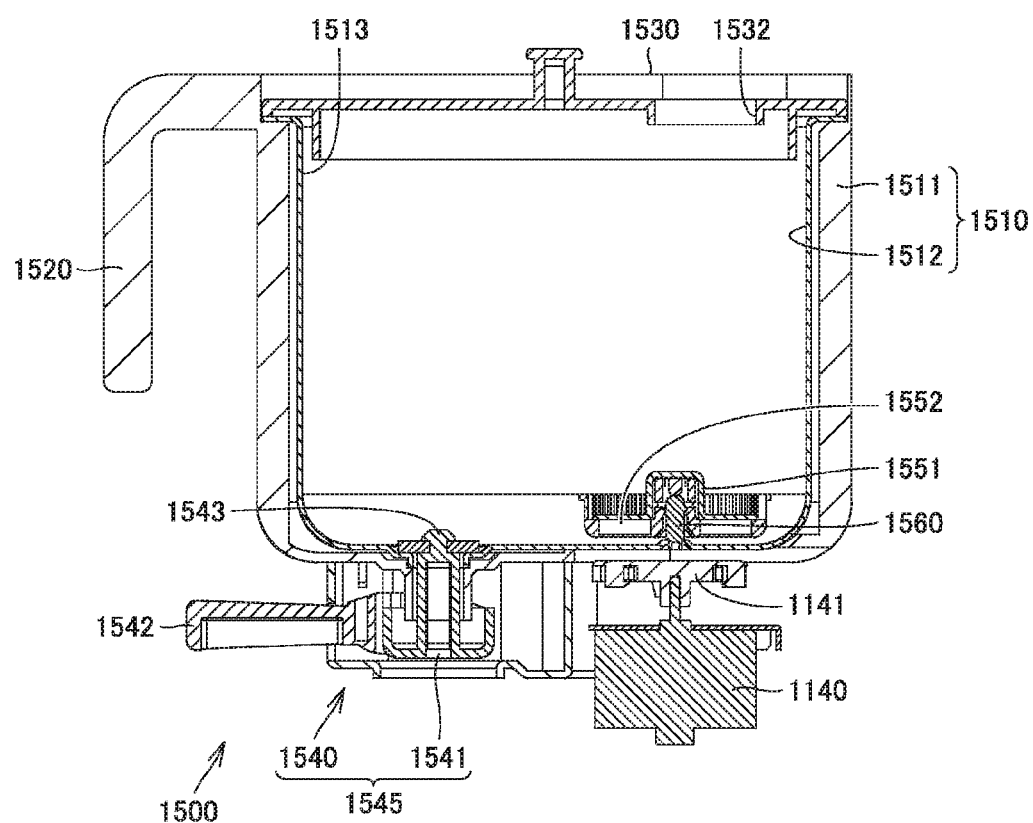
FIG. 46 is a vertical cross-sectional view of the agitation unit shown in FIG. 45.

A structure of agitation unit 1500 will now be described with reference to FIGS. 45 and 46. FIG. 45 is an exploded perspective view of agitation unit 1500 and FIG. 46 is a vertical cross-sectional view of agitation unit 1500.

Agitation unit 1500 includes agitation tank 1510, agitation blade 1550, and an agitation cover 1530. Agitation tank 1510 includes an exterior holder 1511 made of a resin, thermally insulated tank 1512 held by exterior holder 1511, and opening portion 1513. An integrally resin molded grip 1520 is provided in exterior holder 1511. Thermally insulated tank 1512 has opening portion 1513 which has a cylindrical shape with bottom and opens upward.

Agitation cover 1530 covers opening portion 1513 so as to be able to open and close opening portion 1513. Agitation cover 1530 is provided with a powder inlet 1531 for introducing tea leaf powders grated by milling unit 1300 and a hot water supply inlet 1532 through which hot water formed in apparatus main body 1100 is poured from hot water supply nozzle 1170. Hot water supply inlet 1532 is provided at a position corresponding to supply port 171 of hot water supply nozzle 1170.

Powder inlet 1531 and hot water supply inlet 1532 communicate with opening portion 1513. Tea leaf powders introduced from moved tea leaf powder tray 1800 to powder inlet 1531 are introduced into agitation tank 1510 through opening portion 1513. Hot water poured through hot water supply inlet 1532 from hot water supply nozzle 1170 is supplied into agitation tank 1510 through opening portion 1513.

Agitation blade 1550 is placed on a bottom portion of agitation tank 1510. A rotation shaft 1560 extending upward is provided on the bottom portion of agitation tank 1510, and a bearing portion 1551 for agitation blade 1550 is inserted in this rotation shaft 1560.

A magnet 1552 is embedded in agitation blade 1550. In agitation motor contactless table 1140A, magnet 1552 embedded in agitation blade 1550 and magnet 1141 provided on a side of agitation motor unit 1140 are magnetically coupled in a contactless state, so that rotational driving force of agitation motor unit 1140 is transmitted to agitation blade 1550.

Agitation tank 1510 further includes a discharge portion 1545 for discharging a prepared beverage. Discharge portion 1545 is provided in agitation tank 1510 in a portion protruding from apparatus main body 1100. Discharge portion 1545 includes a discharge port 1541 provided in the bottom portion of agitation tank 1510 and discharge port opening and closing mechanism 540 opening and closing discharge port 1541. Discharge port 1541 is a portion for discharging tea prepared by agitation of tea leaf powders and hot water by agitation blade 1550.

Discharge port opening and closing mechanism 540 includes an opening and closing nozzle 1543 inserted into discharge port 1541 so as to be able to open and close discharge port 1541 and operation lever 1542 controlling a position of opening and closing nozzle 1543. Opening and closing nozzle 1543 is biased to close discharge port 1541 by a biasing member (not shown) such as a spring in a normal state. When a user moves operation lever 1542 against biasing force, opening and closing nozzle 1543 moves to open discharge port 1541 and thus tea in agitation tank 1510 is poured into a cup (not shown) placed on placement base 1900.

(Apparatus Main Body 1100 and Milling Driving Force Transmission Mechanism 1130)

Figure 47:
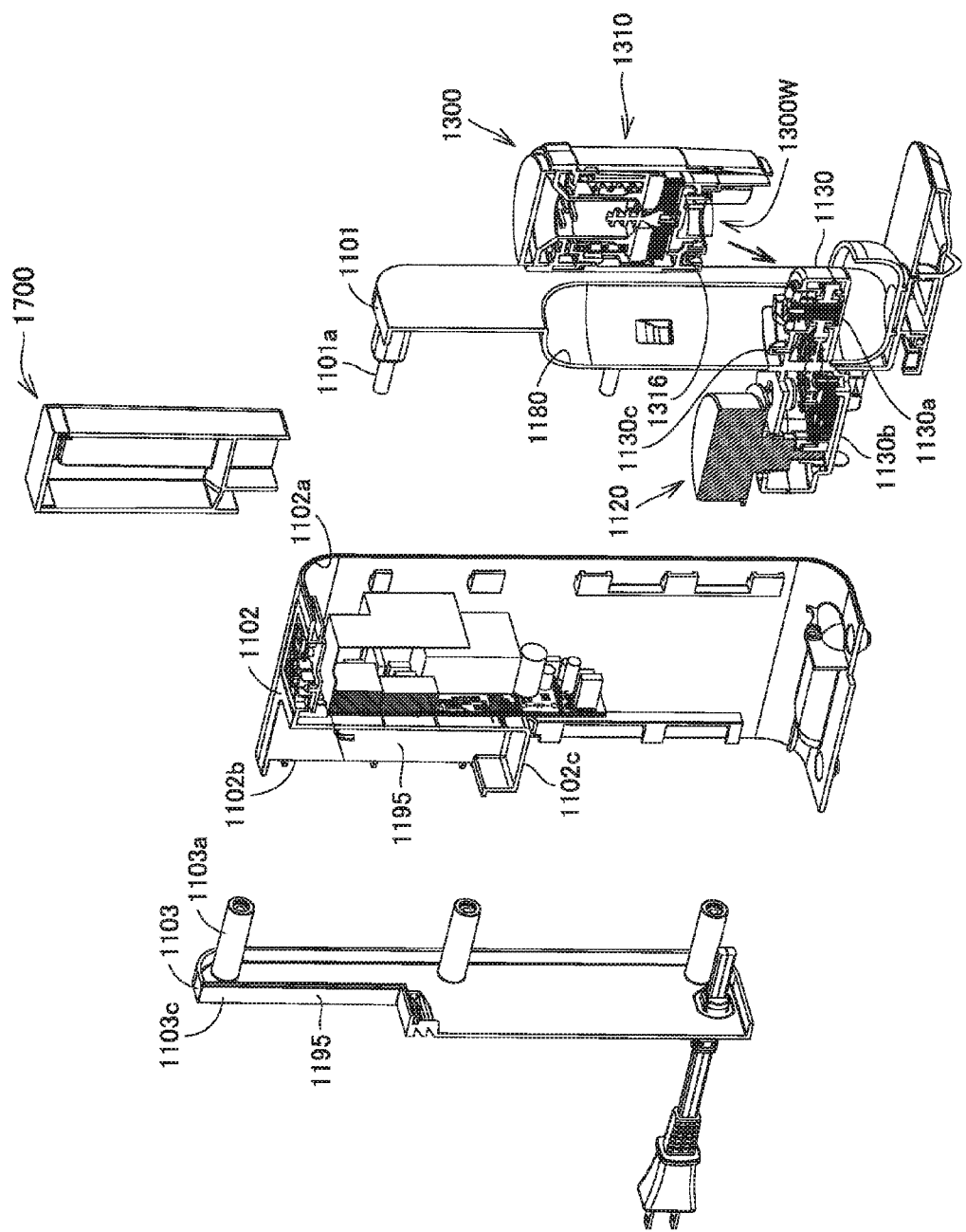
FIG. 47 is an exploded perspective cross-sectional view along the line XLVII-XLVII shown in FIG. 35.
Figure 48:
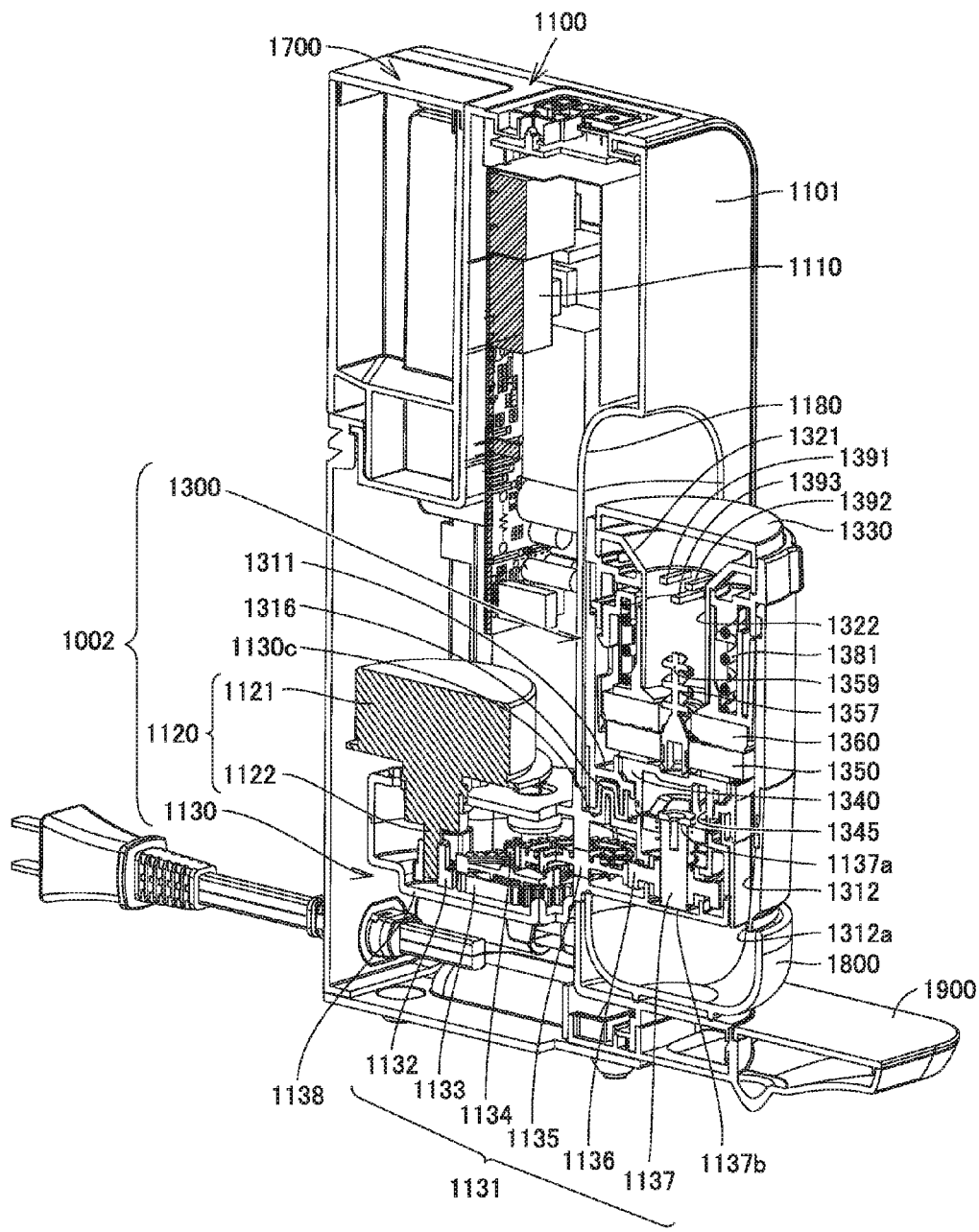
FIG. 48 is a perspective cross-sectional view along the line XLVIII-XLVIII shown in FIG. 35.

Apparatus main body 1100 and milling driving force transmission mechanism 1130 will be described with reference to FIGS. 47 and 48. FIG. 47 is an exploded perspective cross-sectional view along the line XLVII-XLVII shown in FIG. 35. FIG. 48 is a perspective cross-sectional view along the line XLVIII-XLVIII.

Apparatus main body 1100 includes a front panel 1101, a central frame body 1102, and a rear panel 1103. Front panel 1101 has milling unit attachment portion 1180 and an engagement protrusion 1101a. Milling unit attachment portion 1180 is formed with a part of front panel 1101 being recessed rearward. A through hole through which a part of milling driving force transmission mechanism 1130 passes is provided in milling unit attachment portion 1180. Engagement protrusion 1101a is provided on opposing end sides of the front panel (left and right end portions in the figure). Engagement protrusion 1101a is provided to protrude rearward from a main surface on a rear side of the front panel.

Central frame body 1102 has opening portions 1102a and 1102b on a front surface side and a rear surface side, respectively. Central frame body 1102 has a shape of a hollow prism in a rectangular shape having a rounded corner portion in a front view. Control unit 110, milling driving force transmission mechanism 1130, and liquid supply path 1155 are attached to central frame body 1102. Central frame body 1102 is provided with a partition wall 1102c which provides a partition between a portion accommodating liquid storage tank 1700 and a portion accommodating control unit 110 and milling driving force transmission mechanism 1130.

Rear panel 1103 has a notch portion 1103c and an engaged portion 1103a. Notch portion 1103c is provided on an upper end side of rear panel 1103. Notch portion 1103c defines, together with partition wall 1102c, a liquid storage tank attachment portion 1195. Engaged portion 1103a is provided to protrude forward from a front main surface of rear panel 1103. Engaged portion 1103a is provided at a position corresponding to engagement protrusion 1101a of front panel 1101. Engaged portion 1103a is provided with an engagement hole portion therein. As engagement protrusion 1101a is inserted in the engagement hole portion, engagement protrusion 1101a and engaged portion 1103 are engaged with each other.

While control unit 110, milling driving force transmission mechanism 1130, and liquid supply path 1155 are attached to central frame body 1102, rear panel 1103 is attached to close the opening portion in the rear surface of central frame body 1102 and front panel 1101 is attached to close the opening portion in the front surface of central frame body 1102. The front side of milling driving force transmission mechanism 1130 is inserted in the through hole in milling unit attachment portion 1180. Thus, the front side (a front side portion 1130a) of milling driving force transmission mechanism 1130 protrudes forward from apparatus main body 1100 and the rear side (a rear side portion 1130b) of milling driving force transmission mechanism 1130 is accommodated in apparatus main body 1100.

Insertion region 1300W of milling unit 1300 is fitted substantially from above into milling driving force transmission mechanism 1130 which protrudes from apparatus main body 1100. A positioning recess portion 1316 provided in housing 1310 is fitted to a positioning projection portion 1130c of milling driving force transmission mechanism 1130. Thus, registration between coupling portion 1345 of lower mill support member 1340 described above and rotation shaft 1137 which will be described later is made, so that milling unit 1300 and milling driving force transmission mechanism 1130 can readily be coupled to each other.

Positioning projection portion 1130c is a part of an accommodation case 1138 as a surrounding member which will be described later. Thus, when rotation shaft 1137 and coupling portion 1345 are connected to each other, a specific portion of housing 1310 and a specific portion of accommodation case 1138 are in contact with each other, so that milling unit 1300 and milling driving force transmission mechanism 1130 can readily be coupled to each other.

Milling driving force transmission mechanism 1130 includes a power transmission portion 1131 and accommodation case 1138 as the surrounding member. Power transmission portion 1131 mechanically connects an output shaft 1122 of milling motor unit 1120 and coupling portion 1345 of lower mill support member 1340 to each other. Thus, power transmission portion 1131 transmits driving force generated by milling motor unit 1120 to lower mill support member 1340. Power transmission portion 1131 is rotatably supported by a support member and is electrically connected to accommodation case 1138 with the support member being interposed.

Power transmission portion 1131 includes a first fixed gear 1132 fixed to output shaft 1122, a second fixed gear 1136 fixed to rotation shaft 1137, intermediate gears 1133, 1134, and 1135 mechanically connecting first fixed gear 1132 and second fixed gear 1136 to each other, and rotation shaft 1137. Power transmission portion 1131 includes a support member such as a gear bearing which rotatably supports these gears.

Accommodation case 1138 accommodates a part of milling motor unit 1120 and a most part of power transmission portion 1131. A part of milling motor unit 1120 is accommodated on a rear side of accommodation case 1138. Milling motor unit 1120 includes a motor 1121 and output shaft 1122, and a part of motor 1121 and output shaft 1122 are accommodated on the rear side of accommodation case 1138.

A part of rotation shaft 1137 is accommodated on the front side of accommodation case 1138. Rotation shaft 1137 rotates around a central axis. The central axis of rotation shaft 1137 is in parallel to a direction in which upper mill 1360 and lower mill 1350 are aligned (a vertical direction) and coincides with axial line C shown in FIG. 44.

Rotation shaft 1137 is accommodated in accommodation case 1138 such that a side of upper end 1137a protrudes upward from accommodation case 1138. Thus, when milling unit 1300 is attached to milling driving force transmission mechanism 1130, the side of upper end 1137a of rotation shaft 1137 can be inserted in coupling portion 1345 of rotation support member 1340. A side of a lower end 1137b of rotation shaft 1137 is accommodated in accommodation case 1138.

When output shaft 1122 of milling motor unit 1120 rotates at a prescribed number of rotations based on an input signal from control unit 110, first fixed gear 1132 fixed thereto rotates. As intermediate gears 1133, 1134, and 1135 rotate in coordination with rotation of first fixed gear 1132, second fixed gear 1136 also rotates. Thus, rotation shaft 1137 to which second fixed gear 1136 is fixed rotates and rotation support member 1340 coupled to rotation shaft 1137 rotates around the axial line. Consequently, rotation support member 1340 and lower mill 1350 integrally rotate, so that tea leaves are grated between upper mill 1360 and lower mill 1350.

In grating tea leaves, since first fixed gear 1132, intermediate gears 1133, 1134, and 1135, and second fixed gear 1136 rotate as being engaged with each other, static electricity is more likely to occur in milling driving force transmission mechanism 1130 than in other portions of milling machine 1002.

In the present embodiment, at least any of support members such as first fixed gear 1132, intermediate gears 1133, 1134, and 1135, second fixed gear 1136, rotation shaft 1137, and the gear bearings described above includes a charging prevention member. To include a charging prevention member includes a case that the entire member is formed from a charging prevention member and a case that a part of a member is formed from a charging member.

A metal material or a resin material having surface resistivity having a value not smaller than $1.0 \times 10^9$ [$\Omega$/sq.] and not greater than $1.0 \times 10^{14}$ [$\Omega$/sq.] can be adopted as the charging prevention member. Specifically, Toyolac® Parel can be adopted as the resin member.

Static electricity generated as a result of rotation of a gear in power transmission portion 1131 is discharged into air from a portion of power transmission portion 1131 including the charging prevention member. Thus, static electricity generated in accommodation case 1138 can be prevented from moving toward milling unit 1300 through rotation shaft 1137 and charging of an apparatus by static electricity can be suppressed. Adhesion of tea leaf powders to milling unit 1300 can thus be prevented.

Thus, milling machine 1002 and beverage preparation apparatus 1001 including the same according to the present embodiment have such a simplified construction that at least a part of power transmission portion 1131 representing a component forming milling machine 1002 includes a charging prevention member and can sufficiently suppress charging of the apparatus by static electricity.

Accommodation case 1138 in a standard condition of a product is covered with milling unit 1300 and tea leaf powder tray 1800 in the present embodiment. Therefore, when both of them are made from a flame retardant member, charging can be suppressed and an outer surface of the product can be covered with the flame retardant member. In general, in order to form a member having an antistatic property and a flame retardant function, cost is increased as compared with an example in which a member having only one of the functions is formed. With the present construction, however, cost can be suppressed while an equivalent function is obtained in a product as a whole.

Accommodation case 1138 also preferably includes the charging prevention member described above. In this case, even though static electricity generated in power transmission portion 1131 moves to accommodation case 1138, static electricity can be discharged into air from a portion formed from the charging prevention member. Consequently, static electricity generated in accommodation case 1138 can further be prevented from moving to milling unit 1300 through rotation shaft 1137 and charging of the apparatus by static electricity can further be suppressed. Thus, adhesion of tea leaf powders to milling unit 1300 can further be prevented.

Embodiment 14

A milling machine according to the present embodiment is different from milling machine 1002 according to Embodiment 13 in that powder scrape-out portion 1343 is formed from a charging prevention member instead of a flame retardant resin member. The construction is otherwise substantially the same.

Rotation support member 1340 including powder scrape-out portion 1343 is also preferably formed from a charging prevention member. When rotation support member 1340 is formed from a resin member having surface resistivity having a value, for example, not smaller than $1.0 \times 10^9$ [$\Omega$/sq.] and not greater than $1.0 \times 10^{14}$ [$\Omega$/sq.], main body portion 1341 and powder scrape-out portion 1343 are preferably integrally molded through injection molding.

When powder scrape-out portion 1343 is formed from a metal member or the resin member described above and main body portion 1341 of rotation support member 1340 is formed from a flame retardant resin member, powder scrape-out portion 1343 may be secured to main body portion 1341 through adhesion welding or adhesion.

Powder scrape-out portion 1343 scrapes off tea leaf powders stored in storage portion 1311 and transports the tea leaf powders to discharge path 1312 as sliding over the main surface of storage portion 1311. Since static electricity generated by sliding movement is discharged into air from powder scrape-out portion 1343, charging of powder scrape-out portion 1343 can be suppressed. Thus, adhesion of tea leaf powders to powder scrape-out portion 1343 can be suppressed.

Thus, in the present embodiment, with such a simplified construction that accommodation case 1138 and powder scrape-out portion 1343 which are some of components forming the milling machine are formed from the charging prevention member, charging of the apparatus by static electricity can sufficiently be suppressed.

Embodiment 15

A milling machine according to the present embodiment is different from milling machine 1002 according to Embodiment 13 in that tea leaf powder tray 1800 is formed from a charging prevention member instead of a flame retardant resin member. The construction is otherwise substantially the same.

In this case, even though tea leaf powders are charged in milling unit 1300, charges of the tea leaf powders can escape to tea leaf powder tray 1800 and can be discharged into air from tea leaf powder tray 1800. Thus, aggregation of tea leaf powders or adhesion thereof to tea leaf powder tray 1800 can be suppressed.

Thus, in the present embodiment, with such a simplified construction that accommodation case 1138 and tea leaf powder tray 1800 which are some of components forming the apparatus are formed from a charging prevention member, charging of the apparatus by static electricity can sufficiently be suppressed.

Embodiment 16

A milling machine according to the present embodiment is different from milling machine 1002 according to Embodiment 13 in that housing 1310 of milling unit 1300 is formed from a charging prevention member. The construction is otherwise substantially the same.

In this case, static electricity generated at the time when powder scrape-out portion 1343 scrapes off tea leaf powders stored in storage portion 1311 and transports the tea leaf powders to discharge path 1312 as sliding over the main surface of storage portion 1311 can be discharged into air through housing 1310. Thus, charging on a side of housing 1310 can be suppressed and adhesion of tea leaf powders to storage portion 1311 can be suppressed.

Thus, in the present embodiment, with such a simplified construction that accommodation case 1138 and housing 1310 which are some of components forming the apparatus are formed from a charging prevention member, charging of the apparatus by static electricity can sufficiently be suppressed.

EXAMPLES

Figure 49:
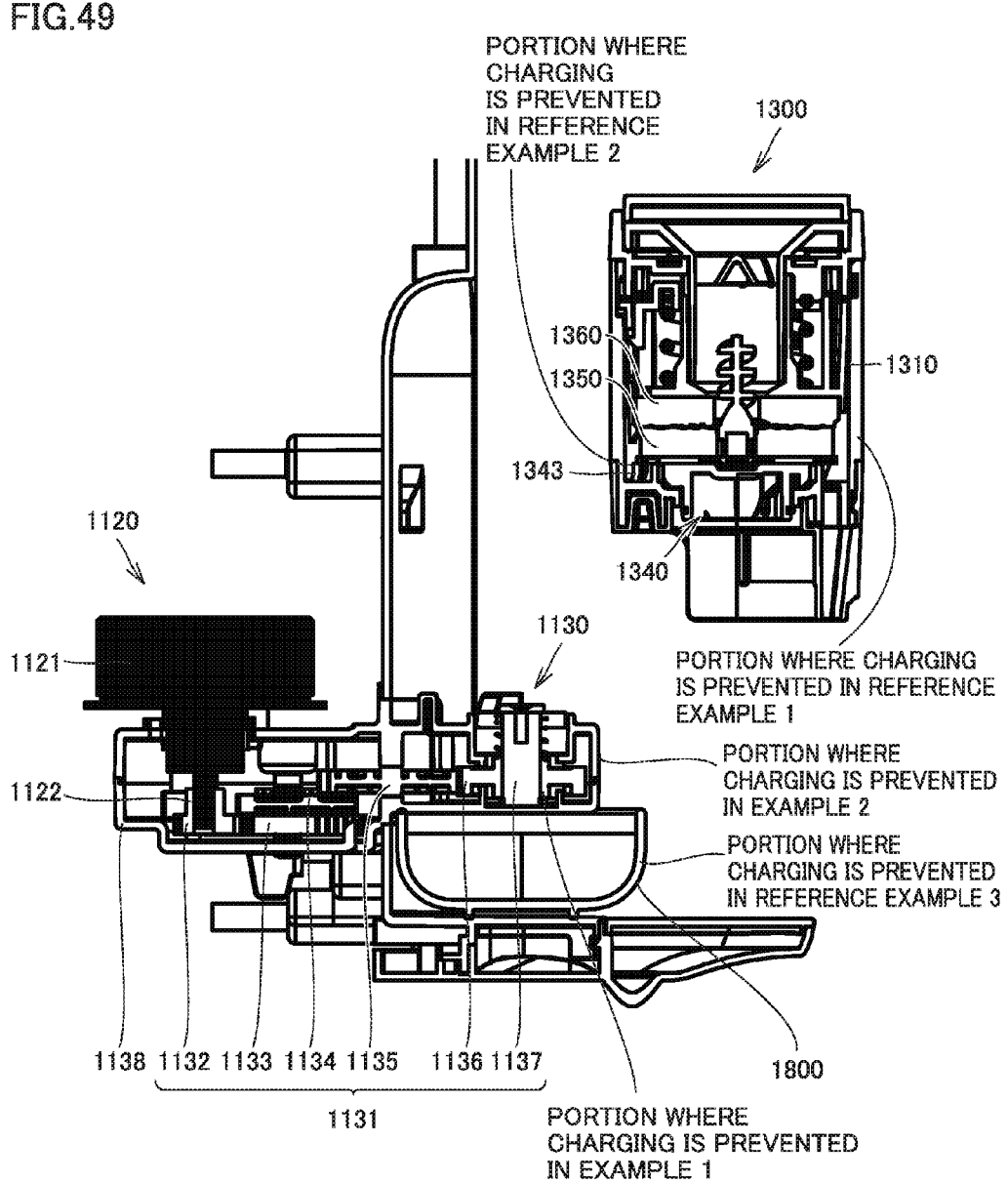
FIG. 49 is a diagram for illustrating a place where a charging prevention member is employed in a verification experiment conducted for verifying an effect of the present invention.

FIG. 49 is a diagram for illustrating a place where a charging prevention member is employed in a verification experiment conducted for verifying an effect of the present invention. FIG. 50 is a diagram showing a result of the verification experiment conducted for verifying the effect of the present invention. Verification experiments conducted for each of Examples and Comparative Examples will be described with reference to FIGS. 49 and 50.

As shown in FIGS. 49 and 50, in the verification experiment, charging prevention capability was evaluated after milling machines according to Examples 1 and 2, milling machines according to Reference Examples 1 to 3, and a milling machine according to Comparative Example 1 were continuously operated for 15 minutes. As evaluation of charging prevention capability, an amount of adhesion (an amount of loss) of powders which adhered to housing 1310 without being collected in tea leaf powder tray 1800, of powders produced by the milling machine, was determined. A smaller amount of adhesion indicates higher charging prevention capability. A milling machine which exhibited excellent charging prevention capability was evaluated as "excellent", a milling machine which exhibited slight charging prevention capability was evaluated was "satisfactory", and a milling machine which exhibited no charging prevention capability was determined as "not good."

Example 1

The milling machine according to Embodiment 13 was employed as the milling machine according to Example 1. In this case, a gear bearing which was a part of power transmission portion 1131 and rotatably supported second fixed gear 1136 was formed from a charging prevention member. Specifically, a bearing made of a metal was adopted as the gear bearing. In this case, an amount of adhesion was 0.3 g and the charging prevention capability was determined as "excellent".

Example 2

A milling machine in which not power transmission portion 1131 but accommodation case 1138 was formed from a charging prevention member was employed as the milling machine according to Example 2. In this case, an amount of adhesion was 0.3 g and the charging prevention capability was determined as "excellent".

Reference Example 1

A milling machine in which not power transmission portion 1131 but housing 1310 of milling unit 1300 was formed from a charging prevention member was employed as the milling machine in Reference Example 1. In this case, an amount of adhesion was 1.2 g and the charging prevention capability was determined as "satisfactory".

Reference Example 2

A milling machine in which not power transmission portion 1131 but powder scrape-out portion 1343 of milling unit 1300 was formed from a charging prevention member was employed as the milling machine in Reference Example 2. In this case, an amount of adhesion was 1.2 g and the charging prevention capability was determined as "satisfactory".

Reference Example 3

A milling machine in which not power transmission portion 1131 but tea leaf powder tray 1800 was formed from a charging prevention member was employed as the milling machine in Reference Example 3. In this case, an amount of adhesion was 1.2 g and the charging prevention capability was determined as "satisfactory".

Comparative Example 1

A milling machine in which none of portions forming the milling machine were formed from a charging prevention member was employed as the milling machine in Comparative Example 1. In this case, an amount of adhesion was 1.5 g and the charging prevention capability was determined as "not good."

(Results of Experiments and Discussion)

In Comparative Example 1, the charging prevention member was employed in no portion and hence an amount of adhesion was large. Based on comparison of results in Example 1 with results in Reference Examples 1 to 3 and results in Comparative Example 1, an amount of adhesion was considerably low in Example 1 and hence it is determined that power transmission portion 1131 is a portion where generation of static electricity is likely. It is determined that a function to prevent charging was effectively exhibited by employing the charging prevention member for power transmission portion 1131.

In Example 2, the function to prevent charging as high as in Example 1 was exhibited. As accommodation case 1138 includes the charging prevention member, adhesion of tea leaf powders to accommodation case 1138 could be reduced, and in addition, adhesion of the tea leaf powders to housing 1310 of milling unit 1300 could also be reduced. Since accommodation case 1138 comes in contact with a support member such as a gear bearing included in power transmission portion 1131, it is assumed that static electricity generated in power transmission portion 1131 could be moved to accommodation case 1138 and effectively discharged into air from the portion formed from the charging prevention member.

As set forth above, it could also experimentally be proven that charging of the apparatus by static electricity can sufficiently be suppressed with a simplified construction by constructing at least a part of power transmission portion 1131 representing components forming milling machine 1002 so as to include the charging prevention member.

Though an example in which power transmission portion 1131 includes the charging prevention member has been illustrated and described in Embodiment 13 above, limitation thereto is not intended, and accommodation case 1138 instead of power transmission portion 1131 may include the charging prevention member. Since accommodation case 1138 comes in contact with the support member for power transmission portion 1131, static electricity generated in power transmission portion 1131 can be moved to accommodation case 1138 and discharged into air from the portion formed from the charging prevention member. Consequently, static electricity generated in accommodation case 1138 can be prevented from moving to milling unit 1300 and charging of the apparatus by static electricity can be suppressed. Thus, adhesion of tea leaf powders to milling unit 1300 can be prevented.

In Embodiments 13 to 16 described above, a metal plate may separately be placed in apparatus main body 1100 and the metal plate and accommodation case 1138 may electrically be connected to each other. In this case, static electricity can be moved to the metal plate. Since an amount of static electricity which moves to milling unit 1300 can further be reduced, charging of the apparatus by static electricity can be suppressed.

Though an example in which accommodation case 1138 serves as the surrounding member has been illustrated and described in Embodiments 13 to 16 above, limitation thereto is not intended and a protection case provided to cover an outer surface of accommodation case 1138 may be applicable.

Though an example in which milling unit 1300 is removably attached to milling driving force transmission mechanism 1130 has been illustrated and described in Embodiments 13 to 16 above, limitation thereto is not intended, and milling unit 1300 may be attached to milling driving force transmission mechanism 1130 and integrated with milling driving force transmission mechanism 1130 by an adhesive member, a locking member, or a fastening member.

Combination of characteristic parts in Embodiments 13 to 16 described above as appropriate is originally intended unless otherwise specified. Specifically, at least any of the characteristic parts described in Embodiments 14 to 16 may be applied to the milling machine according to Embodiment 13. Such a milling machine may be mounted as appropriate on the beverage preparation apparatus according to Embodiment 13.

Embodiment 17

(Beverage Preparation Apparatus 2001)

Figure 51:
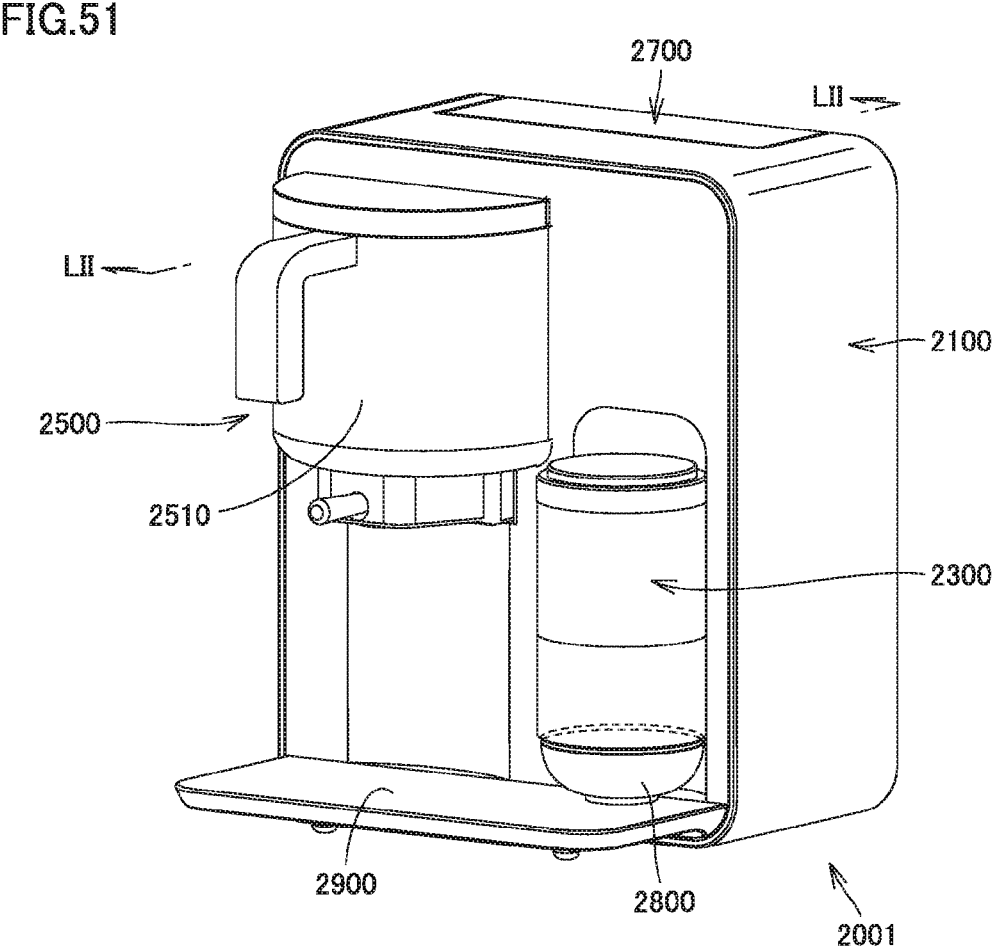
FIG. 51 is an overall perspective view of a beverage preparation apparatus including a mill according to Embodiment 17.
Figure 52:
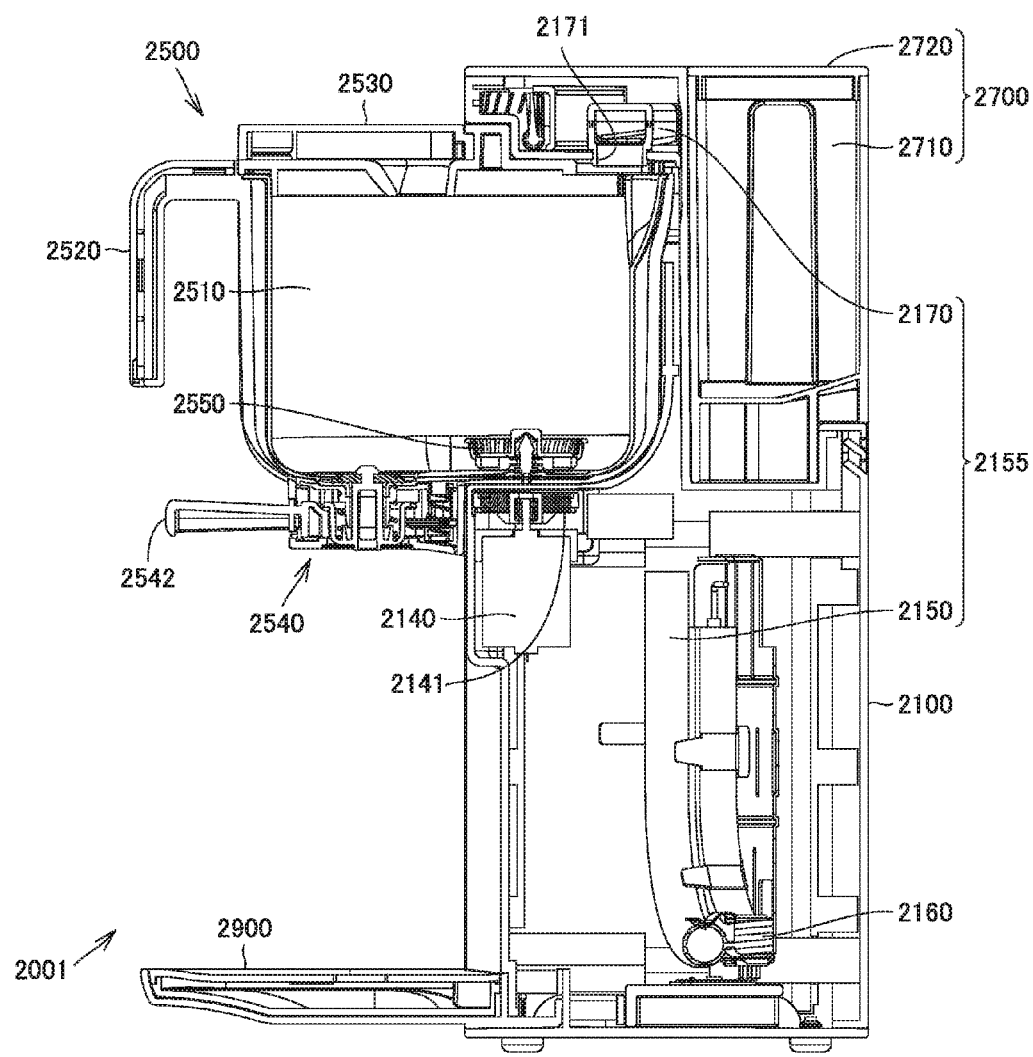
FIG. 52 is a cross-sectional view along the line LII-LII in FIG. 51.
Figure 53:
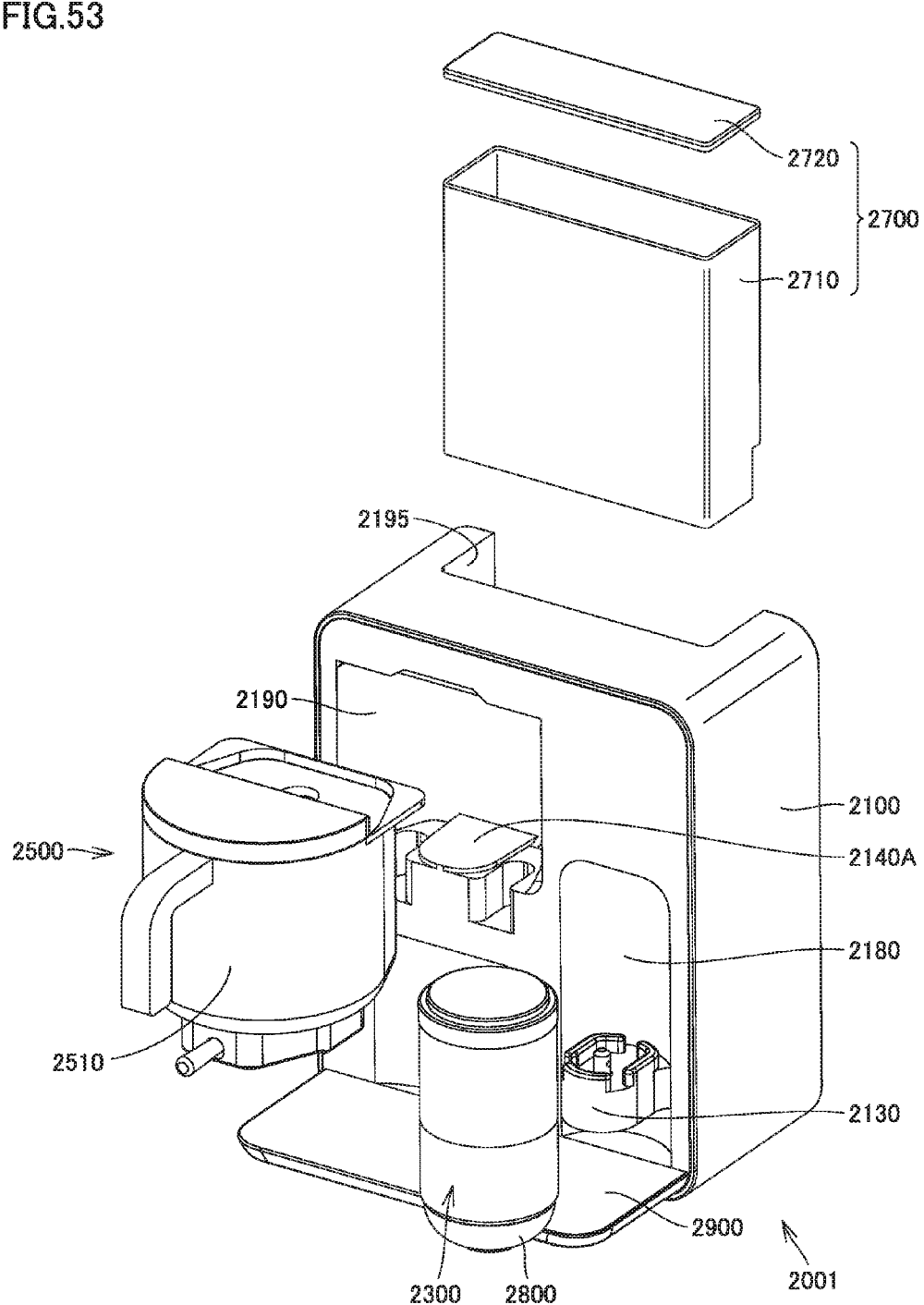
FIG. 53 is an overall perspective view showing a schematic component of the beverage preparation apparatus shown in FIG. 51.

A beverage preparation apparatus 2001 in the present embodiment will be described with reference to FIGS. 51 to 53. FIG. 51 is an overall perspective view of beverage preparation apparatus 2001, FIG. 52 is a cross-sectional view along the line II-II in FIG. 51, and FIG. 53 is an overall perspective view of a schematic component of beverage preparation apparatus 2001.

Beverage preparation apparatus 2001 uses tea leaves as an object to be grated and obtains tea leaf powders by grating the tea leaves. The beverage preparation apparatus uses the obtained tea leaf powders for preparing tea as a beverage. Beverage preparation apparatus 2001 includes an apparatus main body 2100 as a beverage preparation apparatus main body, a milling unit 2300, an agitation unit 2500, a liquid storage tank 2700, a liquid supply path 2155 (see FIG. 52), a tea leaf powder tray 2800 as a powder reception portion, and a placement base 2900. Placement base 2900 is provided to protrude forward on a front side in a lower portion of apparatus main body 2100 and a cup (not shown) and tea leaf powder tray 2800 can be placed thereon. Tea leaf powder tray 2800 is provided such that a user can move the tray by holding the tray.

(Milling Unit 2300)

Milling unit 2300 is removably attached to a milling unit attachment portion 2180 (see FIG. 53) provided on a front surface side of apparatus main body 2100. Milling unit 2300 is arranged, for example, at a distance from an agitation tank 2510 so as to be displaced from agitation tank 2510 below agitation tank 2510 included in agitation unit 2500 when viewed from the front.

A milling driving force coupling mechanism 2130 (see FIG. 53) is provided in milling unit attachment portion 2180 so as to protrude forward. Milling unit 2300 is removably attached to milling driving force coupling mechanism 2130. Milling unit 2300 obtains driving force for milling tea leaves representing an object to be grated by being coupled to milling driving force coupling mechanism 2130.

Tea leaves introduced from an upper portion of milling unit 2300 into milling unit 2300 are finely grated in milling unit 2300. The grated tea leaves are dropped and collected as tea leaf powders on tea leaf powder tray 2800 placed below milling unit 2300. A detailed structure of milling unit 2300 will be described later with reference to FIGS. 58 to 61.

(Liquid Storage Tank 2700)

Liquid storage tank 2700 is removably attached to a liquid storage tank attachment portion 2195 provided on an upper surface side of apparatus main body 2100. Liquid storage tank 2700 includes a tank main body 2710 having an opening in an upper surface and a lid portion 2720 closing the opening in the upper surface of tank main body 2710. Liquid storage tank 2700 stores such a liquid as water.

(Liquid Supply Path 2155)

Liquid supply path 2155 is accommodated in apparatus main body 2100. Liquid supply path 2155 is connected to liquid storage tank 2700 (see FIG. 57). Liquid supply path 2155 is provided with a supply port 2171 on a side opposite to a side where liquid storage tank 2700 is connected. Liquid supply path 2155 includes a hot water supply pipe 2150 and a hot water supply nozzle 2170. Hot water supply pipe 2150 has one end side connected to liquid storage tank 2700 and the other end side connected to hot water supply nozzle 2170. A liquid introduced from liquid storage tank 2700 into liquid supply path 2155 is supplied to agitation unit 2500 through hot water supply pipe 2150 and hot water supply nozzle 2170.

(Agitation Unit 2500)

Agitation unit 2500 includes an agitation blade 2550 for agitating a liquid and powders and agitation tank 2510 accommodating agitation blade 2550. Agitation tank 2510 is removably attached to an agitation tank attachment portion 2190 (see FIG. 53) provided on the front surface side of apparatus main body 2100. Agitation tank 2510 is attached to agitation tank attachment portion 2190 so as to protrude from apparatus main body 2100 in a direction intersecting with a vertical direction. Specifically, agitation tank 2510 is attached such that a part of agitation tank 2510 protrudes forward from a front surface of apparatus main body 2100.

An agitation motor contactless table 2140A is provided in agitation tank attachment portion 2190. Agitation unit 2500 is placed on agitation motor contactless table 2140A. Agitation blade 2550 provided in agitation unit 2500 is rotated by an agitation motor unit 2140 accommodated in apparatus main body 2100 so as to be located below agitation motor contactless table 2140A and a magnet 2141 coupled thereto.

Hot water supply nozzle 2170 is provided above agitation tank attachment portion 2190 of apparatus main body 2100. In apparatus main body 2100, a temperature of water in hot water supply pipe 2150 is raised to a prescribed temperature and hot water is supplied from hot water supply nozzle 2170 into agitation tank 2510. Hot water prepared in apparatus main body 2100 and tea leaf powders obtained by milling unit 2300 are introduced into agitation tank 2510, and hot water and tea leaf powders are agitated by agitation blade 2550 in agitation tank 2510. Tea is thus prepared in agitation tank 2510.

Tea prepared in agitation unit 2500 can be poured into a cup (not shown) placed on placement base 2900 by operating an operation lever 2542 of a discharge port opening and closing mechanism 2540 provided below agitation unit 2500. A detailed structure of agitation unit 2500 will be described later with reference to FIGS. 61 and 62.

(Flow of Preparation of Tea (Beverage))

Figure 54:
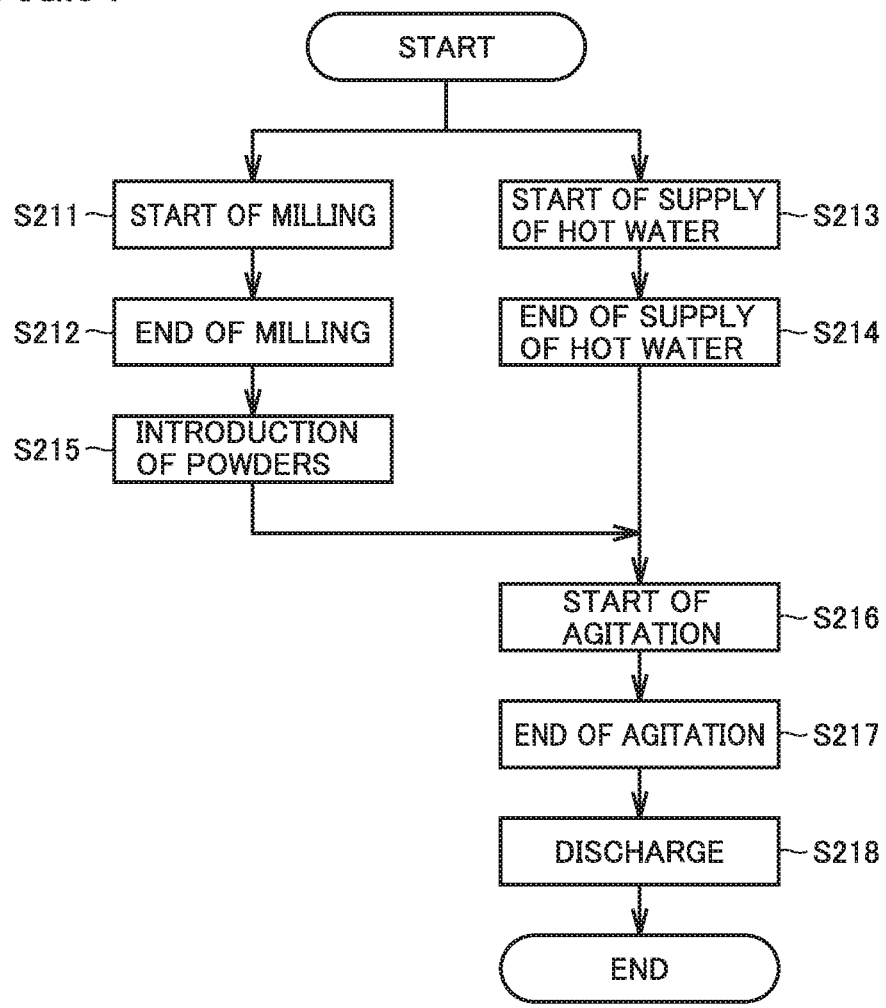
FIG. 54 shows a first preparation flow showing discharge of tea using the beverage preparation apparatus shown in FIG. 51.
Figure 55:
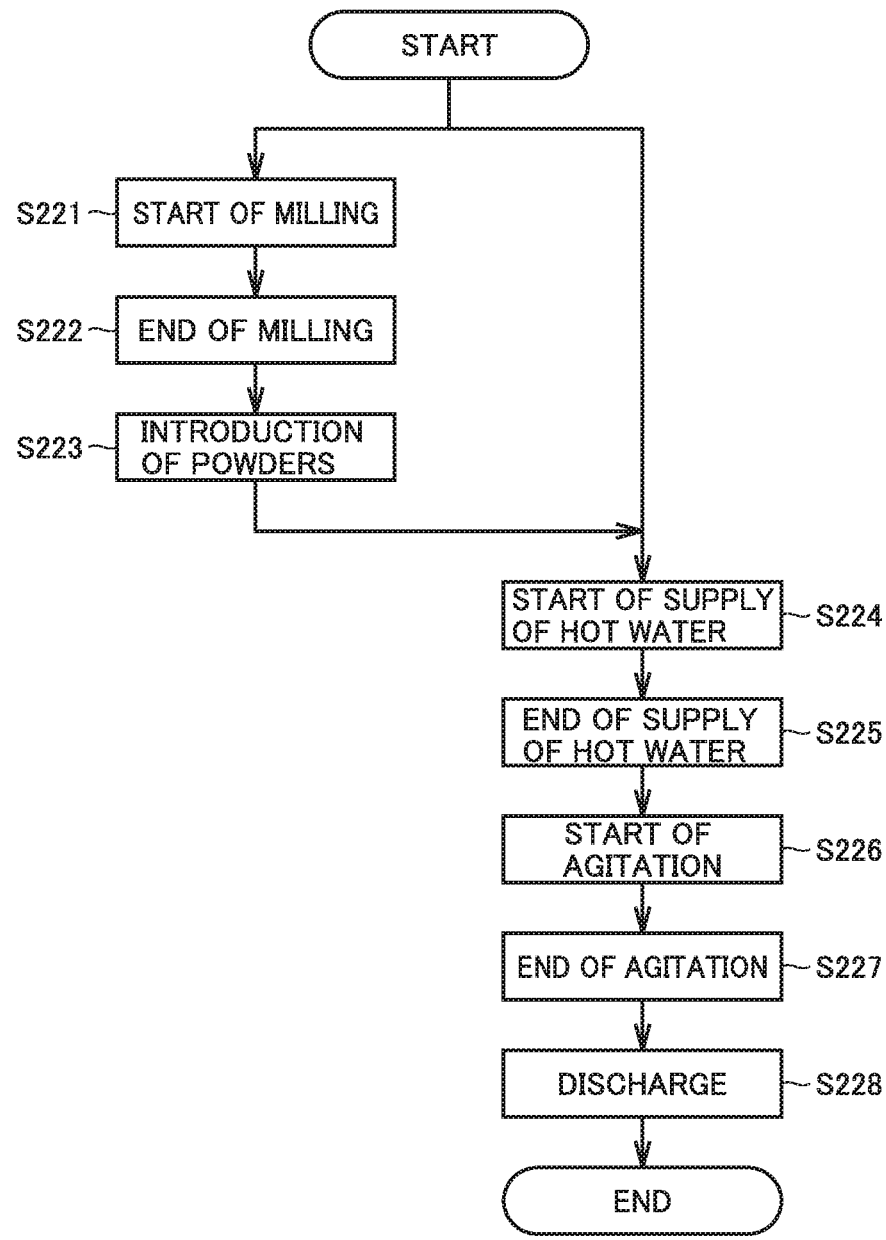
FIG. 55 shows a second preparation flow showing discharge of tea using the beverage preparation apparatus shown in FIG. 51.
Figure 56:
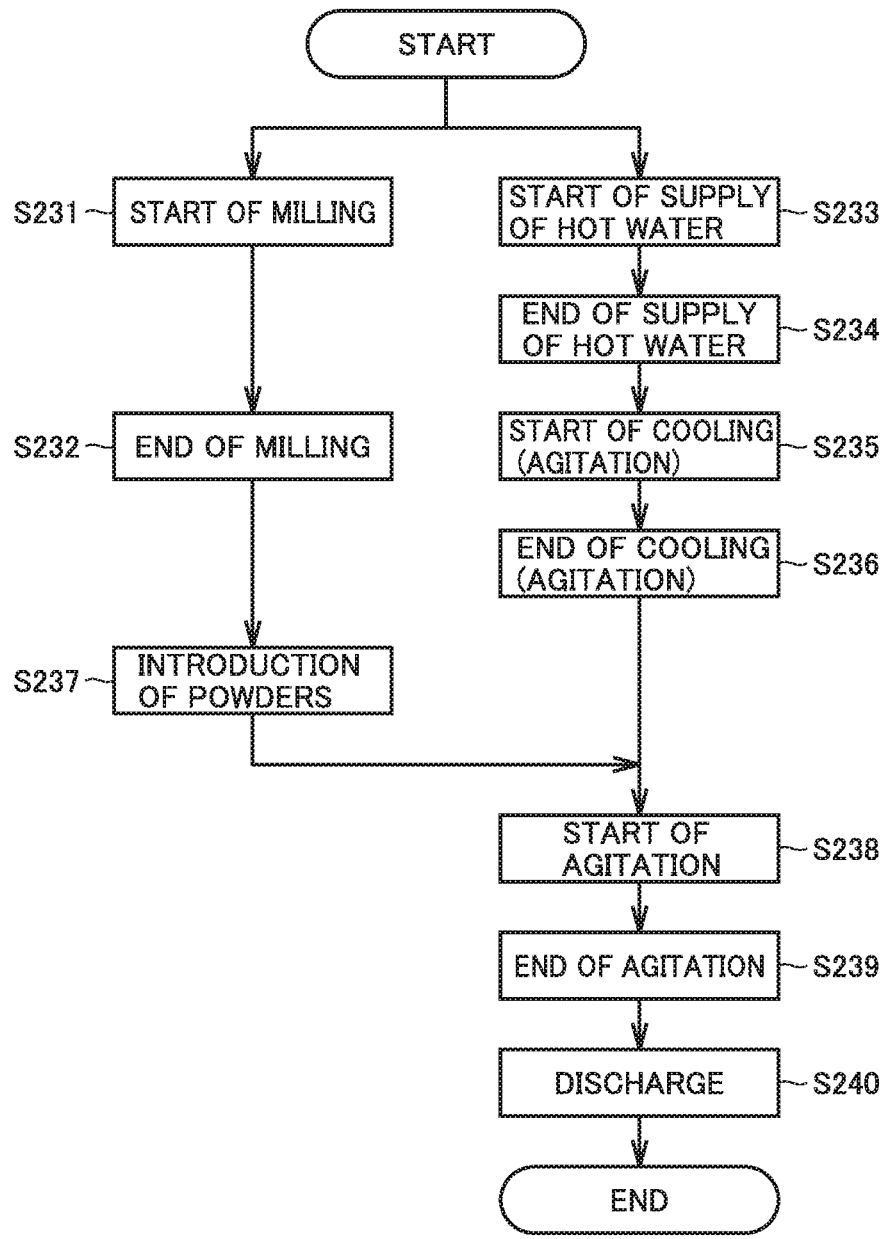
FIG. 56 shows a third preparation flow showing discharge of tea using the beverage preparation apparatus shown in FIG. 51.

A flow of preparation of tea (beverage) with the use of beverage preparation apparatus 2001 will now be described with reference to FIGS. 54 to 56. FIGS. 54 to 56 show first to third preparation flows showing discharge of tea using beverage preparation apparatus 2001, respectively. A prescribed amount of tea leaves is introduced into milling unit 2300 and a prescribed amount of water is stored in liquid storage tank 2700.

(First Preparation Flow)

A first preparation flow will be described with reference to FIG. 54. This first preparation flow is a flow in which grating of tea leaves in milling unit 2300 and supply of hot water from apparatus main body 2100 to agitation unit 2500 are simultaneously carried out.

In beverage preparation apparatus 2001, milling of tea leaves by milling unit 2300 in a step 211 and supply of hot water from apparatus main body 2100 to agitation unit 2500 in a step 213 are simultaneously started. Then, milling of tea leaves by milling unit 2300 ends in a step 212, and supply of hot water from apparatus main body 2100 to agitation unit 2500 ends in a step 214.

In a step 215, tea leaf powders obtained in step 212 are introduced into agitation unit 2500 by a user.

Then, in a step 216, agitation of the tea leaf powders and hot water in agitation unit 2500 is started. In a step 217, agitation of the tea leaf powders and hot water in agitation unit 2500 ends. In a step 218, tea is discharged into the cup placed on placement base 2900 as the user operates operation lever 2542 of discharge port opening and closing mechanism 2540 provided below agitation unit 2500.

(Second Preparation Flow)

A second preparation flow will be described with reference to FIG. 55. This second preparation flow is a flow in which hot water is supplied from apparatus main body 2100 to agitation unit 2500 after tea leaves are grated in milling unit 2300.

In beverage preparation apparatus 2001, in a step 221, milling of tea leaves by milling unit 2300 is started. In a step 222, milling of tea leaves by milling unit 2300 ends. In a step 223, tea leaf powders obtained in step 222 are introduced into agitation unit 2500 by a user.

In a step 224, supply of hot water from apparatus main body 2100 to agitation unit 2500 is started. In a step 225, supply of hot water from apparatus main body 2100 to agitation unit 2500 ends.

Then, in a step 226, agitation of the tea leaf powders and hot water in agitation unit 2500 is started. In a step 227, agitation of the tea leaf powders and hot water in agitation unit 2500 ends. In a step 228, tea is discharged into the cup placed on placement base 2900 as the user operates operation lever 2542 of discharge port opening and closing mechanism 2540 provided below agitation unit 2500.

(Third Preparation Flow)

A third preparation flow will be described with reference to FIG. 56. This third preparation flow includes a step of cooling hot water by agitation in agitation unit 2500.

In beverage preparation apparatus 2001, milling of tea leaves by milling unit 2300 in a step 231 and supply of hot water from apparatus main body 2100 to agitation unit 2500 in a step 233 are simultaneously started. In a step 234, supply of hot water from apparatus main body 2100 to agitation unit 2500 ends.

Then, in a step 232, milling of tea leaves by milling unit 2300 ends, and in a step 235, cooling by agitation of hot water supply is started in agitation unit 2500. In a step 236, cooling by agitation of hot water supply in agitation unit 2500 ends.

In a step 237, the tea leaf powders obtained in step 232 are introduced into agitation unit 2500 by a user.

Then, in a step 238, agitation of the tea leaf powders and hot water in agitation unit 2500 is started. In a step 239, agitation of the tea leaf powders and hot water in agitation unit 2500 ends. In a step 240, tea is discharged into the cup placed on placement base 2900 as the user operates operation lever 2542 of discharge port opening and closing mechanism 2540 provided below agitation unit 2500.

(Internal Structure of Apparatus Main Body 2100)

Figure 57:
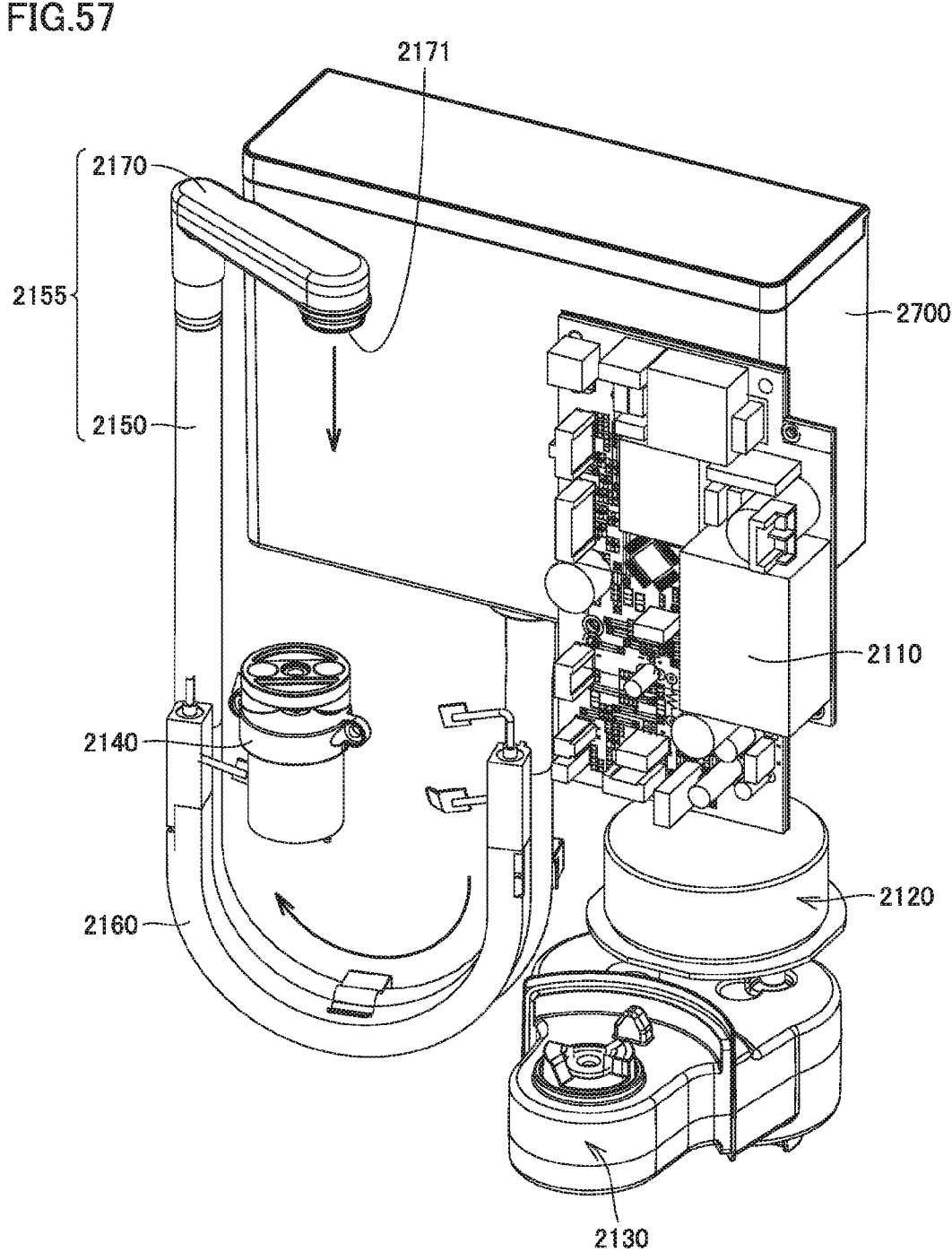
FIG. 57 is a perspective view showing an internal structure of the beverage preparation apparatus shown in FIG. 51.

An internal structure of apparatus main body 2100 will now be described with reference to FIG. 57. FIG. 57 is a perspective view showing the internal structure of beverage preparation apparatus 2001. In apparatus main body 2100 of beverage preparation apparatus 2001, a control unit 2110 including a printed circuit board on which electronic components are mounted is arranged on a front surface side of liquid storage tank 2700. Based on input of a start signal by a user, the flow for preparation of tea is executed by control unit 2110.

A milling motor unit 2120 for providing driving force to milling unit 2300 is arranged at a position below control unit 2110. Milling driving force coupling mechanism 2130 provided to protrude forward for transmitting driving force of milling motor unit 2120 to milling unit 2300 is provided at a position below milling motor unit 2120.

To a bottom surface of liquid storage tank 2700, one end of hot water supply pipe 2150 extending once downward from the bottom surface and then extending upward in a U shape is coupled. Hot water supply nozzle 2170 for pouring hot water into agitation tank 2510 of agitation unit 2500 is coupled to the other end side of hot water supply pipe 2150. A U-shaped heater 2160 for heating water which passes through hot water supply pipe 2150 is attached to an intermediate region of hot water supply pipe 2150. Water becomes hot by being heated by heater 2160, and resultant hot water is supplied to agitation tank 2510.

(Structure of Milling unit 2300)

Figure 58:
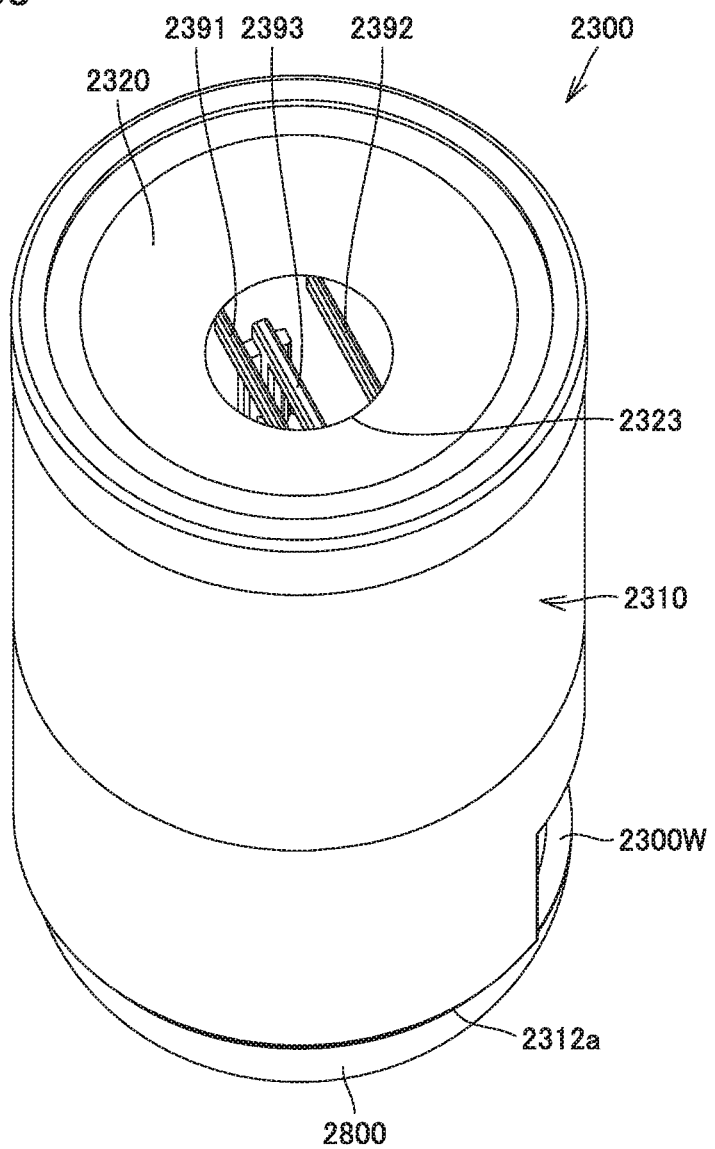
FIG. 58 is a perspective view of a milling unit provided in the beverage preparation apparatus shown in FIG. 51.
Figure 59:
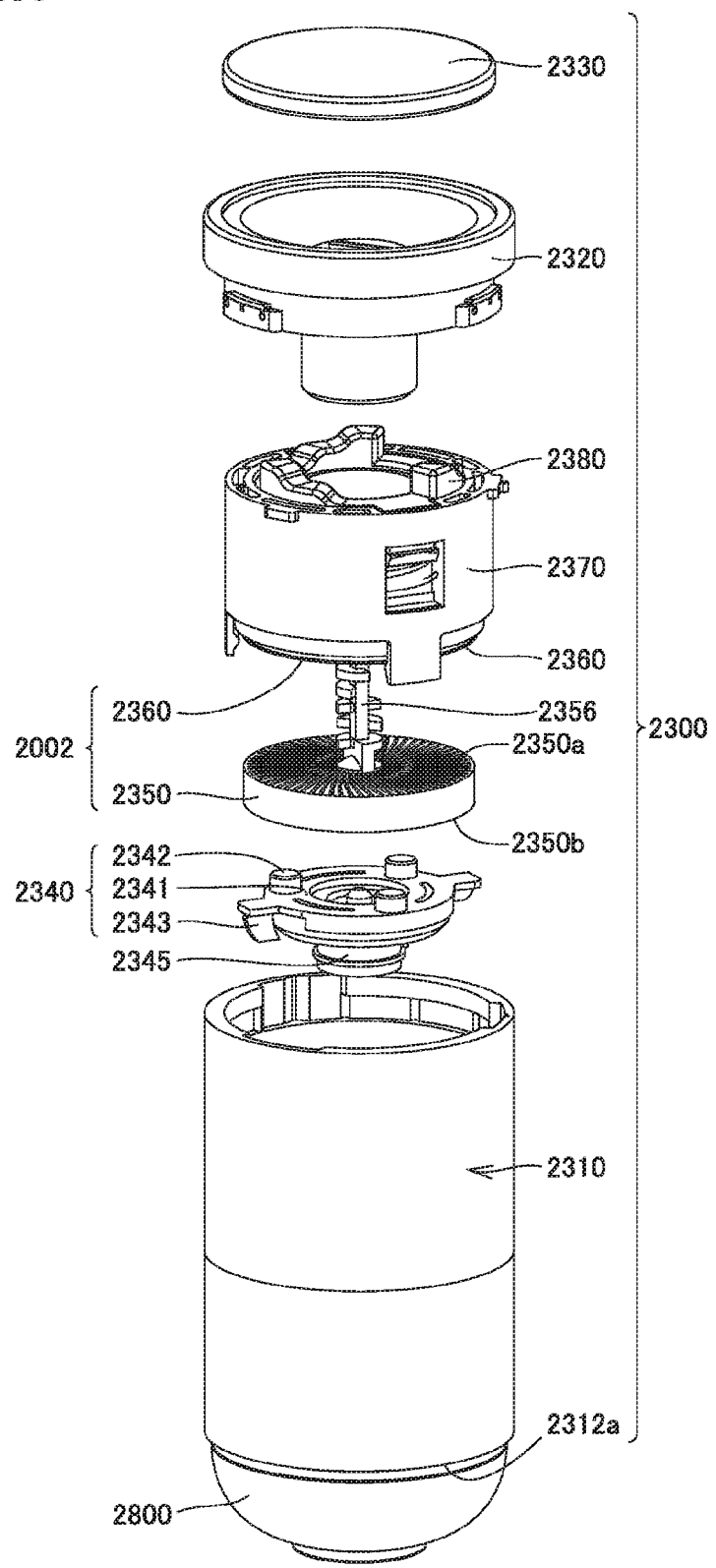
FIG. 59 is an exploded perspective view of the milling unit shown in FIG. 8.
Figure 60:
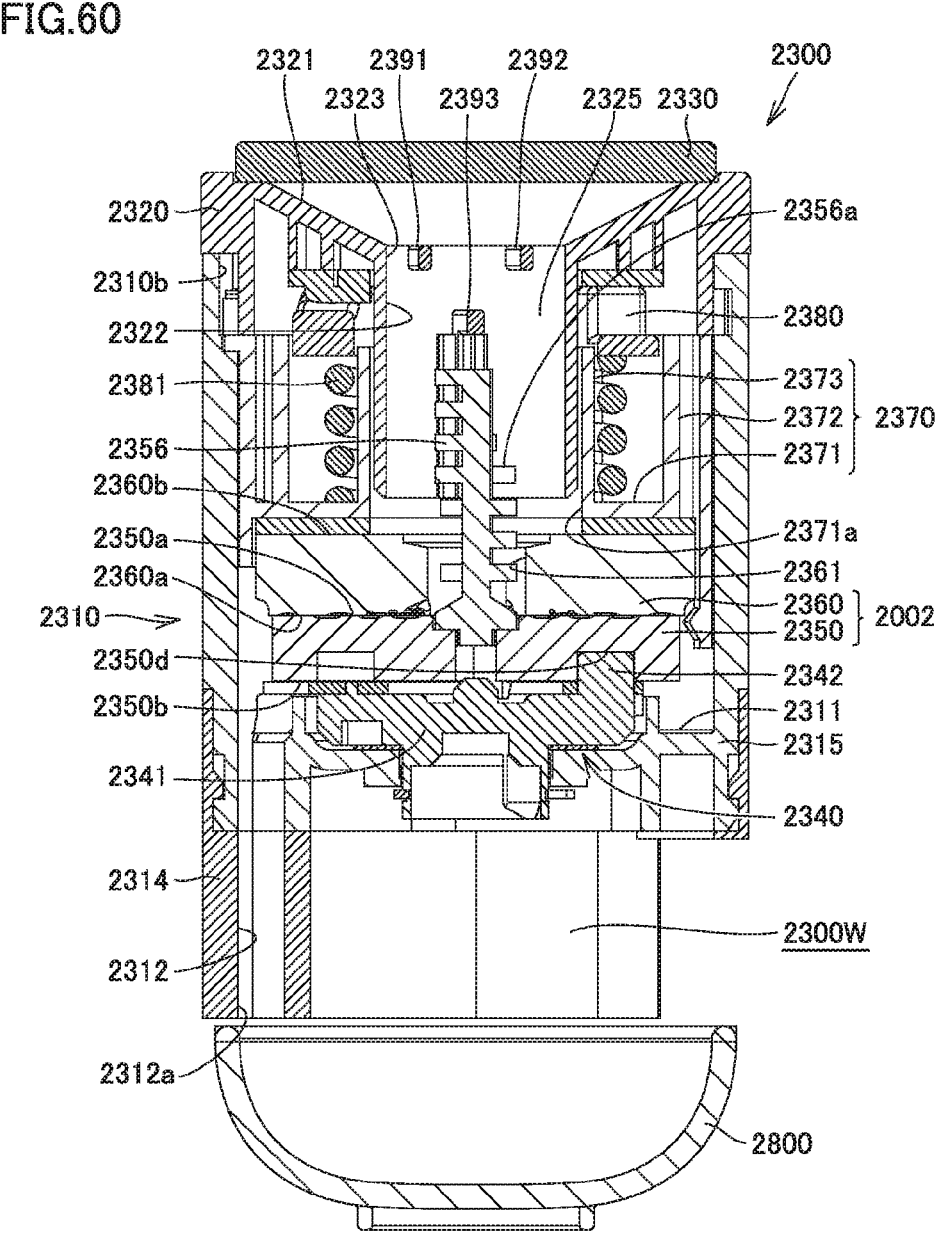
FIG. 60 is a vertical cross-sectional view of the milling unit shown in FIG. 8.

A structure of milling unit 2300 will now be described with reference to FIGS. 58 to 60. FIG. 58 is a perspective view of milling unit 2300, FIG. 59 is an exploded perspective view of milling unit 2300, and FIG. 60 is a vertical cross-sectional view of milling unit 2300.

Milling unit 2300 has a milling case 2310 having a cylindrical shape as a whole, and a window for coupling 2300W in which milling driving force coupling mechanism 2130 is inserted is provided in a side surface below. A storage portion 2311 (see FIG. 60) for storing tea leaf powders produced by an upper mill 2360 as a first mill and a lower mill 2350 as a second mill which will be described later and a discharge path 2312 communicating with storage portion 2311 are provided. An outlet port 2312a for discharging tea leaf powders into tea leaf powder tray 2800 is provided at a lower end portion of discharge path 2312 which is a lowermost end portion of milling case 2310. Outlet port 2312a is provided below an opening portion 2513 of a thermally insulated tank 2512 (see FIG. 62) which will be described later. Entry through outlet port 2312a, of steam resulting from hot water supplied into thermally insulated tank 2512 can thus be prevented.

Milling unit 2300 includes a mill 2002 having upper mill 2360 and lower mill 2350 which grate an object to be grated and a lower mill support portion 2340 to which lower mill 2350 is attached. In milling case 2310, lower mill support portion 2340, lower mill 2350, and upper mill 2360 are successively provided from below.

Lower mill support portion 2340 supports lower mill 2350 from a side opposite to a side where upper mill 2360 is located (a side below lower mill 2350). Lower mill support portion 2340 has a substantially columnar main body portion 2341, an engagement protrusion portion 2342, and a powder scraping portion 2343. A milling shaft 2345 is provided on a lower surface of main body portion 2341 and extends downward. Milling shaft 2345 is coupled to milling driving force coupling mechanism 2130. Lower mill support portion 2340 is thus rotatable while it supports lower mill 2350.

Engagement protrusion portion 2342 is provided on an upper surface of main body portion 2341 and protrudes upward. Engagement protrusion portion 2342 is a site for attachment of lower mill 2350. Powder scraping portion 2343 is provided around a circumferential portion of main body portion 2341. Powder scraping portion 2343 scrapes off tea leaf powders stored in storage portion 2311 and transports the tea leaf powders to discharge path 2312 as lower mill support portion 2340 rotates. Lower mill 2350 includes a second grinding surface 2350a arranged to be opposed to a first grinding surface 2360a of upper mill 2360 which will be described later and a main surface 2350b located opposite to second grinding surface 2350a. A shear groove 2351 (see FIG. 64) which will be described later is formed in second grinding surface 2350a of lower mill 2350.

An engagement recess portion 2350d is provided in main surface 2350b of lower mill 2350. Engagement recess portion 2350d is provided at a position corresponding to engagement protrusion portion 2342 of lower mill support member 2340 and locked by engagement protrusion portion 2342. Lower mill 2350 rotates in coordination with lower mill support member 2340. A core 2356 extending upward along a core of a rotation shaft is provided in a central portion of lower mill 2350.

Core 2356 is provided to pass through a through hole 2361 provided in a central portion of upper mill 2360. Core 2356 has a helically provided blade portion 2356a.

Upper mill 2360 includes first grinding surface 2360a arranged to be opposed to second main surface 2350a of lower mill 2350 and a main surface 2360b located opposite to first grinding surface 2360a. A shear groove is formed in first grinding surface 2360a of upper mill 2360.

Upper mill 2360 is held by an upper mill holding member 2370 arranged above the upper mill. A not-shown hole portion is provided in an upper surface of upper mill 2360. As a not-shown pin portion provided in upper mill holding member 2370 enters the hole portion, rotation of upper mill 2360 is prevented.

Upper mill holding member 2370 includes a bottom surface portion 2371 provided with a hole portion 2371a, an outer cylindrical portion 2372 erected upward from a circumference of bottom surface portion 2371, and an inner cylindrical portion 2373 erected upward from a circumference of hole portion 2371a. Hole portion 2371a is provided to communicate with through hole 2361 in upper mill 2360. A spring 2381 pressing upper mill 2360 downward and a spring holding member 2380 are accommodated in between outer cylindrical portion 2372 and inner cylindrical portion 2373. Spring 2381 adjusts a grating pressure applied between upper mill 2360 and lower mill 2350.

A hopper portion 2320 for supplying an object to be grated in between upper mill 2360 and lower mill 2350 is attached to a side of upper end opening portion 2310b of milling case 2310. Hopper portion 2320 has a top plate portion 2321, a cylindrical portion 2322, and an object-to-be-grated inlet 2325. Top plate portion 2321 has such a bowl shape that an opening portion 2323 is provided substantially in a central portion. Cylindrical portion 2322 is provided to extend downward from a circumference of opening portion 2323. Cylindrical portion 2322 is inserted in inner cylindrical portion 2373.

Object-to-be-grated inlet 2325 is defined by opening portion 2323 and cylindrical portion 2322. A tip end side of core 2356 is accommodated in object-to-be-grated inlet 2325. In cylindrical portion 2322, a plurality of linear ribs 2391, 2392, and 2393 are provided across object-to-be-grated inlet 2325.

In grating tea leaves, hopper portion 2320 is preferably covered with a cover portion 2330. Thus, after tea leaves are introduced into object-to-be-grated inlet 2325, entry of a foreign matter into milling unit 2300 and scattering of grated tea leaves can be prevented. When tea leaves are to be introduced, cover portion 2330 is removed from hopper portion 2320.

Tea leaves introduced into object-to-be-grated inlet 2325 are accommodated in a space defined by the upper surface of upper mill 2360 exposed through upper mill holding member 2370 and an inner circumferential surface of cylindrical portion 2322. Tea leaves accommodated in the space are guided in between upper mill 2360 and lower mill 2350 as helical blade portion 2356a rotates with rotation of lower mill 2350.

Tea leaves guided in between upper mill 2360 and lower mill 2350 are grated and fall downward in a form of tea leaf powders from a circumference of upper mill 2360 and lower mill 2350. Some of fallen tea leaf powders is discharged through discharge path 2312 into tea leaf powder tray 2800 from outlet port 2312a. Other fallen tea leaf powders are stored in storage portion 2311. Tea leaf powders in storage portion 2311 are transported to discharge path 2312 and discharged from outlet port 2312a into tea leaf powder tray 2800 as powder scraping portion 2343 rotates with rotation of lower mill support portion 2340.

In the present embodiment, first grinding surface 2360a of upper mill 2360 and second grinding surface 2350a of lower mill 2350 have a projecting and recessed shape for fitting with each other as will be described later, so that an area of first grinding surface 2360a and second grinding surface 2350a can be increased even though an outer diameter of upper mill 2360 and an outer diameter of lower mill 2350 are made smaller. Thus, even though mill 2002 and beverage preparation apparatus 2001 are reduced in size by making the outer diameters of upper mill 2360 and lower mill 2350 smaller, fine powders can be obtained. A structure of mill 2002 for obtaining such an effect, specifically, a detailed shape of first grinding surface 2360a and a detailed shape of second grinding surface 2350a, will be described later with reference to FIGS. 63 to 69.

(Structure of Agitation Unit 2500)

Figure 61:
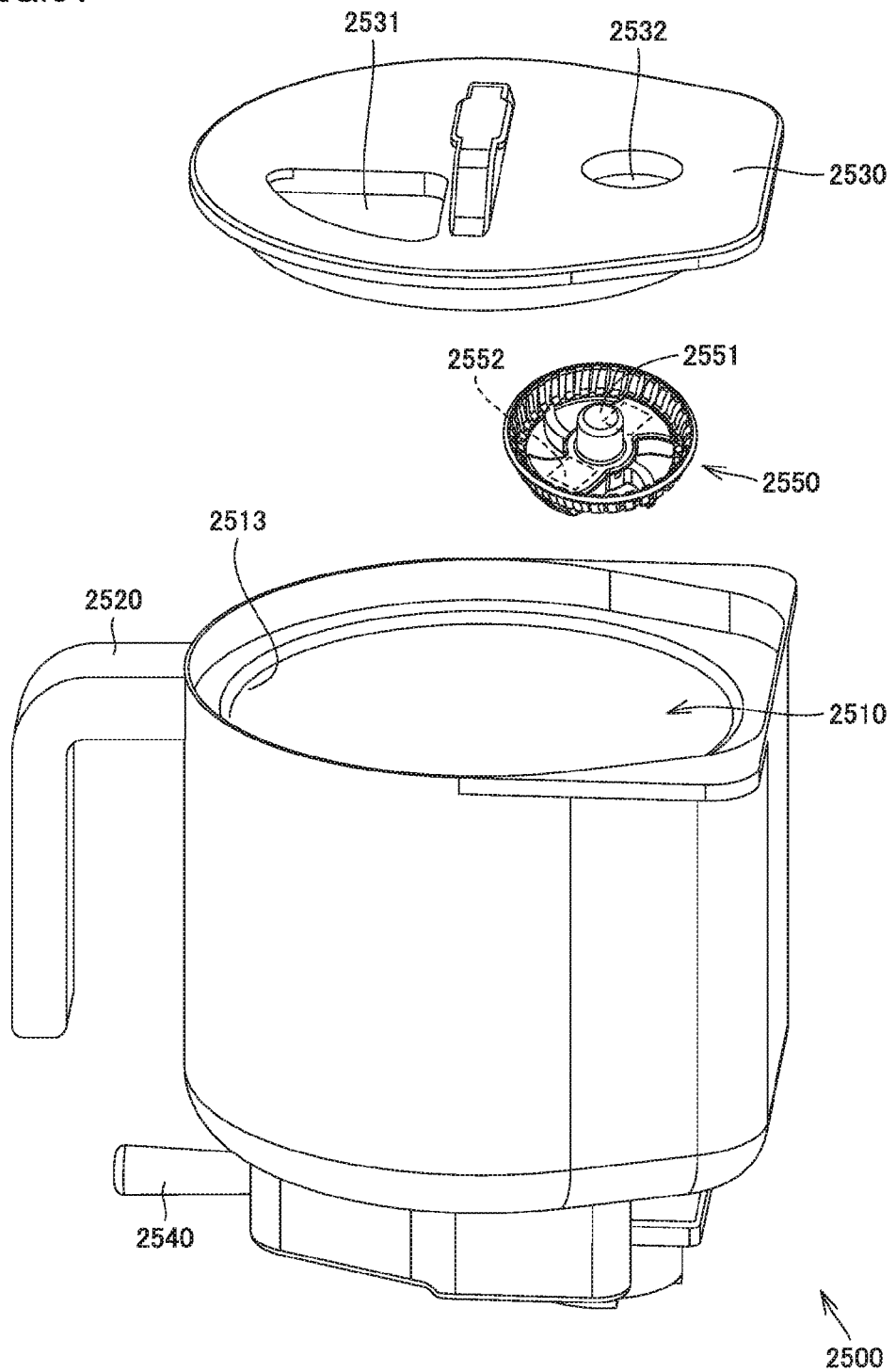
FIG. 61 is an exploded perspective view of an agitation unit provided in the beverage preparation apparatus shown in FIG. 51.
Figure 62:
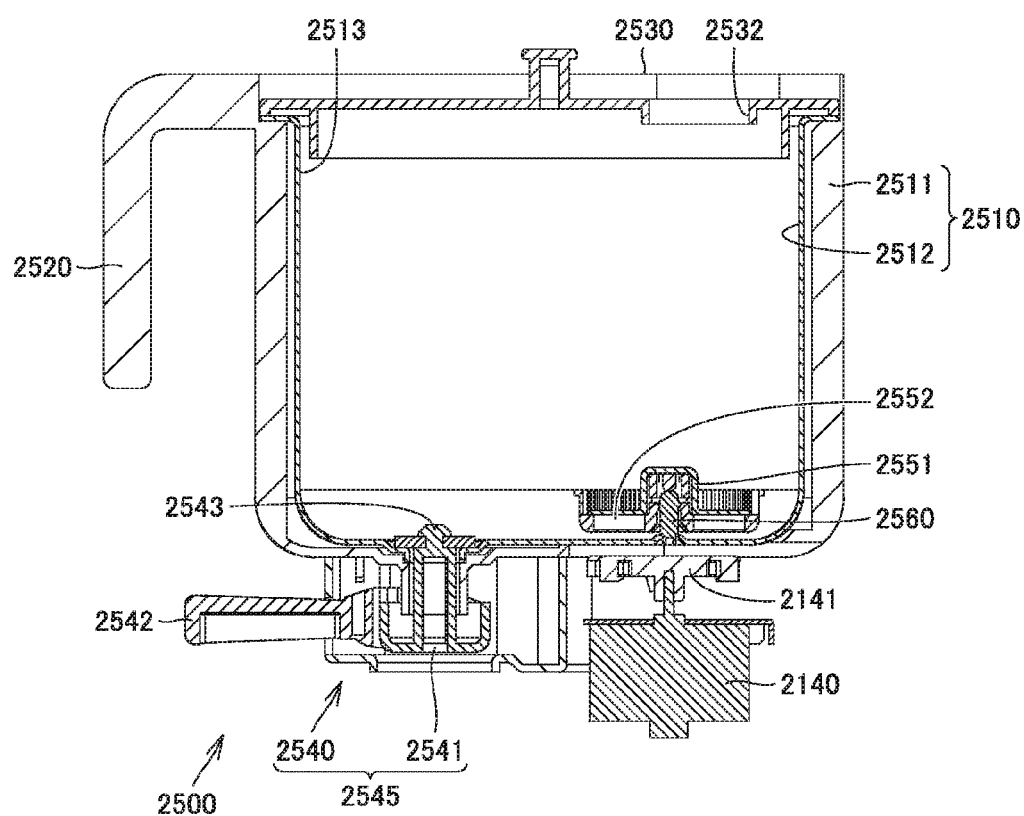
FIG. 62 is a vertical cross-sectional view of the agitation unit shown in FIG. 61.

A structure of agitation unit 2500 will now be described with reference to FIGS. 61 and 62. FIG. 61 is an exploded perspective view of agitation unit 2500 and FIG. 62 is a vertical cross-sectional view of agitation unit 2500.

Agitation unit 2500 includes agitation tank 2510, agitation blade 2550, and an agitation cover 2530. Agitation tank 2510 includes an exterior holder 2511 made of a resin, thermally insulated tank 2512 held by exterior holder 2511, and opening portion 2513. An integrally resin molded grip 2520 is provided in exterior holder 2511. Thermally insulated tank 2512 has opening portion 2513 which has a cylindrical shape with bottom and opens upward.

Agitation cover 2530 covers opening portion 2513 so as to be able to open and close opening portion 2513. Agitation cover 2530 is provided with a powder inlet 2531 for introducing tea leaf powders grated by milling unit 2300 and a hot water supply inlet 2532 through which hot water formed in apparatus main body 2100 is poured from hot water supply nozzle 2170. Hot water supply inlet 2532 is provided at a position corresponding to supply port 2171 of hot water supply nozzle 2170.

Powder inlet 2531 and hot water supply inlet 2532 communicate with opening portion 2513. Tea leaf powders introduced from moved tea leaf powder tray 2800 to powder inlet 2531 are introduced into agitation tank 2510 through opening portion 2513. Hot water poured through hot water supply inlet 2532 from hot water supply nozzle 2170 is supplied into agitation tank 2510 through opening portion 2513.

Agitation blade 2550 is placed on a bottom portion of agitation tank 2510. A rotation shaft 2560 extending upward is provided on the bottom portion of agitation tank 2510, and a bearing portion 2551 for agitation blade 2550 is inserted in this rotation shaft 2560.

A magnet 2552 is embedded in agitation blade 2550. In agitation motor contactless table 2140A, magnet 2552 embedded in agitation blade 2550 and magnet 2141 provided on a side of agitation motor unit 2140 are magnetically coupled in a contactless state, so that rotational driving force of agitation motor unit 2140 is transmitted to agitation blade 2550.

Agitation tank 2510 further includes a discharge portion 2545 for discharging a prepared beverage. Discharge portion 2545 is provided in agitation tank 2510 in a portion protruding from apparatus main body 2100. Discharge portion 2545 includes a discharge port 2541 provided in the bottom portion of agitation tank 2510 and discharge port opening and closing mechanism 2540 opening and closing discharge port 2541. Discharge port 2541 is a portion for discharging tea prepared by agitation of tea leaf powders and hot water by agitation blade 2550.

Discharge port opening and closing mechanism 2540 includes an opening and closing nozzle 2543 inserted into discharge port 2541 so as to be able to open and close discharge port 2541 and operation lever 2542 controlling a position of opening and closing nozzle 2543. Opening and closing nozzle 2543 is biased to close discharge port 2541 by a biasing member (not shown) such as a spring in a normal state. When a user moves operation lever 2542 against biasing force, opening and closing nozzle 2543 moves to open discharge port 2541 and thus tea in agitation tank 2510 is poured into a cup (not shown) placed on placement base 2900.

(Mill 2002)

Figure 63:
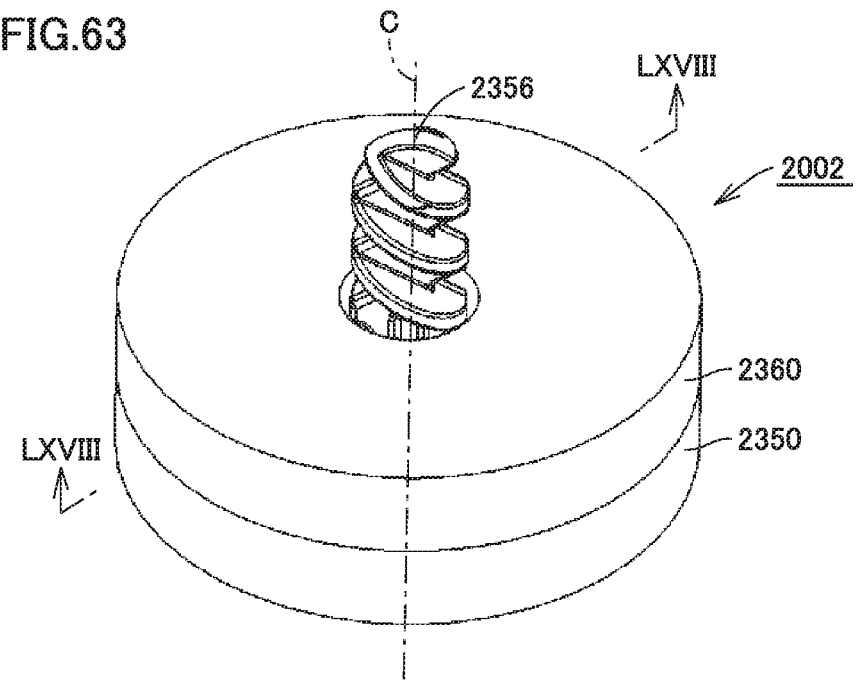
FIG. 63 is a perspective view showing a construction of the mill according to Embodiment 17.

Mill 2002 according to the present embodiment will be described with reference to FIG. 63. FIG. 63 is a perspective view showing a construction of the mill according to the present embodiment.

As shown in FIG. 63, lower mill 2350 and upper mill 2360 have a common central axis C. As lower mill 2350 rotates around central axis C while upper mill 2360 is fixed, an object to be grated is grated between first grinding surface 2360a and second grinding surface 2350a.

Figure 64:
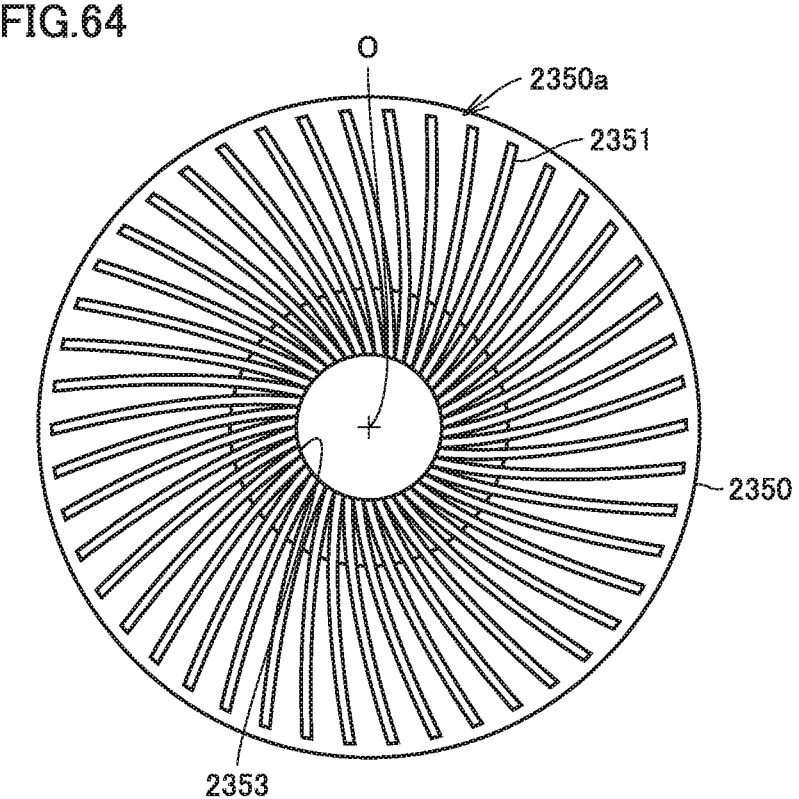
FIG. 64 is a plan view showing a shape of a grating groove provided in a grinding surface of a lower mill provided in the mill shown in FIG. 63.

A shape of a grating groove provided in second grinding surface 2350a of lower mill 2350 will be described with reference to FIG. 64. FIG. 64 is a plan view showing a shape of a grating groove provided in the grinding surface of the lower mill provided in the mill shown in FIG. 63.

As shown in FIG. 64, when viewed in a direction of an axial line of the central axis, a plurality of shear grooves 2351 are provided as the grating grooves in second grinding surface 2350a of lower mill 2350 so as to be curved in the circumferential direction from the inner circumferential side toward the outer circumference. The plurality of shear grooves 2351 are provided to be in rotation symmetry with respect to a center of rotation O. Each of the plurality of shear grooves 2351 extends along an equiangular spiral which will be described later. A plurality of shear grooves also extend along an equiangular spiral as in first grinding surface 2360a of upper mill 2360.

Figure 65:
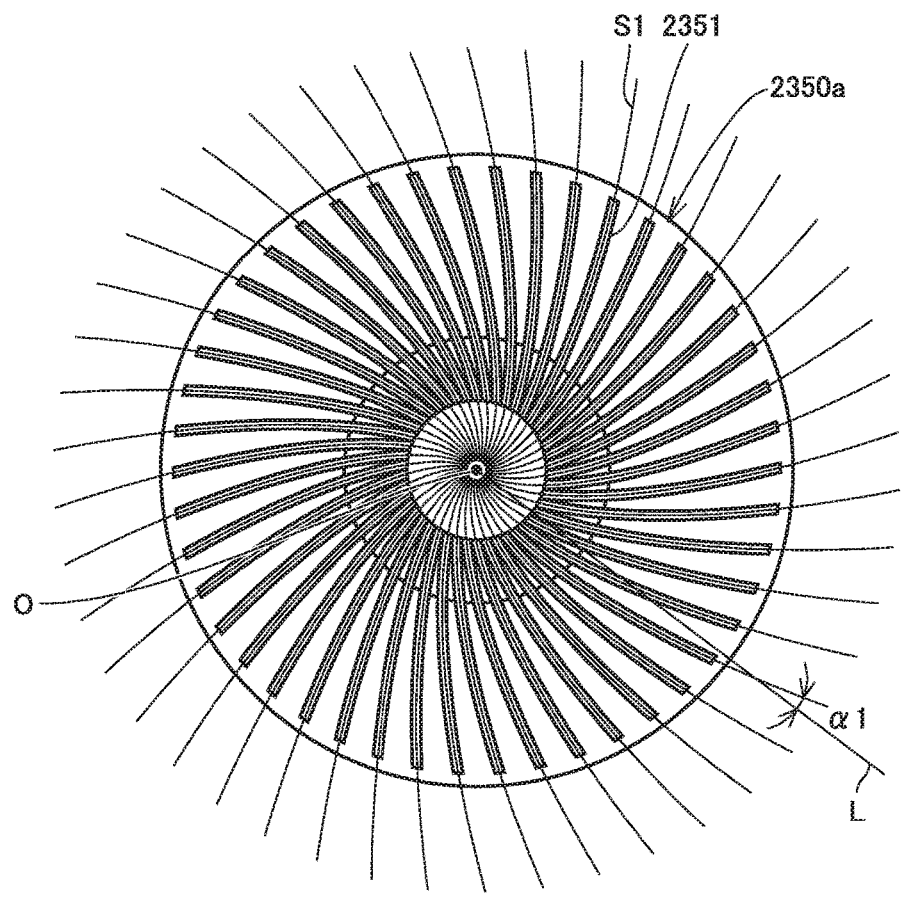
FIG. 65 is a plan view for illustrating a shape of the grating groove shown in FIG. 64.

A detailed shape of the grating groove (shear groove) will be described with reference to FIG. 65. FIG. 65 is a plan view for illustrating a shape of the grating groove shown in FIG. 64.

As shown in FIG. 65, shear groove 2351 is formed along an equiangular spiral S1 when viewed in the direction of the axial line of the central axis. With center of rotation O being defined as the origin, equiangular spiral S (S1) is expressed in an expression 1 below with parameters a and b.

$$S = a \cdot \exp(b \cdot \theta) \qquad \text{(Expression 1)}$$

An angle α (α1) formed between a half line L extending from center of rotation O and an equiangular spiral is expressed in an expression 2 below.

$$\alpha = \text{arc } \cot(b) \qquad \text{(Expression 2)}$$

Equiangular spiral S1 suitable for shear groove 2351 is defined by a=5 and b=0.306 in (Expression 1) and α=17.0° in (Expression 2). In practice, angle α1 formed between half line L and equiangular spiral S1 (shear groove 2351) is desirably 0°<α1<45°, preferably 10°≤α1≤20°, and further preferably α1=17.0°.

Here, mathematic properties of an equiangular spiral expressed in (Expression 1) are that angles α formed between half line L extending from center of rotation O and equiangular spiral S1 are always constant when viewed in the direction of the central axis.

When first grinding surface 2360a and second grinding surface 2350a are arranged to be opposed to each other, the shear groove in first grinding surface 2360a and shear groove 2351 in second grinding surface 2350a intersect with each other with directions of curving being opposite to each other when viewed in the direction of the axial line of the central axis.

Therefore, when rotation is carried out with first grinding surface 2360a of upper mill 2360 and second grinding surface 2350a of lower mill 2350 abutting to each other, an angle of intersection between the shear groove in upper mill 2360 and the shear groove in lower mill 2350 is always 2α when viewed in the direction of the axial line of the central axis.

Figure 66:
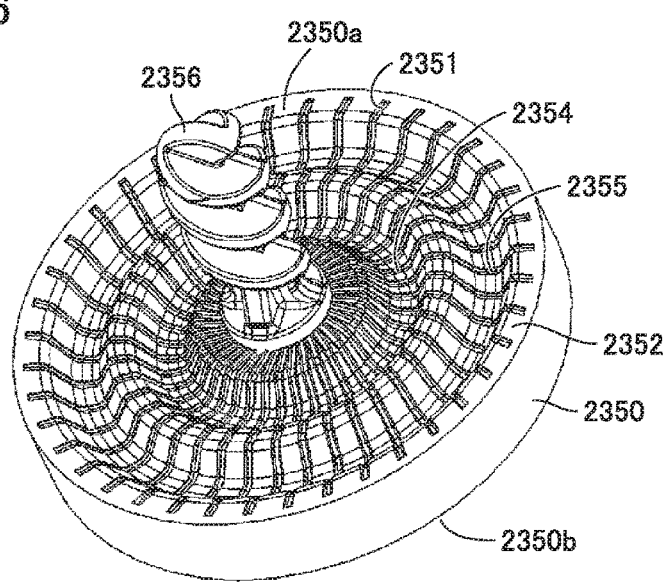
FIG. 66 is a perspective view of the lower mill provided in the mill shown in FIG. 63.
Figure 67:
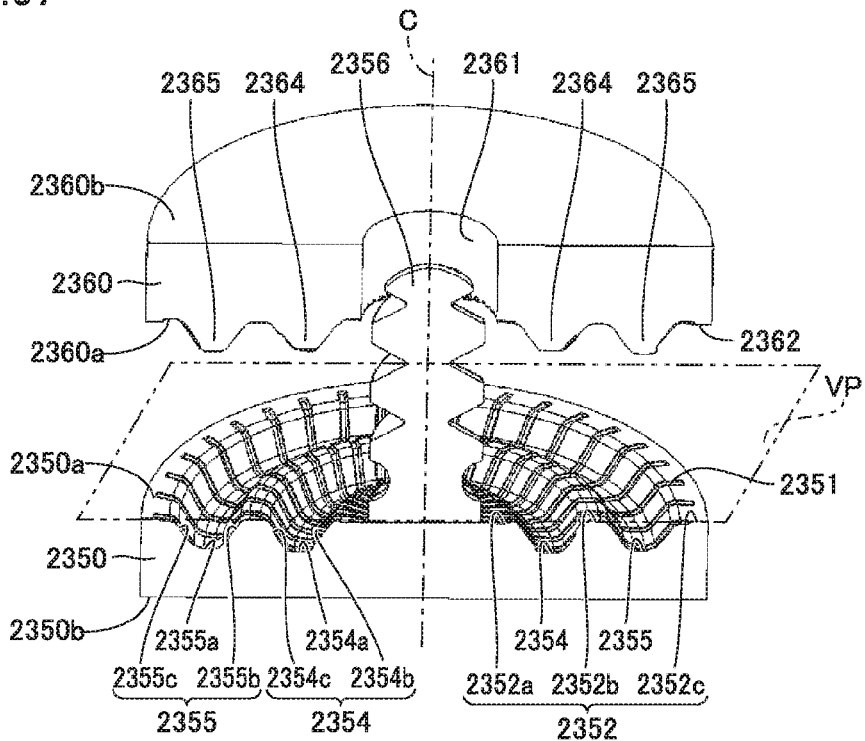
FIG. 67 is an exploded perspective cross-sectional view of the mill shown in FIG. 63.
Figure 68:
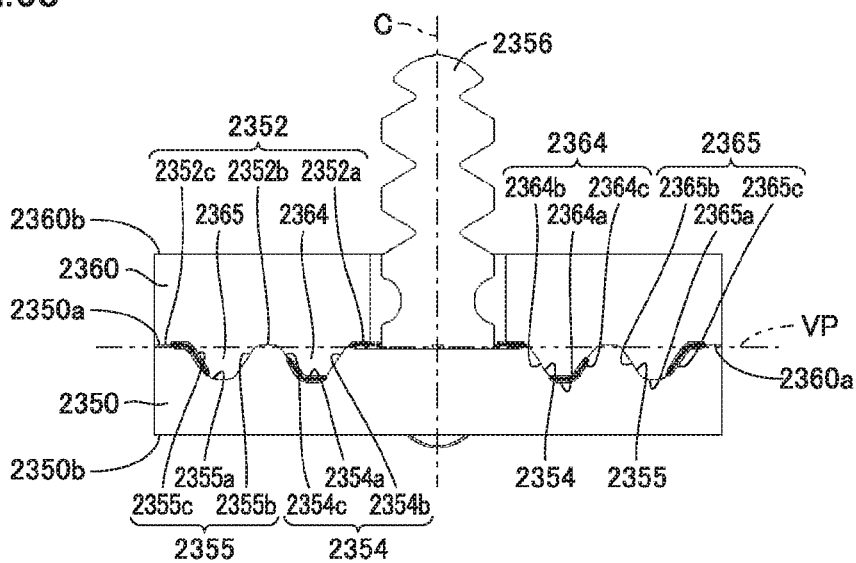
FIG. 68 is a cross-sectional view along the line LXVIII-LXVIII shown in FIG. 63.

A structure of mill 2002, specifically, a shape of first grinding surface 2360a of upper mill 2360 and a shape of second grinding surface 2350a of lower mill 2350, will be described with reference to FIGS. 66 to 68. FIG. 66 is a perspective view of the lower mill provided in the mill shown in FIG. 63. FIG. 67 is an exploded perspective cross-sectional view of the mill shown in FIG. 63. FIG. 68 is a cross-sectional view along the line XVIII-XVIII shown in FIG. 63.

Second grinding surface 2350a includes a flat portion 2352 and two recess portions 2354 and 2355. Flat portion 2352 is a portion of second grinding surface 2350a located at a highest position. Flat portion 2352 includes a flat portion 2352a located around core 2356, a flat portion 2352c located on an outermost circumferential side, and a flat portion 2352b located between flat portion 2352a and flat portion 2352c.

Recess portions 2354 and 2355 are provided to be recessed from a virtual plane VP with virtual plane VP being defined as the reference, virtual plane VP being a plane passing through flat portion 2352 located at the highest position in second grinding surface 2350a and in parallel to the radial direction of central axis C. Recess portions 2354 and 2355 are provided to have an opening area decreasing from virtual plane VP toward below. Recess portions 2354 and 2355 are provided to be in line symmetry with respect to the central axis in an arbitrary cross-section of lower mill 2350 which includes central axis C therein and is perpendicular to virtual plane VP. Recess portions 2354 and 2355 each have a shape of an annular groove and are concentrically provided around central axis C.

A groove in each of recess portions 2354 and 2355 is in a trapezoidal shape having a corner portion rounded in an arbitrary cross-section of lower mill 2350 which includes central axis C therein and is perpendicular to virtual plane VP. Recess portions 2354 and 2355 have bottom portions 2354a and 2355a, an inner circumferential side inclined surfaces 2354b and 2355b, and an outer circumferential side inclined surfaces 2354c and 2355c, respectively. A depth of recess portion 2354 (a distance from virtual plane VP to bottom portion 2354a) is substantially the same as a depth of recess portion 2355 (a distance from virtual plane VP to bottom portion 2355a) and bottom portion 2354a and bottom portion 2355a are flush with each other.

Inner circumferential side inclined surfaces 2354b and 2355b are inclined surfaces of respective recess portions 2354 and 2355 located on a side of central axis C. Outer circumferential side inclined surface 2354c and 2355c are inclined surfaces of respective recess portions 2354 and 2355 located on the outer circumferential side of lower mill 2350.

In an arbitrary cross-section of lower mill 2350 which includes central axis C therein and is perpendicular to virtual plane VP, an angle of inclination of inner circumferential side inclined surface 2354b with respect to virtual plane VP is substantially the same as an angle of inclination of outer circumferential side inclined surface 2354c with respect to virtual plane VP, and an angle of inclination of inner circumferential side inclined surface 2355b with respect to virtual plane VP is substantially the same as an angle of inclination of outer circumferential side inclined surface 2355c with respect to virtual plane VP.

In an arbitrary cross-section of lower mill 2350 which includes central axis C therein and is perpendicular to virtual plane VP, an angle of inclination of inner circumferential side inclined surface 2354b with respect to virtual plane VP is substantially the same as an angle of inclination of inner circumferential side inclined surface 2355b with respect to virtual plane VP, and an angle of inclination of outer circumferential side inclined surface 2354c with respect to virtual plane VP is substantially the same as an angle of inclination of outer circumferential side inclined surface 2355c with respect to virtual plane VP.

By thus providing recess portions 2354 and 2355, second grinding surface 2350a has a height difference. A plurality of shear grooves provided in second grinding surface 2350a are thus provided to have a height difference. Specifically, a shear groove in a portion provided in flat portion 2352 is provided at a position higher than a shear groove in a portion provided in each of bottom portions 2354a and 2355a.

First grinding surface 2360a has flat portion 362 and two projection portions 2364 and 2365. Flat portion 2362 is a portion of first grinding surface 2360a which is located highest while upper mill 2360 and lower mill 2350 are arranged to be opposed to each other. Projection portions 2364 and 2365 are provided to protrude downward from virtual plane VP when first grinding surface 2360a is arranged to abut to or be in proximity to second grinding surface 2350a, and fitted into respective recess portions 2354 and 2355.

Projection portions 2364 and 2365 are in a shape corresponding to respective recess portions 2354 and 2355. Projection portions 2364 and 2365 are in a shape of an annular protrusion and provided concentrically around central axis C.

A protrusion of each of projection portions 2364 and 2365 is in a trapezoidal shape having a rounded corner portion in an arbitrary cross-section of upper mill 2360 which includes central axis C therein and is perpendicular to virtual plane VP. Projection portions 2364 and 2365 have tip end portions 2364a and 2365a, inner circumferential side opposing surfaces 2364b and 2365b, and outer circumferential side opposing surfaces 2364c and 2365c, respectively. A height of projection portion 2364 (a distance from virtual plane VP to tip end portion 2364a) is substantially the same as a height of projection portion 2365 (a distance from virtual plane VP to tip end portion 2365a) and tip end portion 2364a and tip end portion 2365a are flush with each other.

Inner circumferential side opposing surfaces 2364b and 2365b are inclined surfaces of respective projection portions 2364 and 2365 located on a side of central axis C and opposed to inner circumferential side inclined surfaces 2354b and 2355b, respectively. Outer circumferential side opposing surfaces 2364c and 2365c are inclined surfaces of projection portions 2364 and 2365 located on the outer circumferential side of upper mill 2360 and opposed to outer circumferential side inclined surfaces 2354c and 2355c, respectively.

In an arbitrary cross-section of upper mill 2360 which includes central axis C therein and is perpendicular to virtual plane VP, an angle of inclination of inner circumferential side opposing surface 2364b with respect to virtual plane VP is substantially the same as an angle of inclination of outer circumferential side opposing surface 2364c with respect to virtual plane VP, and an angle of inclination of inner circumferential side opposing surface 2365b with respect to virtual plane VP is substantially the same as an angle of inclination of outer circumferential side opposing surface 2365c with respect to virtual plane VP.

In an arbitrary cross-section of upper mill 2360 which includes central axis C therein and is perpendicular to virtual plane VP, an angle of inclination of inner circumferential side opposing surface 2364b with respect to virtual plane VP is substantially the same as an angle of inclination of inner circumferential side opposing surface 2365b with respect to virtual plane VP, and an angle of inclination of outer circumferential side opposing surface 2364c with respect to virtual plane VP is substantially the same as an angle of inclination of outer circumferential side opposing surface 2365c with respect to virtual plane VP.

By thus providing projection portions 2364 and 2365, first grinding surface 2360a has a height difference. The plurality of shear grooves provided in first grinding surface 2360a are thus provided to have a height difference. Specifically, a shear groove in a portion provided in flat portion 362 is provided at a position higher than a shear groove in a portion provided in each of tip end portions 2364a and 2365a while upper mill 2360 and lower mill 2350 are arranged to be opposed to each other.

With the construction as above, upper mill 2360 and lower mill 2350 are fitted to each other by means of projections and recesses so as to be rotatable around central axis C relatively to each other. Tea leaves guided in between lower mill 2350 and upper mill 2360 move radially outward while they are sheared (grated) and meandered in the vertical direction. Specifically, grated tea leaves move sequentially through flat portion 2352a, inner circumferential side inclined surface 2354b, bottom portion 2354a, outer circumferential side inclined surface 2354c, flat portion 2352b, inner circumferential side inclined surface 2355b, bottom portion 2355a, outer circumferential side inclined surface 2355c, and flat portion 2352c, with lower mill 2350 being defined as the reference, and falls downward from the circumference of lower mill 2350. In particular, when grated tea leaves move up outer circumferential side inclined surfaces 2354c and 2355c against gravity, it takes some time to do so and hence tea leaves can be made finer to a considerable extent during this period.

By providing recess portions 2354 and 2355 in lower mill 2350 and providing projection portions 2364 and 2365 which fit therein in upper mill 2360 as set forth above, a surface area of the grinding surface increases. Thus, even when the outer diameter of the upper mill and the outer diameter of the lower mill are made smaller, tea leaves can efficiently be grated and fine powders can be obtained.

For example, when powder tea leaves having a grain size around 20 μm are produced, powder tea leaves can be produced in an amount of approximately 0.4 g/min. by using mill 2002 according to the present embodiment. When a mill provided with a grinding surface provided with shear grooves identical in shape and without any projections and recesses is employed as Comparative Example, powder tea leaves in an amount of approximately 0.3 g/min are produced. Thus, mill 2002 according to the present embodiment can efficiently produce tea leaves.

Thus, mill 2002 and beverage preparation apparatus 2001 including the same according to the present embodiment can be reduced in size with increase in surface area of the grinding surface and can efficiently obtain fine powders.

A shape of a grating groove (shear groove) formed in first grinding surface 2360a of upper mill 2360 and second grinding surface 2350a of lower mill 2350 is not limited only to a shape along the equiangular spiral described above but may be as shown in first to third modifications below.

Figure 69:
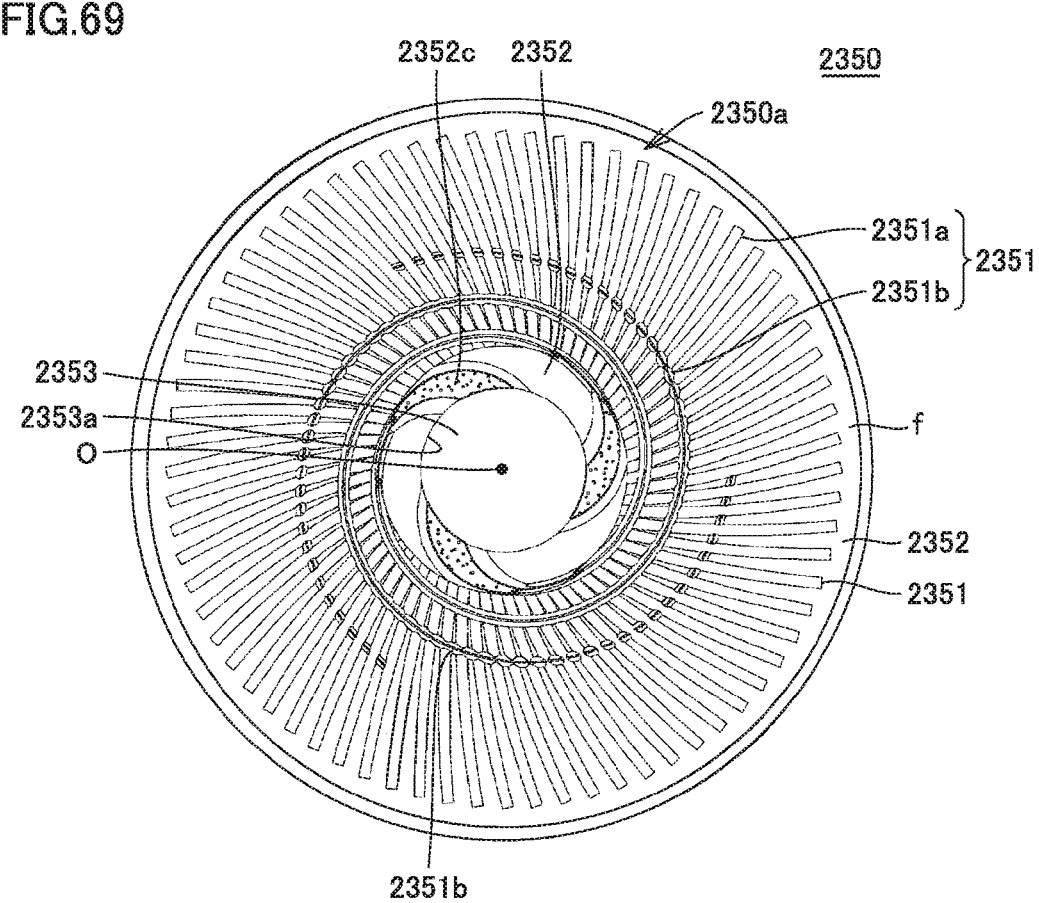
FIG. 69 is a plan view showing a first modification of a shape of a grating groove provided in the grinding surface of the lower mill shown in FIG. 63.
Figure 70:
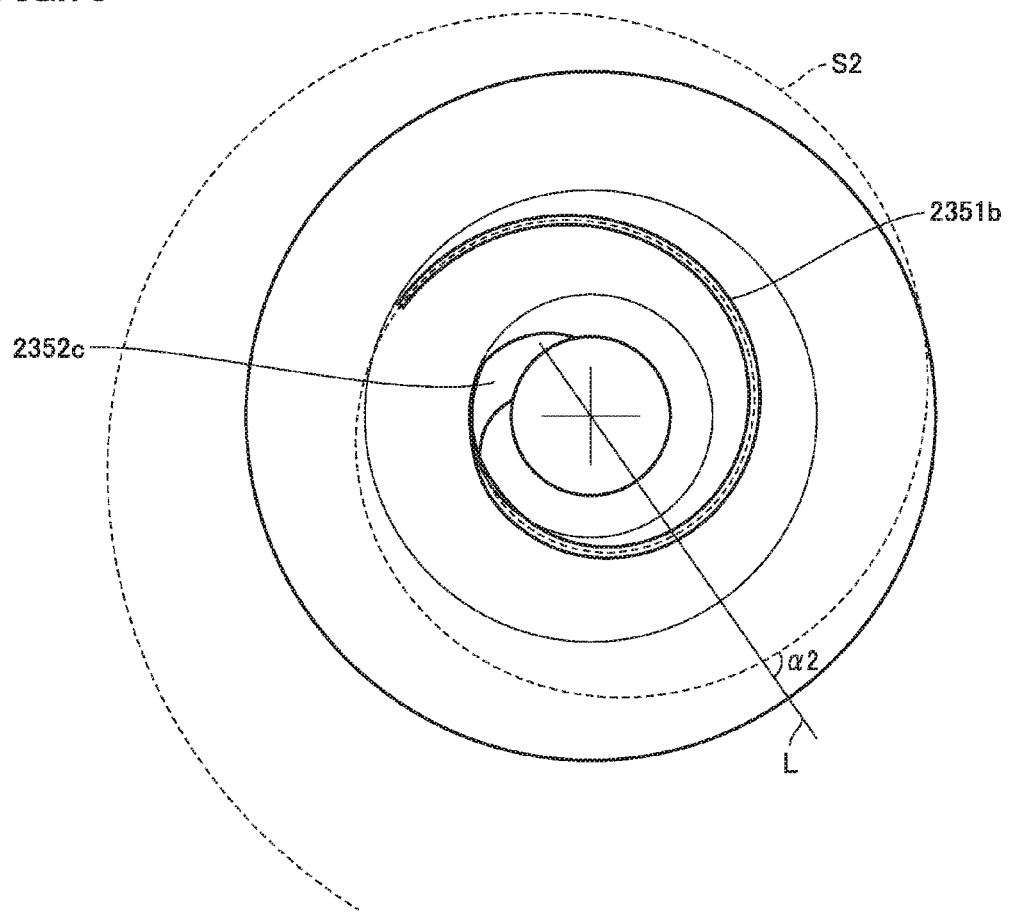
FIG. 70 is a plan view for illustrating a shape of a shear groove shown in FIG. 69.
Figure 71:
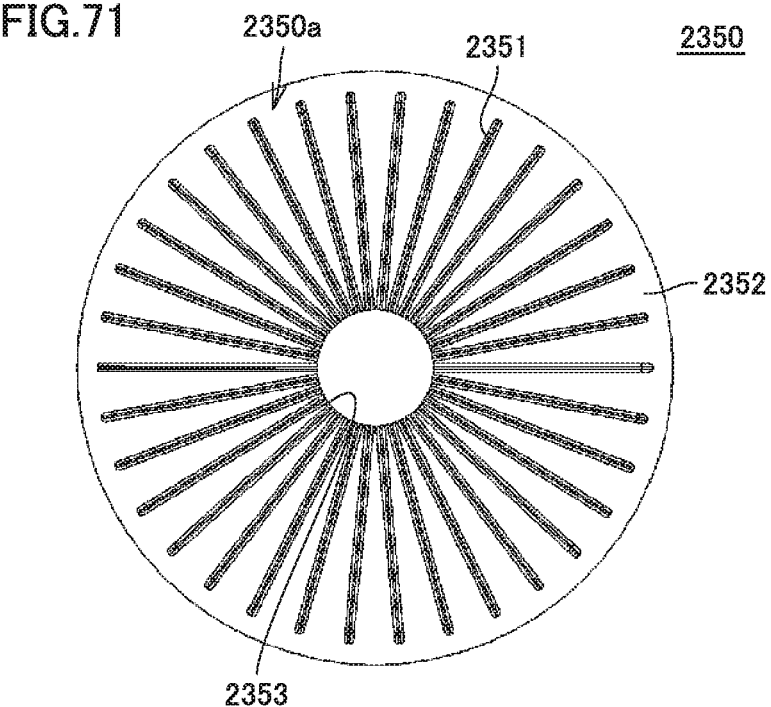
FIG. 71 is a plan view showing a second modification of a shape of a grating groove provided in the grinding surface of the lower mill shown in FIG. 63.
Figure 72:
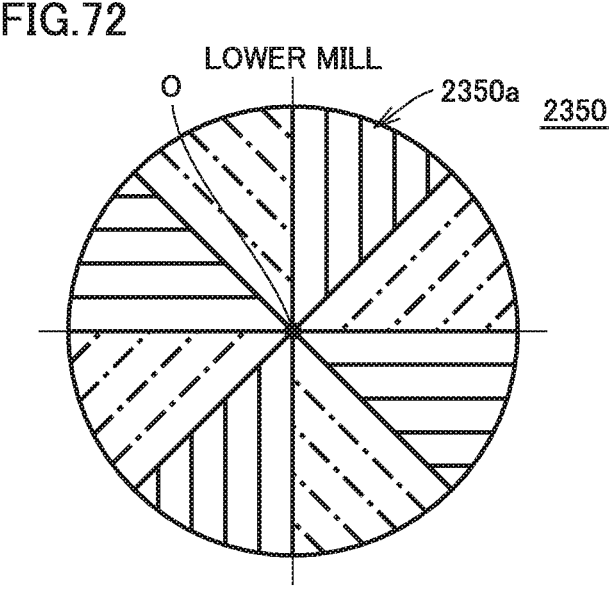
FIG. 72 is a plan view showing a third modification of a shape of a grating groove provided in the grinding surface of the lower mill shown in FIG. 63.

The first to third modifications of a shape of a shear groove formed in first grinding surface 2360a of upper mill 2360 and second grinding surface 2350a of lower mill 2350 will be described with reference to FIGS. 69 to 72. FIG. 69 is a plan view showing the first modification of a shape of the grating groove provided in the grinding surface of the lower mill shown in FIG. 63. FIG. 70 is a plan view for illustrating a shape of the grating groove shown in FIG. 69. FIGS. 71 and 72 are plan views showing the second and third modifications of a shape of the grating groove provided in the grinding surface of the lower mill shown in FIG. 63, respectively. Since a shape of the shear groove provided in the grinding surface of the upper mill is the same as in the lower mill, description will be given with attention being paid only to the lower mill.

As shown in FIG. 69, lower mill 2350 having a shape of the grating groove according to the first modification is provided with three spirally extending intake grooves 2352c in a region from an inner circumferential surface 2353a around an opening portion 2353 of lower mill 2350 to second grinding surface 2350a. Intake groove 2352c is in a shape opening into opening portion (inlet) 2353. The intake groove is arranged immediately lateral to where core 2356 rotates, so that an object to be grated is smoothly fed into intake groove 2352c.

Second grinding surface 2350a of lower mill 2350 is provided with a grating groove 2351 and intake groove 2352c. Grating groove 2351 includes a plurality of shear grooves 2351a and three feed grooves 2351b. A plurality of shear grooves 2351a are provided in rotation symmetry with respect to center of rotation O. Three feed grooves 2351b are also provided in rotation symmetry with respect to center of rotation O.

Shear groove 2351a is a groove mainly for grating an object to be grated and feed groove 2351b is a groove mainly for sending grated powder tea leaves (grated tea leaves) from the central portion of the mill to an outer circumferential portion. Shear groove 2351a and feed groove 2351b are in a form extending along an equiangular spiral.

As shown in FIG. 70, shear groove 2351a (see FIG. 69) extends along an equiangular spiral substantially similarly to shear groove 2351 described above. Feed groove 2351b extends along an equiangular spiral S2 satisfying (Expression 1) described above and an angle α2 formed between half line L extending from center of rotation O and the equiangular spiral also satisfies (Expression 2) above.

Equiangular spiral S2 suitable for feed groove 2351b is defined by a=5 and b=3.7 in (Expression 1) described above and α=74.9° in (Expression 2). In practice, angle α2 formed between half line L and equiangular spiral S2 (feed groove 2351b) is desirably 45°<α2<90°, preferably 70°≤α2≤80°, and further preferably α2=74.9°.

As shown in FIG. 71, second grinding surface 2350a of lower mill 2350 having grating grooves according to the second modification is radially provided with a plurality of shear grooves 2351 extending linearly from the central portion toward the outer circumference as the grating grooves.

As shown in FIG. 72, second grinding surface 2350a of lower mill 2350 having grating grooves according to the third modification has a plurality of shear grooves formed as the grating grooves in parallel to each other at a prescribed pitch, in each of divided regions resulting from division into eight portions with the center of rotation being defined as the reference. Each divided region is substantially in a shape of a sector and has one side portion, the other side portion, and an arc portion. Each of the plurality of shear grooves provided in each divided region is provided to intersect with one side portion at an angle of 45 degrees.

Even when the mill constituted of the lower mill and the upper mill having the shape of the grating groove according to each of the first to third modifications described above is employed, an area of the grinding surface can be increased so long as the projection and recess portions fitted into each other are provided in the grinding surfaces of the lower mill and the upper mill. Thus, even though the outer diameter of upper mill 2360 and the outer diameter of lower mill 2350 are made smaller, tea leaves can efficiently be grated and fine powders can be obtained.

Embodiment 18

Figure 73:
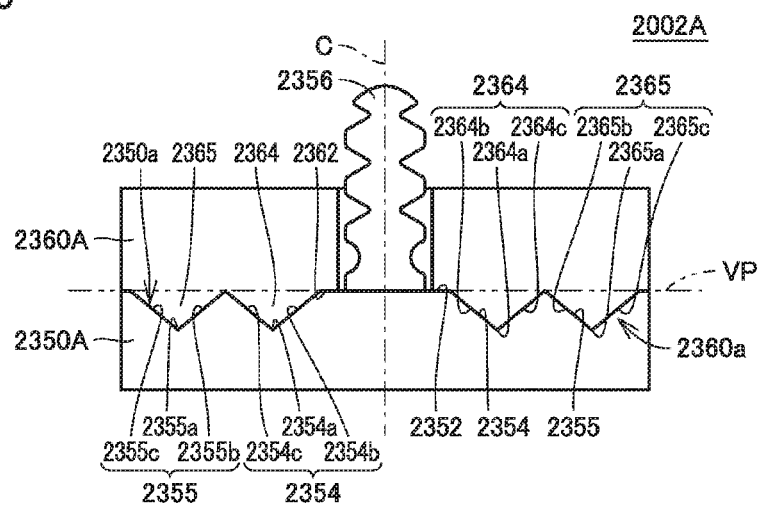
FIG. 73 is a schematic cross-sectional view of a mill according to Embodiment 18.

FIG. 73 is a schematic cross-sectional view of a mill according to the present embodiment. A mill 2002A according to the present embodiment will be described with reference to FIG. 73.

As shown in FIG. 73, mill 2002A according to the present embodiment is different from mill 2002 according to Embodiment 17 in a shape of a groove in each of recess portions 2354 and 2355 of a lower mill 2350A and a shape of a groove in each of projection portions 2364 and 2365 of an upper mill 2360A. The construction is otherwise substantially the same.

An annular groove in each of recess portions 2354 and 2355 is in a substantially triangular shape in an arbitrary cross-section of lower mill 2350A which includes central axis C therein and is perpendicular to virtual plane VP. Here, the substantially triangular shape includes a triangular shape and also such a shape that at least any of vertices of the triangle is rounded. Recess portions 2354 and 2355 are provided to be adjacent to each other and provided concentrically around central axis C.

In an arbitrary cross-section of lower mill 2350A which includes central axis C therein and is perpendicular to virtual plane VP, an angle of inclination of inner circumferential side inclined surface 2354b with respect to virtual plane VP is substantially the same as an angle of inclination of outer circumferential side inclined surface 2354c with respect to virtual plane VP, and an angle of inclination of inner circumferential side inclined surface 2355b with respect to virtual plane VP is substantially the same as an angle of inclination of outer circumferential side inclined surface 2355c with respect to virtual plane VP.

In an arbitrary cross-section of lower mill 2350A which includes central axis C therein and is perpendicular to virtual plane VP, an angle of inclination of inner circumferential side inclined surface 2354b with respect to virtual plane VP is substantially the same as an angle of inclination of inner circumferential side inclined surface 2355b with respect to virtual plane VP, and an angle of inclination of outer circumferential side inclined surface 2354c with respect to virtual plane VP is substantially the same as an angle of inclination of outer circumferential side inclined surface 2355c with respect to virtual plane VP.

By thus providing recess portions 2354 and 2355, second grinding surface 2350a has a height difference. A plurality of shear grooves provided in second grinding surface 2350a are thus provided to have a height difference. Specifically, a shear groove in a portion provided in flat portion 2352 is provided at a position higher than a shear groove in a portion provided in each of bottom portions 2354a and 2355b.

A protrusion of each of projection portions 2364 and 2365 is in a substantially triangular shape in an arbitrary cross-section of upper mill 2360A which includes central axis C therein and is perpendicular to virtual plane VP. Projection portions 2364 and 2365 are provided to be adjacent to each other and provided concentrically around central axis C.

In an arbitrary cross-section of upper mill 2360A which includes central axis C therein and is perpendicular to virtual plane VP, an angle of inclination of inner circumferential side opposing surface 2364b with respect to virtual plane VP is substantially the same as an angle of inclination of outer circumferential side opposing surface 2364c with respect to virtual plane VP, and an angle of inclination of inner circumferential side opposing surface 2365b with respect to virtual plane VP is substantially the same as an angle of inclination of outer circumferential side opposing surface 2365c with respect to virtual plane VP.

In an arbitrary cross-section of upper mill 2360A which includes central axis C therein and is perpendicular to virtual plane VP, an angle of inclination of inner circumferential side opposing surface 2364b with respect to virtual plane VP is substantially the same as an angle of inclination of inner circumferential side opposing surface 2365b with respect to virtual plane VP, and an angle of inclination of outer circumferential side opposing surface 2364c with respect to virtual plane VP is substantially the same as an angle of inclination of outer circumferential side opposing surface 2365c with respect to virtual plane VP.

By thus providing projection portions 2364 and 2365, first grinding surface 2360a has a height difference. Thus, a plurality of shear grooves provided in first grinding surface 2360a are provided to have a height difference. Specifically, a shear groove in a portion provided in flat portion 2362 is provided at a position higher than a shear groove in a portion provided in each of tip end portions 2364a and 2365a while upper mill 2360A and lower mill 2350A are arranged to be opposed to each other.

With the construction as above as well, a surface area of first grinding surface 2360a and second grinding surface 2350a increases. Thus, even though the outer diameter of the upper mill and the outer diameter of the lower mill are made smaller, tea leaves can efficiently be grated and fine powders can be obtained. Therefore, mill 2002A according to the present embodiment obtains an effect substantially the same as the effect of mill 2002 according to Embodiment 17.

Embodiment 19

Figure 74:
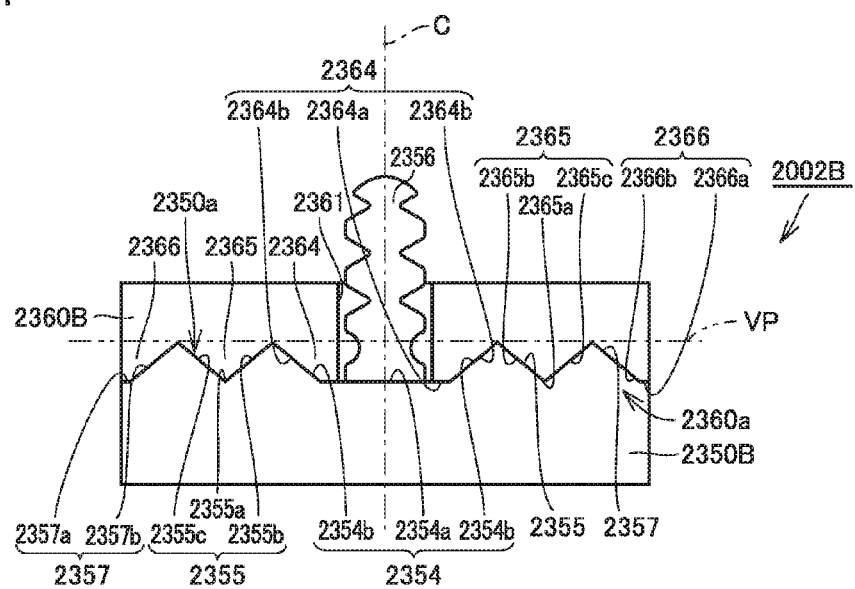
FIG. 74 is a schematic cross-sectional view of a mill according to Embodiment 19.

FIG. 74 is a schematic cross-sectional view of a mill according to the present embodiment. A mill 2002B according to the present embodiment will be described with reference to FIG. 74.

As shown in FIG. 74, mill 2002B according to the present embodiment is different from mill 2002 according to Embodiment 17 in the number of recess portions in a lower mill 2350B and a shape of the recess portion as well as in the number of projection portions in an upper mill 2360B and a shape of the projection portion. The construction is otherwise substantially the same.

Second grinding surface 2450a of lower mill 2350B includes three recess portions 2354, 2355, and 357. A boundary portion between recess portion 2354 and recess portion 2355 and a boundary portion between recess portions 2355 and recess portion 357 are portions located at a highest position in second grinding surface 2350a.

Recess portions 2354, 2355, and 357 are provided to be recessed from virtual plane VP with virtual plane VP being defined as the reference, virtual plane VP passing through the boundary portion between recess portion 2354 and recess portion 2355 and the boundary portion between recess portion 2355 and recess portion 357. Recess portions 2354, 2355, and 357 are provided to have an opening area decreasing from virtual plane VP toward below. Recess portions 2354, 2355, and 357 are provided to be in line symmetry with respect to central axis C in an arbitrary cross-section of lower mill 2350 which includes central axis C therein and is perpendicular to virtual plane VP. Recess portions 2354, 2355, and 357 are provided concentrically around central axis C.

Recess portion 2354 has a shape of a frustum including central axis C and having central axis C as the center. Recess portions 2355 and 357 each have a shape of an annular groove.

Recess portion 2354 has a bottom portion 2354a and an inclined surface 2354b as a first inclined surface. A shear groove is provided also in bottom portion 2354a. Inclined surface 2354b is provided to be oriented to central axis C and inclined upward toward an outer side in a radial direction.

The annular groove in recess portion 2355 is in a substantially triangular shape in an arbitrary cross-section of lower mill 2350B which includes central axis C therein and is perpendicular to virtual plane VP. Recess portion 2355 includes a bottom portion 2355a, an inner circumferential side inclined surface 2355b as a second inclined surface, and an outer circumferential side inclined surface 2355c.

The annular groove in recess portion 357 is in a substantially trapezoidal shape in an arbitrary cross-section of lower mill 2350B which includes central axis C therein and is perpendicular to virtual plane VP. Recess portion 357 has a bottom portion 357a and an inclined surface 357b located on a side of the central axis.

Angles of inclination of inclined surfaces (inclined surface 2354b, inner circumferential side inclined surface 2355b, outer circumferential side inclined surface 2355c, and inclined surface 357b) with respect to virtual plane VP are substantially the same, and bottom portion 2354a, bottom portion 2355a, and bottom portion 357a are flush with one another.

By thus providing recess portions 2354, 2355, and 357, second grinding surface 2350a has a height difference. Thus, the plurality of shear grooves provided in second grinding surface 2350a are provided to have a height difference. A shear groove provided in each inclined surface is provided at a position higher than a shear groove in a portion provided in each of bottom portions 2354a, 2355a, and 357a.

First grinding surface 2360a includes projection portions 2364, 2365, and 2366. Projection portions 2364, 2365, and 2366 are provided to protrude from virtual plane VP when first grinding surface 2360a is arranged to abut to or be in proximity to second grinding surface 2350a, and fitted into recess portions 2354, 2355, and 357, respectively.

Projection portion 2364 is in a shape corresponding to recess portion 2354 and in a shape of a frustum. Projection portions 2365 and 2366 are in a shape corresponding to respective recess portions 2355 and 357 and in a shape of an annular protrusion.

Projection portion 2364 has tip end portion 2364a and opposing surface 2364b as a first opposing surface. Opposing surface 2364b is opposed to inclined surface 2354b. Through hole 2361 through which core 2356 passes is provided in the center of projection portion 2364.

The annular protrusion of projection portion 2365 is in a substantially triangular shape in an arbitrary cross-section of upper mill 2360B which includes central axis C therein and is perpendicular to virtual plane VP. Projection portion 2365 includes inner circumferential side opposing surface 2365b as a second opposing surface, tip end portion 2365a, and outer circumferential side opposing surface 2365c. Inner circumferential side opposing surface 2365b is opposed to inner circumferential side inclined surface 2355b and outer circumferential side opposing surface 2365c is opposed to outer circumferential side inclined surface 2355c.

The annular protrusion of projection portion 2366 is in a substantially trapezoidal shape in an arbitrary cross-section of upper mill 2360B which includes central axis C therein and is perpendicular to virtual plane VP. Projection portion 2366 includes a tip end portion 2366a and an opposing surface 2366b. Opposing surface 2366b is opposed to inclined surface 357b.

Angles of inclination of opposing surfaces (opposing surface 2364b, inner circumferential side opposing surface 2365b, outer circumferential side opposing surface 2365c, and opposing surface 2366b) with respect to virtual plane VP are substantially the same and tip end portions 2364a, 2365a, and 2366a are flush with one another.

By thus providing projection portions 2364, 2365, and 2366, first grinding surface 2360a has a height difference. Thus, a plurality of shear grooves provided in first grinding surface 2360a are provided to have a height difference. Specifically, a shear groove in a portion provided in each opposing surface is provided at a position higher than a shear groove in a portion provided in each of tip end portions 2364a, 2365a, and 2366a while upper mill 2360B and lower mill 2350B are arranged to be opposed to each other.

With such a construction as well, a surface area of first grinding surface 2360a and second grinding surface 2350a increases. Thus, even though the outer diameter of the upper mill and the outer diameter of the lower mill are made smaller, tea leaves can efficiently be grated and fine powders can be obtained. Therefore, mill 2002B according to the present embodiment obtains an effect substantially the same as the effect of mill 2002 according to Embodiment 17.

Though an example in which angles of inclination of inclined surfaces with respect to virtual plane VP are substantially the same has been illustrated and described in the present embodiment, limitation thereto is not intended and modification as appropriate can be made. For example, an angle of inclination of inclined surface 2354b with respect to virtual plane VP and an angle of inclination of outer circumferential side inclined surface 2355c with respect to virtual plane VP may be smaller than an angle of inclination of inner circumferential side inclined surface 2355b with respect to virtual plane VP and an angle of inclination of inclined surface 357b with respect to virtual plane VP.

In this case, an angle of inclination of opposing surface 2364b with respect to virtual plane VP and an angle of inclination of outer circumferential side opposing surface 2365c with respect to virtual plane VP are smaller than an angle of inclination of inner circumferential side opposing surface 2365b with respect to virtual plane VP and an angle of inclination of opposing surface 2366b with respect to virtual plane VP.

Furthermore, in this case, in an arbitrary cross-section of lower mill 2350B which includes central axis C therein and is perpendicular to virtual plane VP, a length of inclined surface 2354b and a length of outer circumferential side inclined surface 2355c are preferably longer than a length of inner circumferential side inclined surface 2355b and a length of inclined surface 357b. In an arbitrary cross-section of upper mill 2360B which includes central axis C therein and is perpendicular to virtual plane VP, a length of opposing surface 2364b and a length of outer circumferential side opposing surface 2365c are preferably longer than a length of inner circumferential side opposing surface 2365b and a length of opposing surface 2366b.

With such a construction, a distance over which grated tea leaves move up inclined surface 2354b and outer circumferential side inclined surface 2355c against gravity increases. Therefore, tea leaves can more finely be grated.

Embodiment 20

Figure 75:
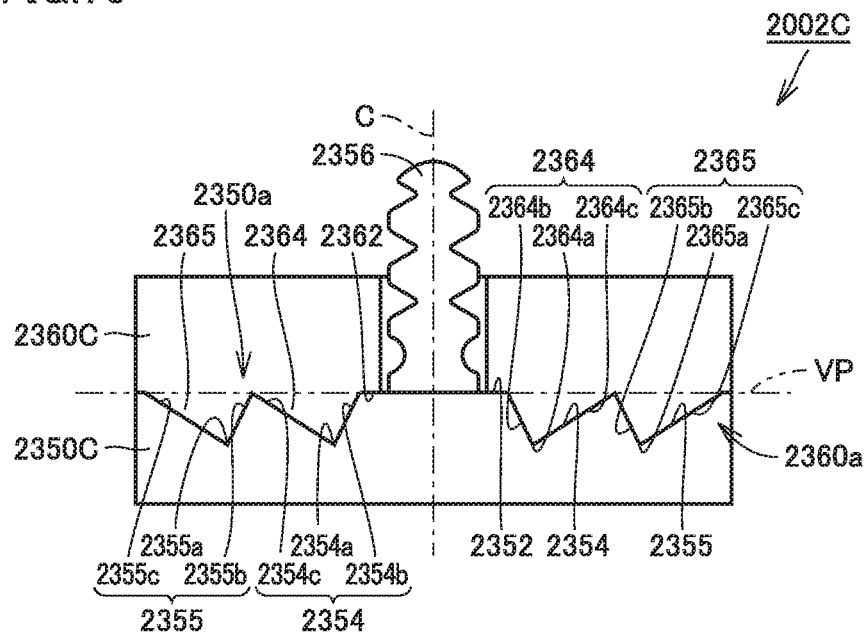
FIG. 75 is a schematic cross-sectional view of a mill according to Embodiment 20.

FIG. 75 is a schematic cross-sectional view of a mill according to the present embodiment. A mill 2002C according to the present embodiment will be described with reference to FIG. 75.

As shown in FIG. 75, mill 2002C according to the present embodiment is different from mill 2002A according to Embodiment 18 in an angle of inclination of a groove shape in each of recess portions 2354 and 2355 of a lower mill 2350C and an angle of inclination of a groove shape in each of projection portions 2364 and 2365 in an upper mill 2360C. The construction is otherwise substantially the same.

In connection with an angle of inclination of the groove shape in each of recess portions 2354 and 2355, in an arbitrary cross-section of lower mill 2350C which includes central axis C therein and is perpendicular to virtual plane VP, an angle of inclination of inner circumferential side inclined surface 2354b with respect to virtual plane VP is greater than an angle of inclination of outer circumferential side inclined surface 2354c with respect to virtual plane VP. An angle of inclination of inner circumferential side inclined surface 2355b with respect to virtual plane VP is greater than an angle of inclination of outer circumferential side inclined surface 2355c with respect to virtual plane VP.

In this case, in an arbitrary cross-section of lower mill 2350C which includes central axis C therein and is perpendicular to virtual plane VP, a length of inner circumferential side inclined surface 2355b is preferably shorter than a length of outer circumferential side inclined surface 2355c.

In an arbitrary cross-section of lower mill 2350C which includes central axis C therein and is perpendicular to virtual plane VP, an angle of inclination of inner circumferential side inclined surface 2354b with respect to virtual plane VP is substantially the same as an angle of inclination of inner circumferential side inclined surface 2355b with respect to virtual plane VP, and an angle of inclination of outer circumferential side inclined surface 2354c with respect to virtual plane VP is substantially the same as an angle of inclination of outer circumferential side inclined surface 2355c with respect to virtual plane VP.

By thus providing recess portions 2354 and 2355, second grinding surface 2350a has a height difference. Thus, a plurality of shear grooves provided in second grinding surface 2350a are provided to have a height difference. Specifically, a shear groove in a portion provided in flat portion 2352 is provided at a position higher than a shear groove in a portion provided in each of bottom portions 2354a and 2355b.

In connection with an angle of inclination of the groove shape in each of projection portions 2364 and 2365 of upper mill 2360C, in an arbitrary cross-section of upper mill 2360C which includes central axis C therein and is perpendicular to virtual plane VP, an angle of inclination of inner circumferential side opposing surface 2364b with respect to virtual plane VP is greater than an angle of inclination of outer circumferential side opposing surface 2364c with respect to virtual plane VP, and an angle of inclination of inner circumferential side opposing surface 2365b with respect to virtual plane VP is greater than an angle of inclination of outer circumferential side opposing surface 2365c with respect to virtual plane VP.

In this case, in an arbitrary cross-section of upper mill 2360C which includes central axis C therein and is perpendicular to virtual plane VP, a length of inner circumferential side opposing surface 2365b is preferably shorter than a length of outer circumferential side opposing surface 2365c.

In an arbitrary cross-section of upper mill 2360C which includes central axis C therein and is perpendicular to virtual plane VP, an angle of inclination of inner circumferential side opposing surface 2364b with respect to virtual plane VP is substantially the same as an angle of inclination of inner circumferential side opposing surface 2365b with respect to virtual plane VP, and an angle of inclination of outer circumferential side opposing surface 2364c with respect to virtual plane VP is substantially the same as an angle of inclination of outer circumferential side opposing surface 2365c with respect to virtual plane VP.

By thus providing projection portions 2364 and 2365, first grinding surface 2360a has a height difference. Thus, a plurality of shear grooves provided in first grinding surface 2360a are provided to have a height difference. Specifically, a shear groove in a portion provided in flat portion 2362 is provided at a position higher than a shear groove in a portion provided in each of tip end portions 2364a and 2365a while upper mill 2360C and lower mill 2350C are arranged to be opposed to each other.

With the construction as above, a distance over which grated tea leaves move up outer circumferential side inclined surfaces 2354c and 2355c against gravity increases. Therefore, tea leaves can sufficiently finely be grated on outer circumferential side inclined surfaces 2354c and 2355c.

Thus, in mill 2002C according to the present embodiment, a surface area of the grinding surface, in particular, an area of the outer circumferential side inclined surface, can be increased. Therefore, an effect as high as or higher than the effect of mill 2002 according to Embodiment 17 can be obtained.

By setting an inclination of inner circumferential side inclined surfaces 2354b and 2355b to be steeper than an inclination of outer circumferential side inclined surfaces 2354c and 2355c, tea leaves can be grated in a relatively short period of time.

Though an example in which an inclination of inner circumferential side inclined surfaces 2354b and 2355b is set to be steeper than an inclination of outer circumferential side inclined surfaces 2354c and 2355c has been illustrated and described in the present embodiment, limitation thereto is not intended and an inclination of outer circumferential side inclined surfaces 2354c and 2355c may be steeper than an inclination of inner circumferential side inclined surfaces 2354b and 2355b. In this case, tea leaves tend to be pooled in the recess portion and tea leaves can relatively finely be grated.

Embodiment 21

Figure 76:
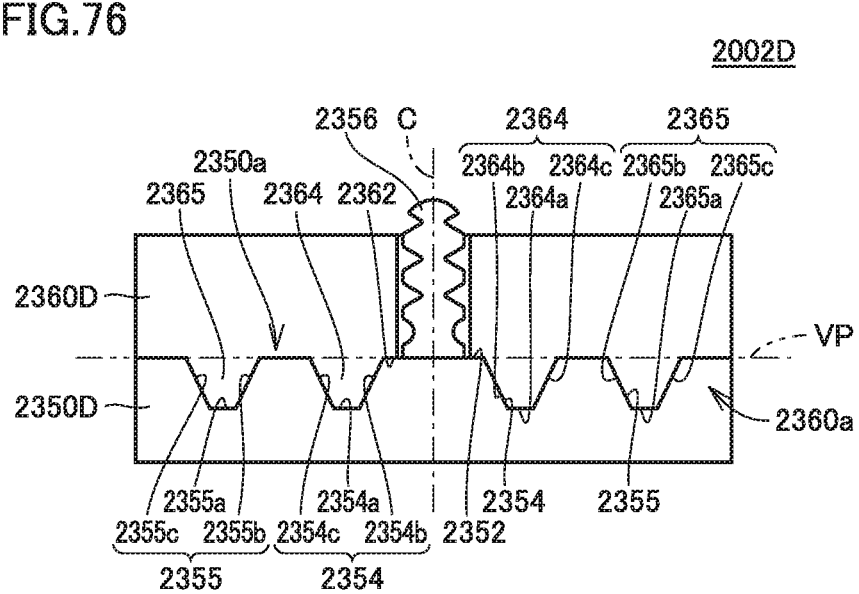
FIG. 76 is a schematic cross-sectional view of a mill according to Embodiment 21.

FIG. 76 is a schematic cross-sectional view of a mill according to the present embodiment. A mill 2002D according to the present embodiment will be described with reference to FIG. 76.

As shown in FIG. 76, mill 2002D according to the present embodiment is different from mill 2002 according to Embodiment 17 in a shape of a groove in each of recess portions 2354 and 2355 of a lower mill 2350D and a shape of a groove in each of projection portions 2364 and 2365 of an upper mill 2360D. The construction is otherwise substantially the same.

Recess portions 2354 and 2355 are each in a shape of an annular groove and the groove is in a substantially trapezoidal shape in an arbitrary cross-section of lower mill 2350D which includes central axis C therein and is perpendicular to virtual plane VP. Projection portions 2364 and 2365 are also each in a shape of an annular protrusion and the protrusion is in a substantially trapezoidal shape in an arbitrary cross-section of upper mill 2360D which includes central axis C therein and is perpendicular to virtual plane VP. The substantially trapezoidal shape includes not only a trapezoidal shape having a vertex portion but also a trapezoidal shape in which at least any vertex portion is rounded.

An angle of inclination of inner circumferential side inclined surfaces 2354b and 2355b of respective recess portions 2354 and 2355 with respect to virtual plane VP and an angle of inclination of outer circumferential side inclined surfaces 2354c and 2355c of respective recess portions 2354 and 2355 with respect to virtual plane VP can be changed as appropriate.

Specifically, an angle of inclination of inner circumferential side inclined surfaces 2354b and 2355b of respective recess portions 2354 and 2355 with respect to virtual plane VP may be the same as an angle of inclination of outer circumferential side inclined surfaces 2354c and 2355c of respective recess portions 2354 and 2355 with respect to virtual plane VP. An angle of inclination of outer circumferential side inclined surface 2354c with respect to virtual plane VP and an angle of inclination of outer circumferential side inclined surface 2355c with respect to virtual plane VP may be smaller than an angle of inclination of inner circumferential side inclined surface 2354b with respect to virtual plane VP and an angle of inclination of inner circumferential side inclined surface 2355b with respect to virtual plane VP.

By thus providing recess portions 2354 and 2355, second grinding surface 2350a has a height difference. Thus, a plurality of shear grooves provided in second main surface 2350a are provided to have a height difference. Specifically, a shear groove in a portion provided in flat portion 2352 is provided at a position higher than a shear groove in a portion provided in each of bottom portions 2354a and 2355a.

Similarly, an angle of inclination of inner circumferential side opposing surfaces 2364b and 2365b of respective projection portions 2364 and 2365 with respect to virtual plane VP and an angle of inclination of outer circumferential side opposing surfaces 2364c and 2365c of respective projection portions 2364 and 2365 with respect to virtual plane VP can also be changed as appropriate in conformity with a shape of each of recess portions 2354 and 2355.

Specifically, an angle of inclination of inner circumferential side opposing surfaces 2364b and 2365b of respective projection portions 2364 and 2365 with respect to virtual plane VP may be the same as an angle of inclination of outer circumferential side opposing surfaces 2364c and 2365c of respective projection portions 2364 and 2365 with respect to virtual plane VP. An angle of inclination of outer circumferential side opposing surface 2364c with respect to virtual plane VP and an angle of inclination of outer circumferential side opposing surface 2365c with respect to virtual plane VP may be smaller than an angle of inclination of inner circumferential side opposing surface 2364b with respect to virtual plane VP and an angle of inclination of inner circumferential side opposing surface 2365b with respect to virtual plane VP.

By thus providing projection portions 2364 and 2365, first grinding surface 2360a has a height difference. Thus, a plurality of shear grooves provided in first grinding surface 2360a is provided to have a height difference. Specifically, a shear groove in a portion provided in flat portion 2362 is provided at a position higher than a shear groove in a portion provided in each of tip end portions 2364a and 2365a while upper mill 2360D and lower mill 2350D are arranged to be opposed to each other.

With a construction as above as well, a surface area of the grinding surface increases. Therefore, mill 2002D according to the present embodiment obtains an effect substantially the same as the effect of mill 2002 according to Embodiment 17.

Embodiment 22

Figure 77:
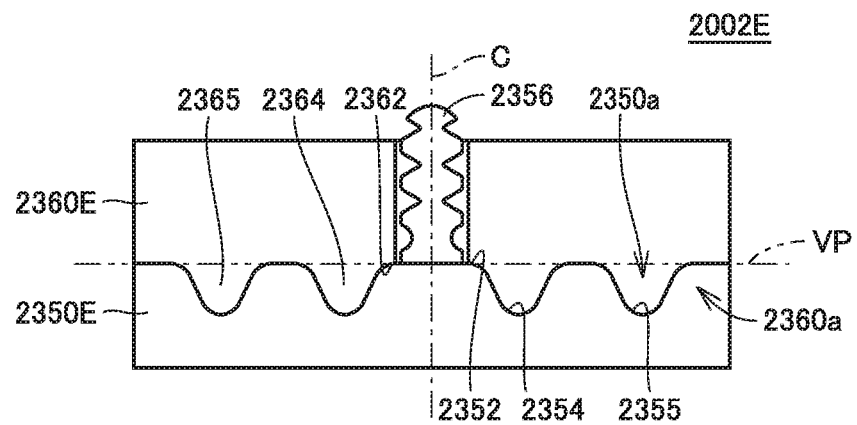
FIG. 77 is a schematic cross-sectional view of a mill according to Embodiment 22.

FIG. 77 is a schematic cross-sectional view of a mill according to the present embodiment. A mill 2002E according to the present embodiment will be described with reference to FIG. 77.

As shown in FIG. 77, mill 2002E according to the present embodiment is different from mill 2002 according to Embodiment 17 in a shape of a groove in each of recess portions 2354 and 2355 of a lower mill 2350E and a shape of a groove in each of projection portions 2364 and 2365 of an upper mill 2360E. The construction is otherwise substantially the same.

Recess portions 2354 and 2355 are each in a shape of an annular groove and the groove is in a wavy shape in an arbitrary cross-section of lower mill 2350E which includes central axis therein and is perpendicular to virtual plane VP. Projection portions 2364 and 2365 are also each in a shape of an annular protrusion and the protrusion is in a wavy shape in an arbitrary cross-section of upper mill 2360E which includes central axis C therein and is perpendicular to virtual plane VP.

With such a construction as well, a surface area of the grinding surface increases. Therefore, mill 2002E according to the present embodiment obtains an effect substantially the same as the effect of mill 2002 according to Embodiment 17.

Embodiment 23

Figure 78:
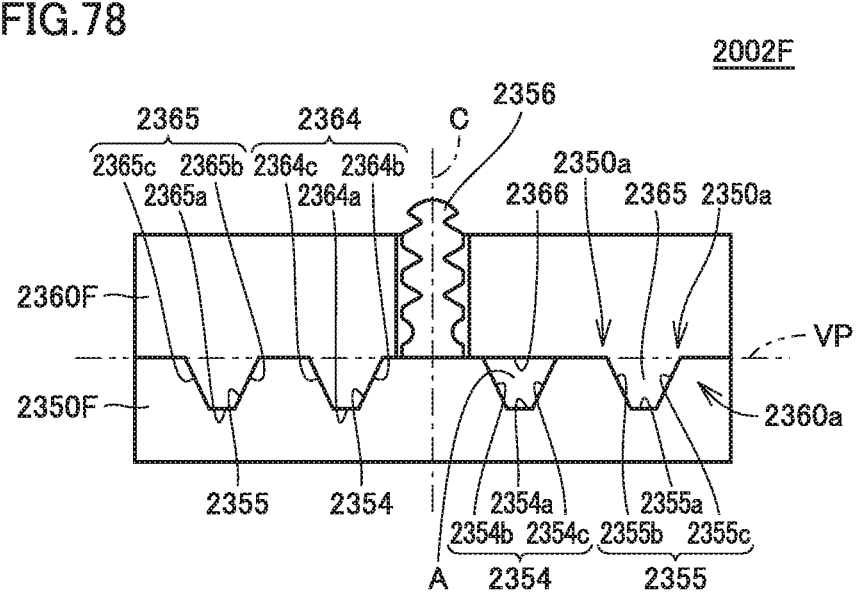
FIG. 78 is a schematic cross-sectional view of a mill according to Embodiment 23.

FIG. 78 is a schematic cross-sectional view of a mill according to the present embodiment. A mill 2002F according to the present embodiment will be described with reference to FIG. 78.

As shown in FIG. 78, mill 2002F according to the present embodiment is different from mill 2002D according to Embodiment 21 in that projection portion 2364 is not in a continuously annular shape. The construction is otherwise substantially the same.

Projection portion 2364 is in a partially discontinuous annular shape. That is, projection portion 2364 is not provided around the entire circumference in the circumferential direction around central axis C but the projection portion is partially not fitted into recess portion 2354. Projection portion 2364 is provided to fit into at least a part of recess portion 2354.

In a discontinuous portion of projection portion 2364, a planar portion 2366 is formed. Planar portion 2366 is, for example, provided to be flush with virtual plane VP. A gap A is provided between planar portion 2366 and recess portion 2354.

A length of planar portion 2366 along the circumferential direction and a portion where planar portion 2366 is formed can be set as appropriate and a range and the number of gaps A can be varied as appropriate so as to adjust a speed of grating or a grain size.

Projection portion 2364 closer to the central side is in a partially discontinuous annular shape so that gap A is provided on the central side and large tea leaves can be sent also from core 2356 toward gap A. Projection portion 2365 located on the outer circumferential side is in a continuously annular shape and fits into recess portion 2355 over the entire circumference in the circumferential direction, so that fine tea leaf powders grated and made finer can be transported toward an outer edge of mill 2002F.

With such a construction as well, a surface area of the grinding surface increases. Therefore, mill 2002F according to the present embodiment obtains an effect substantially the same as the effect of mill 2002D according to Embodiment 21.

Though an example in which projection portion 2364 is in an annular shape of which part is contiguously or intermittently discontinuous has been illustrated and described in the present embodiment, limitation thereto is not intended. Projection portion 2365 may be in an annular shape of which part is contiguously or intermittently discontinuous or both of projection portion 2364 and projection portion 2365 may be in an annular shape of which part is contiguously or intermittently discontinuous.

Embodiment 24

Figure 79:
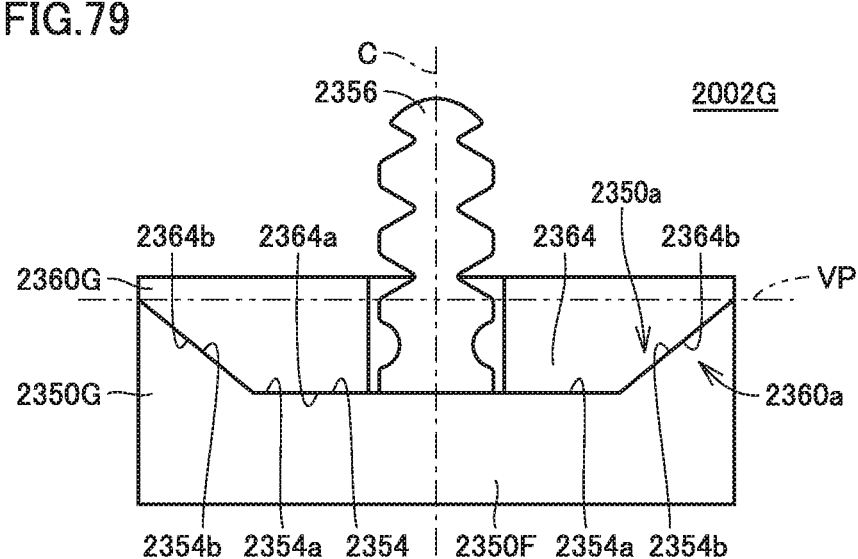
FIG. 79 is a schematic cross-sectional view of a mill according to Embodiment 24.

FIG. 79 is a schematic cross-sectional view of a mill according to the present embodiment. A mill 2002G according to the present embodiment will be described with reference to FIG. 79.

As shown in FIG. 79, mill 2002G according to the present embodiment is different from mill 2002 according to Embodiment 17 in the number of recess portions and a shape of the recess portion in a lower mill 2350G and the number of projection portions and a shape of the projection portion in an upper mill 2360G. The construction is otherwise substantially the same.

Second grinding surface 2350a of lower mill 2350G has one recess portion 2354. An outer circumferential end portion of second grinding surface 2350a is a portion of second grinding surface 2350a which is located at a highest position. Recess portion 2354 is provided to be recessed from virtual plane VP with virtual plane VP being defined as the reference, virtual plane VP being a plane in parallel to the radial direction of central axis C and passing through the outer circumferential end portion of second grinding surface 2350a.

Recess portion 2354 is in a shape of a frustum including central axis C and having central axis C as the center. That is, recess portion 2354 is provided to be in line symmetry with respect to central axis C in an arbitrary cross-section of lower mill 2350G which includes central axis C therein and is perpendicular to virtual plane VP. Recess portion 2354 has bottom portion 2354a and inclined surface 2354b. Inclined surface 2354b is provided to be oriented toward central axis C and inclined upward toward a radially outer side of central axis C.

By thus providing recess portion 2354, second grinding surface 2350a has a height difference. Thus, a plurality of shear grooves provided in second grinding surface 2350a are provided to have a height difference. Specifically, a shear groove in a portion provided in inclined surface 2354b is provided at a position higher than a shear groove in a portion provided in bottom portion 2354a.

First grinding surface 2360a has one projection portion 2364. Projection portion 2364 has tip end portion 2364a and opposing surface 2364b. Projection portion 2364 is provided to protrude downward from virtual plane VP and fits into recess portion 2354. Projection portion 2364 is in a shape corresponding to recess portion 2354 and is in a shape of a frustum.

By thus providing projection portion 2364, first grinding surface 2360a has a height difference. Thus, a plurality of shear grooves provided in first grinding surface 2360a are provided to have a height difference. Specifically, a shear groove in a portion provided in opposing surface 2364b is provided at a position higher than a shear groove in a portion provided in tip end portion 2364a while upper mill 2360 and lower mill 2350 are arranged to be opposed to each other.

In the example having the shape as above as well, a surface area of the grinding surface increases. Therefore, mill 2002G according to the present embodiment obtains an effect substantially the same as the effect of mill 2002 according to Embodiment 17.

Embodiment 25

Figure 80:
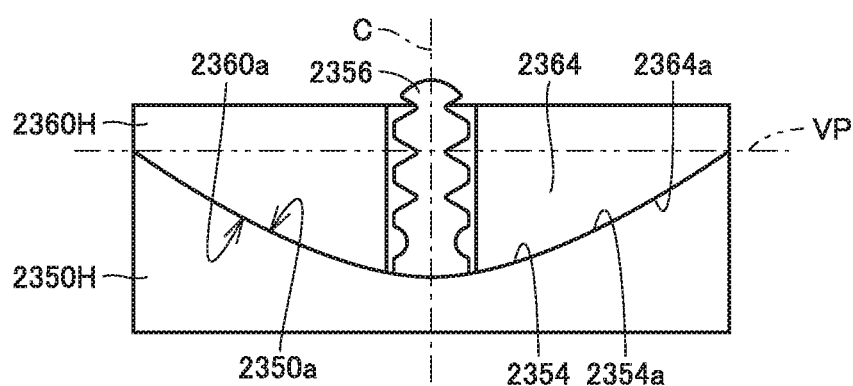
FIG. 80 is a schematic cross-sectional view of a mill according to Embodiment 25.

FIG. 80 is a schematic cross-sectional view of a mill according to the present embodiment. A mill 2002H according to the present embodiment will be described with reference to FIG. 80.

As shown in FIG. 80, mill 2002H according to the present embodiment is different from mill 2002G according to Embodiment 24 in a shape of recess portion 2354 of a lower mill 2350H and a shape of projection portion 2364 of an upper mill 2360H. The construction is otherwise substantially the same.

Second grinding surface 2350a has recess portion 2354. Recess portion 2354 has a shape like a dome which includes central axis C, has central axis C as the center, and is recessed downward. Recess portion 2354 is provided to be in line symmetry with respect to central axis C in an arbitrary cross-section of lower mill 2350H which includes central axis C therein and is perpendicular to virtual plane VP.

Second grinding surface 2350a is provided to have a height difference. Specifically, second grinding surface 2350a is provided such that a central portion thereof is lowest and an outer circumferential portion is highest. Second grinding surface 2350a is in such a curved surface shape that the central portion is recessed downward.

Thus, a shear groove provided in second grinding surface 2350a also has a height difference. Specifically, a shear groove located on the outer circumferential side among shear grooves provided to extend from a central side toward the outer circumference is provided at a position higher than a shear groove located on the central side.

First grinding surface 2360a has projection portion 2364. Projection portion 2364 is provided to project downward from virtual plane VP and fits into recess portion 2354. Projection portion 2364 has a shape corresponding to recess portion 2354 and has a shape like a dome.

First grinding surface 2360a is provided to have a height difference. Specifically, first grinding surface 2360a is provided to be lower from the outer circumferential side toward the center. First grinding surface 2360a is in such a curved surface shape that the central side projects downward.

Thus, a shear groove provided in first grinding surface 2360 also has a height difference. Specifically, a shear groove located on the outer circumferential side among shear grooves provided to extend from the central side toward the outer circumference is provided at a position higher than a shear groove located on the central side.

In the example having such a shape as well, a surface area of the grinding surface increases. Therefore, mill 2002H according to the present embodiment obtains an effect substantially the same as the effect of mill 2002G according to Embodiment 24. In particular, by setting a position of an inlet portion (the central portion) of mill 2002H where tea leaves are introduced to be higher than a position of an outer circumferential portion of mill 2002H from which tea leaf powders are discharged, tea leaves can relatively finely be grated.

Embodiment 26

Figure 81:
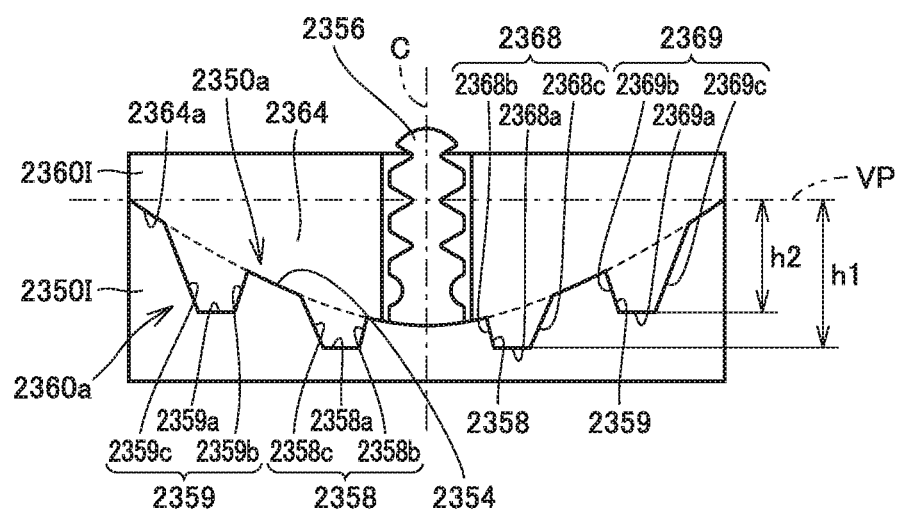
FIG. 81 is a schematic cross-sectional view of a mill according to Embodiment 26.

FIG. 81 is a schematic cross-sectional view of a mill according to the present embodiment. A mill 2002I according to the present embodiment will be described with reference to FIG. 81.

As shown in FIG. 81, mill 2002I according to the present embodiment is different from mill 2002H according to Embodiment 25 in a shape of a lower mill 2350I and an upper mill 2360I. The construction is otherwise substantially the same.

Second grinding surface 2350a has annular depression portions 2358 and 2359 provided to be recessed further downward from recess portion 2354 in a shape like a dome. Depression portions 2358 and 2359 are each in such a substantially trapezoidal shape that one base portion (a base portion located on an upper side) is curved upward from the central portion toward the outer circumferential portion in an arbitrary cross-section of lower mill 2350I which includes central axis C therein and is perpendicular to virtual plane VP.

Depression portions 2358 and 2359 have bottom portions 2358a and 2359a, inner circumferential side inclined surfaces 2358b and 2359b, and outer circumferential side inclined surfaces 2358c and 2359c, respectively. Depression portion 2358 is located below depression portion 2359. That is, a distance h1 from virtual plane VP which is a plane which passes through the outer circumferential portion located at the highest position in second grinding surface 2350a and is in parallel to a base of central axis C to bottom portion 2358a is longer than a distance h2 from virtual plane VP to bottom portion 2359a.

Inner circumferential side inclined surfaces 2358b and 2359b are inclined surfaces of respective depression portions 2358 and 2359 located on a side of central axis C. Outer circumferential side inclined surfaces 2358c and 2359c are inclined surfaces of respective depression portions 2358 and 2359 located on the outer circumferential side of lower mill 2350I.

An angle of inclination of each of inner circumferential side inclined surfaces 2358b and 2359b is greater than an angle of inclination of each of outer circumferential side inclined surfaces 2358c and 2359c. Angles of inclination of inner circumferential side inclined surface 2358b and inner circumferential side inclined surfaces 2359b are substantially the same with each other, and angles of inclination of outer circumferential side inclined surface 2358c and outer circumferential side inclined surface 2359c are substantially the same with each other.

Thus, second grinding surface 2350a is provided to have a height difference so that a plurality of shear grooves provided in second grinding surface 2350a are provided to have a height difference. Specifically, a shear groove in a portion provided in bottom portion 2359a is provided at a position higher than a shear groove provided in bottom portion 2358a.

First grinding surface 2360a has annular protrusion portions 2368 and 2369 provided to protrude further downward from projection portion 2364 in a shape like a dome which projects downward.

Protrusion portions 2368 and 2369 are in a shape corresponding to depression portions 2358 and 2359 described above, respectively. Protrusion portions 2368 and 2369 have tip end portions 2368a and 2369a, inner circumferential side opposing surfaces 2368b and 2369b, and outer circumferential side opposing surfaces 2368c and 2369c, respectively. Distance h1 from virtual plane VP to tip end portion 2368a is longer than distance h2 from virtual plane VP to tip end portion 2369a.

Inner circumferential side opposing surfaces 2368b and 2369b are inclined surfaces of respective protrusion portions 2368 and 2369, which are located on a side of central axis C and opposed to inner circumferential side inclined surfaces 2358b and 2359b, respectively. Outer circumferential side opposing surfaces 2368c and 2369c are inclined surfaces of respective protrusion portions 2368 and 2369, which are located on the outer circumferential side of upper mill 2360I and opposed to outer circumferential side inclined surfaces 2358c and 2359c, respectively.

Angles of inclination of inner circumferential side opposing surfaces 2368b and 2369b are greater than angles of inclination of outer circumferential side opposing surfaces 2368c and 2369c. Angles of inclination of inner circumferential side opposing surface 2368b and inner circumferential side opposing surface 2369b are substantially the same with each other, and angles of inclination of outer circumferential side opposing surface 2368c and outer circumferential side opposing surface 2369c are substantially the same with each other.

Thus, first grinding surface 2360a is provided to have a height difference so that a plurality of shear grooves provided in first grinding surface 2360a are provided to have a height difference. Specifically, a shear groove in a portion provided in tip end portion 2369a is provided at a position higher than a shear groove in a portion provided in tip end portion 2368a while upper mill 2360I and lower mill 2350I are arranged to be opposed to each other.

With the construction as above as well, a surface area of the grinding surface increases. Therefore, mill 2002I according to the present embodiment obtains an effect as high as or higher than the effect of mill 2002H according to Embodiment 25.

Embodiment 27

Figure 82:
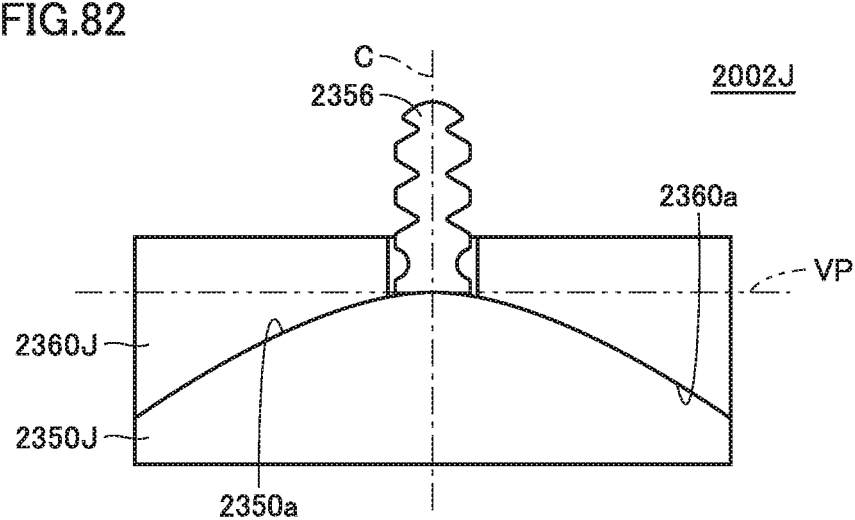
FIG. 82 is a schematic cross-sectional view of a mill according to Embodiment 27.

FIG. 82 is a schematic cross-sectional view of a mill according to the present embodiment. A mill 2002J according to the present embodiment will be described with reference to FIG. 82.

Mill 2002J according to the present embodiment is different from mill 2002H according to Embodiment 25 in a shape of a lower mill 2350J and an upper mill 2360J. The construction is otherwise substantially the same.

Second grinding surface 2350a is provided to have a height difference.

Specifically, second grinding surface 2350a is provided such that the central portion is highest and the outer circumferential portion is lowest. Second grinding surface 2350a is in such a curved surface shape that the central portion is provided to rise upward.

Thus, a shear groove provided in second grinding surface 2350a also has a height difference. Specifically, a shear groove located on the outer circumferential side among shear grooves provided to extend from the central side toward the outer circumference is provided at a position lower than a shear groove located on the central side.

First grinding surface 2360a is provided to have a height difference. Specifically, first grinding surface 2360a is provided to be higher from the outer circumferential side toward the central side. First grinding surface 2360a is in such a curved surface shape that the central portion is provided to be recessed upward.

Thus, a shear groove provided in first grinding surface 2360a also has a height difference. Specifically, a shear groove located on the outer circumferential side among shear grooves provided to extend from the central side toward the outer circumference is provided at a position lower than a shear groove located on the central side.

In the example having such a shape as well, a surface area of the grinding surface increases. Therefore, mill 2002J according to the present embodiment obtains an effect substantially the same as the effect of mill 2002H according to Embodiment 25. In particular, by setting a position of the inlet portion (the central portion) of mill 2002J in which tea leaves are introduced to be lower than a position of the outer circumferential side of mill 2002J from which tea leaf powders are discharged, tea leaves can be grated in a relatively short period of time.

Embodiment 28

FIG. 83 is a schematic cross-sectional view of a mill according to the present embodiment. A mill 2002K according to the present embodiment will be described with reference to FIG. 83.

As shown in FIG. 83, mill 2002K according to the present embodiment is different from mill 2002J according to Embodiment 27 in a shape of a lower mill 2350K and a shape of an upper mill 2360K. The construction is otherwise substantially the same.

Second grinding surface 2350a has projecting portions 2358K and 2359K which project further upward from the curved surface provided such that the central portion rises upward. Projecting portions 2358K and 2359K are each in such a substantially trapezoidal shape that one base portion (a base portion located below) is curved downward from the central portion toward an outer edge portion in an arbitrary cross-section of lower mill 2350K which includes central axis C therein and is perpendicular to virtual plane VP.

Projecting portions 2358K and 2359K have upper surface portions 2358Ka and 2359Ka, inner circumferential side inclined surfaces 2358b and 2359b, and outer circumferential side inclined surfaces 2358c and 2359c, respectively. Upper surface portion 2358Ka is located above upper surface portion 2359Ka. A distance from virtual plane VP to upper surface portion 2358Ka is shorter than a distance from virtual plane VP to upper surface portion 2359Ka.

Inner circumferential side inclined surfaces 2358b and 2359b are inclined surfaces of respective projecting portions 2358K and 2359K, which are located on the side of central axis C. Outer circumferential side inclined surfaces 2358c and 2359c are inclined surfaces of respective projecting portions 2358K and 2359K, which are located on the outer circumferential side of lower mill 2350K.

Angles of inclination of inner circumferential side inclined surfaces 2358b and 2359b are greater than angles of inclination of outer circumferential side inclined surfaces 2358c and 2359c. Angles of inclination of inner circumferential side inclined surfaces 2358b and inner circumferential side inclined surface 2359b are substantially the same with each other, and angles of inclination of outer circumferential side inclined surface 2358c and outer circumferential side inclined surface 2359c are substantially the same with each other.

Thus, second grinding surface 2350a is provided to have a height difference so that a plurality of shear grooves provided in second grinding surface 2350a are provided to have a height difference. Specifically, a shear groove in a portion provided in upper surface portion 2358Ka is provided at a position higher than a shear groove in a portion provided in upper surface portion 2359Ka.

First grinding surface 2360a has deep recess portions 2368K and 2369K provided to be further recessed upward from the curved surface provided such that the central portion is recessed upward. Deep recess portions 2368K and 2369K are in a shape corresponding to projecting portions 2358K and 2359K, respectively.

Deep recess portions 2368K and 2369K have upper bottom portions 2368Ka and 2369Ka, inner circumferential side opposing surfaces 2368b and 2369b, and outer circumferential side opposing surfaces 2368c and 2369c, respectively. A distance from virtual plane VP to upper bottom portion 2368Ka is shorter than a distance from virtual plane VP to upper bottom portion 2369Ka.

Inner circumferential side opposing surfaces 2368b and 2369b are inclined surfaces of respective deep recess portions 2368K and 2369K, which are located on the side of central axis C and opposed to inner circumferential side inclined surfaces 2358b and 2359b, respectively. Outer circumferential side opposing surfaces 2368c and 2369c are inclined surfaces of respective deep recess portions 2368K and 2369K, which are located on the outer circumferential side of upper mill 2360K and opposed to outer circumferential side inclined surfaces 2358c and 2359c, respectively.

Angles of inclination of inner circumferential side opposing surfaces 2368b and 2369b are greater than angles of inclination of outer circumferential side opposing surfaces 2368c and 2369c. Angles of inclination of inner circumferential side opposing surface 2368b and inner circumferential side opposing surface 2369b are substantially the same with each other, and angles of inclination of outer circumferential side opposing surface 2368c and outer circumferential side opposing surface 2369c are substantially the same with each other.

First grinding surface 2360a is thus provided to have a height difference so that a plurality of shear grooves provided in first grinding surface 2360a are provided to have a height difference. Specifically, a shear groove in a portion provided in upper bottom portion 2368Ka is provided at a position higher than a shear groove in a portion provided in upper bottom portion 2369Ka.

With the construction as above as well, a surface area of the grinding surface increases. Therefore, mill 2002K according to the present embodiment obtains an effect as high as or higher than the effect of mill 2002J according to Embodiment 27.

Though an example in which the upper mill is fixed and the lower mill rotates has been illustrated and described in Embodiments 17 to 28 above, the lower mill may be fixed and the upper mill may rotate, or the upper mill and the lower mill may rotate in directions different from each other.

Though beverage preparation apparatus 2001 according to Embodiment 17 described above has been illustrated and described as including mill 2002 according to Embodiment 17, limitation thereto is not intended and the beverage preparation apparatus may include any of the mills according to Embodiments 18 to 28. The beverage preparation apparatus including any of the mills according to Embodiments 18 to 28 can be reduced in size and can obtain fine powders.

Though an example in which depression portions 2358 and 2359 are provided so as to be different in depth from virtual plane VP when the grinding surface is in a curved surface shape has been illustrated and described in Embodiment 26 above, recess portions 2354 and 2355 may be provided to be different from each other in depth from virtual plane VP also in Embodiments 17 to 22.

Though the embodiments of the present invention have been described above, the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST

1 beverage preparation apparatus; 2 mill; 100 apparatus main body; 110 control unit; 120 milling motor unit; 130 milling driving force coupling mechanism; 140 agitation motor unit; 140A contactless table; 141 magnet; 150 hot water supply pipe; 155 liquid supply path; 160 heater; 170 hot water supply nozzle; 171 supply port; 180 unit attachment portion; 190 agitation tank attachment portion; 195 liquid storage tank attachment portion; 300 milling unit; 300W window for coupling; 310 milling case; 310b upper end opening portion; 311 storage portion; 312 discharge path; 312a outlet port; 320 hopper portion; 321 top plate portion; 322 cylindrical portion; 323 opening portion; 325 object-to-be-grated inlet; 330 cover portion; 340 lower mill support portion; 341 main body portion; 342 engagement protrusion portion; 343 powder scraping portion; 345 milling shaft; 350, 350A, 350B, 350C, 350D, 350E, 350F, 350G, 350H lower mill; 350*a*, 350*b* main surface; 350*c* circumferential surface; 351*a* grinding region; 351*b* outer circumferential region; 352 engagement recess portion; 353 projection and recess portion; 353 projection portion; 353*b* recess portion; 353B through hole; 354 circumferential surface; 355 blade portion; 355*a* upper surface; 355*a*1 curved portion; 355*a*2 extension portion; 355*b* bottom surface; 355*b*1 curved portion; 355*b*2 extension portion; 355*c* first side surface; 355*d* second side surface; 356 recess portion; 357 projection and recess portion; 358 projection and recess portion; 358*a* projection portion; 358*b* groove portion; 359 core; 359*a* blade portion; 360 upper mill; 360*a*, 360*b* main surface; 360*c* circumferential surface; 370 upper mill holding member; 371 bottom surface portion; 371*a* hole portion; 372 outer cylindrical portion; 373 inner cylindrical portion; 380 spring holding member; 381 spring; 391, 392, 393 rib; 410, 410A, 410B heat radiation member; 411 base portion; 411*a*, 411*b* main surface; 411A heat radiation block; 412 fin portion; 413 projection and recess portion; 500 agitation unit; 510 agitation tank; 511 exterior holder; 512 thermally insulated tank; 513 opening portion; 520 grip; 530 agitation cover; 531 powder inlet; 532 hot water supply inlet; 540 discharge port opening and closing mechanism; 541 discharge port; 542 operation lever; 543 opening and closing nozzle; 545 discharge portion; 550 agitation blade; 551 bearing portion; 552 magnet; 560 rotation shaft; 700 liquid storage tank; 710 tank main body; 720 lid portion; 800 tea leaf powder tray; 900 placement base; 1001 beverage preparation apparatus; 1002 milling machine; 1100 apparatus main body; 1101 front panel; 1101*a* engagement protrusion; 1102 central frame body; 1102*a*, 1102*b* opening portion; 1102*c* partition wall; 1103 rear panel; 1103*a* engaged portion; 1103*c* notch portion; 1110 control unit; 1120 milling motor unit; 1121 motor; 1122 output shaft; 1130 milling driving force transmission mechanism; 1130*a* front portion; 1130*b* rear portion; 1130*c* positioning projection portion; 1131 power transmission portion; 1132 first fixed gear; 1133, 1134, 1135 intermediate gear; 1136 second fixed gear; 1137 rotation shaft; 1138 accommodation case; 1140 agitation motor unit; 1140A agitation motor contactless table; 1141 magnet; 1150 hot water supply pipe; 1155 liquid supply path; 1160 heater; 1170 hot water supply nozzle; 1171 supply port; 1180 milling unit attachment portion; 1190 agitation tank attachment portion; 1195 liquid storage tank attachment portion; 1300 milling unit; 1300W insertion region; 1310 housing; 1310*b* upper end opening portion; 1311 storage portion; 1312 discharge path; 1312*a* discharge path; 1313 flat plate portion; 1314 erected wall; 1315 coupling hole portion; 1316 positioning recess portion; 1320 hopper portion; 1321 top plate portion; 1322 cylindrical portion; 1323 opening portion; 1325 object-to-be-grated inlet; 1330 cover portion; 1340 rotation support member; 1341 main body portion; 1342 engagement protrusion portion; 1343 powder scrape-out portion; 1345 coupling portion; 1350 lower mill; 1350*a*, 1350*b* main surface; 1350*c* circumferential surface; 1352 engagement recess portion; 1359 core; 1359*a* blade portion; 1360 upper mill; 1360*a*, 1360*b* main surface; 1360*c* circumferential surface; 1361 through hole; 1370 upper mill holding member; 1371 bottom surface portion; 1371*a* hole portion; 1372 outer cylindrical portion; 1373 inner cylindrical portion; 1380 spring holding member; 1381 spring; 1391, 1392, 1393 rib; 1500 agitation unit; 1510 agitation tank; 1511 exterior holder; 1512 thermally insulated tank; 1513 opening portion; 1520 grip; 1530 agitation cover; 1531 powder inlet; 1532 hot water supply inlet; 1540 discharge port opening and closing mechanism; 1541 discharge port; 1542 operation lever; 1543 opening and closing nozzle; 1545 discharge portion; 1550 agitation blade; 1551 bearing portion; 1552 magnet; 1560 rotation shaft; 1700 liquid storage tank; 1710 tank main body; 1720 lid portion; 1800 tea leaf powder tray; 1900 placement base; 2001 beverage preparation apparatus; 2002, 2002A, 2002B, 2002C, 2002D, 2002E, 2002F, 2002G, 2002H, 2002I, 2002J, 2002K mill; 2100 apparatus main body; 2110 control unit; 2120 milling motor unit; 2130 milling driving force coupling mechanism; 2140 agitation motor unit; 2140A agitation motor contactless table; 2141 magnet; 2150 hot water supply pipe; 2155 liquid supply path; 2160 heater; 2170 hot water supply nozzle; 2171 supply port; 2180 milling unit attachment portion; 2190 agitation tank attachment portion; 2195 liquid storage tank attachment portion; 2300 milling unit; 2300*w* window for coupling; 2310 milling case; 2310*b* upper end opening portion; 2311 storage portion; 2312 discharge path; 2312*a* outlet port; 2320 hopper portion; 2321 top plate portion; 2322 cylindrical portion; 2323 opening portion; 2325 object-to-be-grated inlet; 2330 cover portion; 2340 lower mill support portion; 2341 main body portion; 2342 engagement protrusion portion; 2343 powder scraping portion; 2345 milling shaft; 2350, 2350A, 2350B, 2350C, 2350D, 2350E, 2350F, 2350G, 2350H, 2350I, 2350J, 2350K lower mill; 2350*a* second grinding surface; 2350*b* main surface; 2350*c* intake groove; 2350*d* engagement recess portion; 2351 grating groove; 2351*b* feed groove; 2352, 2352*a*, 2352*b*, 2352*c* flat portion; 2353 opening portion; 2353*a* inner circumferential surface; 2354 recess portion; 2354*a* bottom portion; 2354*b* inner circumferential side inclined surface; 2354*c* outer circumferential side inclined surface; 2355 recess portion; 2355*a* bottom portion; 2355*b* inner circumferential side inclined surface; 2355*c* outer circumferential side inclined surface; 2356 core; 2356*a* blade portion; 2358, 2359 depression portion; 2358K, 2359K projecting portion; 2358*a*, 2359*a* bottom portion; 2358Ka, 2359Ka upper surface portion; 2358*b*, 2359*b* inner circumferential side inclined surface; 2358*c*, 2359*c* outer circumferential side inclined surface; 2360, 2360A, 2360B, 2360D, 2360E, 2360F, 2360G, 2360H, 2360I, 2360J, 2360K upper mill; 2360*a* first grinding surface; 2360*b* main surface; 2361 through hole; 2364 projection portion; 2364*a* tip end portion; 2364*b* inner circumferential side opposing surface; 2364*c* outer circumferential side opposing surface; 2365 projection portion; 2365*a* tip end portion; 2365*b* inner circumferential side opposing surface; 2365*c* outer circumferential side opposing surface; 2366 projection portion; 2366*a* tip end portion; 2366*b* opposing surface; 2368, 2369 protrusion portion; 2368K, 2369K deep recess portion; 2368*a*, 2369*a* tip end portion; 2368Ka, 2369Ka upper bottom portion; 2368*b*, 2369*b* inner circumferential side opposing surface; 2368*c*, 2369*c* outer circumferential side opposing surface; 2370 upper mill holding member; 2371 bottom surface portion; 2371*a* hole portion; 2372 outer cylindrical portion; 2373 inner cylindrical portion; 2380 spring holding member; 2381 spring; 2391, 2392, 2393 rib; 2500 agitation unit; 2510 agitation tank; 2511 exterior holder; 2512 thermally insulated tank; 2513 opening portion; 2520 grip; 2530 agitation cover; 2531 powder inlet; 2532 hot water supply inlet; 2540 discharge port opening and closing mechanism; 2541 discharge port; 2542 operation lever; 2543 opening and closing nozzle; 2545 discharge portion; 2550 agitation blade; 2551 bearing portion; 2552 magnet; 2560 rotation shaft; 2700 liquid storage tank; 2710 tank main body; 2720 lid portion; 2800 tea leaf powder tray; and 2900 placement base.

The invention claimed is:

1. A mill comprising:
a first mill which has a first grinding region;
a second mill which has a second grinding region opposed to the first grinding region and is provided to be rotatable relatively to the first mill; and
a heat radiation mechanism which is provided in at least one of the first mill and the second mill and radiates friction heat generated as a result of rotation of the first mill and the second mill relative to each other, wherein
the heat radiation mechanism is provided in a portion except for the first grinding region and the second grinding region,
the first mill has a main surface that includes the first grinding region, a surface located opposite to the main surface that includes the first grinding region, and a first circumferential surface connecting the main surface of the first mill and the surface of the first mill,
the second mill has a main surface that includes the second grinding region, a surface located opposite to the main surface that includes the second grinding region, and a second circumferential surface connecting the main surface of the second mill and the surface of the second mill, and
the heat radiation mechanism is provided in at least one of the first circumferential surface and the second circumferential surface.

2. The mill according to claim 1, wherein
the heat radiation mechanism includes a projection and recess portion provided in at least one of the first circumferential surface and the second circumferential surface.

3. The mill according to claim 1, wherein
the heat radiation mechanism includes at least one of a first through hole provided to pass from the main surface having the first grinding region to the surface of the first mill located opposite to the main surface having the first grinding region and a second through hole provided to pass from the main surface having the second grinding region to the surface of the second mill located opposite to the second grinding region.

4. The mill according to claim 1, wherein
the heat radiation mechanism includes a projection and recess portion provided in at least one of the surface of the first mill located opposite to the main surface having the first grinding region and the surface of the second mill located opposite to the main surface having the second grinding region.

5. The mill according to claim 1, wherein
the heat radiation mechanism includes a heat radiation member fixed to
at least one of the first circumferential surface and the second circumferential surface, or
at least one of a first through hole provided to pass from the main surface having the first grinding region to the surface of the first mill located opposite to the main surface having the first grinding region and a second through hole provided to pass from the main surface having the second grinding region to the surface of the second mill located opposite to the second grinding region, or
at least one of the surface of the first mill located opposite to the main surface having the first grinding region and the surface of the second mill located opposite to the second grinding region.

6. The mill according to claim 1, wherein
the heat radiation mechanism is provided in at least one of the first mill and the second mill which rotates.

7. A beverage preparation apparatus comprising:
a milling unit which obtains powders by grating an object to be grated;
a tank which stores a liquid; and
an agitation tank which is supplied with the powders obtained by the milling unit and the liquid and mixes the powders and the liquid,
the mill according to claim 1 being employed as the milling unit.

* * * * *